(12) United States Patent
Van Der Westhuizen

(10) Patent No.: US 10,691,317 B2
(45) Date of Patent: Jun. 23, 2020

(54) TARGET-DIRECTED MOVEMENT IN A USER INTERFACE

(71) Applicant: Flow Labs, Inc., Menlo Park, CA (US)

(72) Inventor: Willem Morkel Van Der Westhuizen, Stellenbosch (ZA)

(73) Assignee: Flow Labs, Inc., Menlo Park, CA (US)

( * ) Notice: Subject to any disclaimer, the term of this patent is extended or adjusted under 35 U.S.C. 154(b) by 411 days.

(21) Appl. No.: 15/518,914

(22) PCT Filed: Oct. 23, 2015

(86) PCT No.: PCT/IB2015/058191
§ 371 (c)(1),
(2) Date: Apr. 13, 2017

(87) PCT Pub. No.: WO2016/063258
PCT Pub. Date: Apr. 28, 2016

(65) Prior Publication Data
US 2017/0242568 A1    Aug. 24, 2017

(30) Foreign Application Priority Data

Oct. 24, 2014    (ZA) .................................. 2014/07753

(51) Int. Cl.
*G06F 3/0484*    (2013.01)
*G06F 3/0482*    (2013.01)
(Continued)

(52) U.S. Cl.
CPC ........ *G06F 3/04845* (2013.01); *G06F 3/0482* (2013.01); *G06F 3/0484* (2013.01);
(Continued)

(58) Field of Classification Search
CPC ....... G06F 2203/04806; G06F 3/04812; G06F 3/0484; G06F 3/04845; G06F 3/0485;
(Continued)

(56) References Cited

U.S. PATENT DOCUMENTS 6,198,483 B1    3/2001    Launais
7,051,291 B2    5/2006    Sciammarella et al.
(Continued)

FOREIGN PATENT DOCUMENTS

WO    WO 2004/102285 A2    11/2004
WO    WO 2014/161011 A1    10/2014

OTHER PUBLICATIONS

Cockburn et al., "A Review of Overview + Detail, Zooming, and Focus +Context Interface", Publication date: Dec. 2008, ACM Computing Surveys, vol. 41, No. 1, Article 2, pp. 31 (Year: 2008).*
(Continued)

*Primary Examiner* — Chau T Nguyen
(74) *Attorney, Agent, or Firm* — Fenwick & West LLP

(57) ABSTRACT

The invention provides a method of interacting with interactive items in a user interface. A user interface is provided which includes a control region and a display region. A plurality of interactive items are displayed in the display region. The user interface tracks the position and movement of a pointer in the control region, and interprets the movement and/or position of the pointer. Movement along a first predefined axis is interpreted as focus pointing only, movement along a second predefined axis is interpreted as view pointing only. Movement having components along both axes is interpreted as both view pointing and focus pointing, enabling both view pointing and focus pointing to be substantially simultaneously performed.

22 Claims, 43 Drawing Sheets

(51) Int. Cl.
*G06F 3/0481* (2013.01)
*G06F 3/0487* (2013.01)
*G06F 3/0485* (2013.01)

(52) U.S. Cl.
CPC .......... *G06F 3/0485* (2013.01); *G06F 3/0487* (2013.01); *G06F 3/04812* (2013.01); *G06F 3/04815* (2013.01); *G06F 2203/04806* (2013.01)

(58) Field of Classification Search
CPC .... G06F 3/048; G06F 3/1484; G06F 3/04815; G06F 3/0482; G06F 3/0487
See application file for complete search history.

(56) References Cited

U.S. PATENT DOCUMENTS

| | | | |
|---|---|---|---|
| 7,839,385 B2 | 11/2010 | Hunleth et al. | |
| 8,654,076 B2 | 2/2014 | Ronkainen | |
| 8,751,955 B2 | 6/2014 | DeLuca et al. | |
| 9,383,916 B2 | 7/2016 | Srinivasan et al. | |
| 2004/0141010 A1 | 7/2004 | Fitzmaurice et al. | |
| 2006/0174213 A1 | 8/2006 | Kato | |
| 2007/0198476 A1 | 8/2007 | Farago et al. | |
| 2008/0148177 A1 | 6/2008 | Lang et al. | |
| 2008/0198130 A1 | 8/2008 | Baudisch et al. | |
| 2009/0158222 A1 | 6/2009 | Kerr et al. | |
| 2009/0300004 A1* | 12/2009 | Tokashiki | G06F 16/951 |
| 2010/0058213 A1* | 3/2010 | Higuchi | G06F 3/0483 715/766 |
| 2010/0058226 A1* | 3/2010 | Flake | G06F 3/0481 715/786 |
| 2010/0083192 A1 | 4/2010 | Zaman et al. | |
| 2011/0016391 A1* | 1/2011 | Borovsky | G06F 3/0482 715/702 |
| 2011/0035700 A1 | 2/2011 | Meaney et al. | |
| 2011/0080430 A1 | 4/2011 | Nishibe et al. | |
| 2011/0102455 A1 | 5/2011 | Temple | |
| 2011/0126148 A1 | 5/2011 | Krishnaraj et al. | |
| 2011/0126156 A1 | 5/2011 | Krishnaraj et al. | |
| 2011/0134126 A1 | 6/2011 | Miyazaki | |
| 2011/0145752 A1 | 6/2011 | Fagans | |
| 2011/0202866 A1 | 8/2011 | Huang et al. | |
| 2012/0030613 A1 | 2/2012 | Moshiri et al. | |
| 2012/0030635 A1 | 2/2012 | Miyazaki | |
| 2012/0120316 A1 | 5/2012 | Lee | |
| 2012/0144425 A1* | 6/2012 | Baba | H04N 5/44543 725/40 |
| 2012/0169776 A1 | 7/2012 | Rissa et al. | |
| 2012/0272170 A1 | 10/2012 | Hammoud | |
| 2012/0327083 A1* | 12/2012 | Nishimura | G06F 3/04815 345/419 |
| 2013/0093727 A1 | 4/2013 | Eriksson et al. | |
| 2013/0106913 A1 | 5/2013 | Edmiston et al. | |
| 2013/0151967 A1 | 6/2013 | Kerr et al. | |
| 2014/0013216 A1 | 1/2014 | Sakuta | |
| 2014/0098102 A1 | 4/2014 | Raffle et al. | |

OTHER PUBLICATIONS

Patent Cooperation Treaty, International Search Report, International Patent Application No. PCT/IB2015/058191, dated Feb. 5, 2016, 2 Pages.
Patent Cooperation Treaty, Written Opinion of the International Searching Authority, International Patent Application No. PCT/IB2015/058191, dated Feb. 5, 2016, 9 Pages.
Appert, C. et al., "OrthoZoom Scroller: 1D Multi-Scale Navigation," author manuscript, International conference on Human factors in computing systems, Montreal, Canada, 2006, 10 pages.
Blanch, R. et al., "Semantic Pointing: Improving Target Acquisition with Control-Display Ratio Adaptation," *Proceedings of the SIGCHI Conference on Human Factors in Computing Systems*, Apr. 2004, vol. 6, No. 1, pp. 519-526.
Guiard, Y. et al., "Target acquisition in multiscale electronic worlds," *International Journal of Human-Computer Studies*, Dec. 2004, vol. 61, pp. 875-905.
International Search Report and Written Opinion, Patent Cooperation Treaty Patent Application No. PCT/IB2016/051047, dated Jul. 21, 2016, 8 Pages.

* cited by examiner

TARGET-DIRECTED MOVEMENT IN A USER INTERFACE

CROSS-REFERENCE TO RELATED APPLICATIONS

This application is a 35 U.S.C. 371 national stage filing of International Application No. PCT/IB2015/058191, filed on 23 Oct. 2015, which claims priority to South African provisional patent application number 2014/07753 filed on 24 Oct. 2014, which are incorporated by reference herein.

FIELD OF THE INVENTION

This invention relates to a method of interacting with interactive items in a user interface.

BACKGROUND TO THE INVENTION

A user interface typically provides a number of interactive items which need to be navigated through by a user in order to locate a target interactive item. The number of items available in a user interface may be such that it is not possible to display all of the items in a suitable manner on a display associated with the user interface at once. In order to locate or navigate to the target interactive item, it may necessary to perform certain actions to locate the target interactive item. The actions may be, for example, to scroll, pan, zoom, page or the like. When a specific target interactive item has been located, and a user wishes to locate a next target interactive item, the user may again need to perform certain actions in order to locate the next target interactive item. The act of manipulating the display of the user interface in order to alter the displayed targets therein may be referred to as "view pointing". A pointer in the user interface is moved in a particular manner so that the view is suitably altered until the target becomes visible in the display.

In the remainder of the specification, the term "view pointing" should be construed to mean any action which alters a display of a user interface, including, but not limited to, elements such as panning, zooming, paging, changing the orientation of an item, the location of an item on the display, the transparency level of an item, making an item appear or disappear, fade in or out, or the like. It should be noted that the action of zooming may include or involve other actions such as increasing a size, changing an orientation or location of an item, making an item appear or disappear, or the like.

When a target interactive item is visible in the display, a user typically navigates the pointer to the target in order to select it. This may be referred to as "focus pointing". A pointer in the display is moved in a particular manner so that the target may be selected, viewed or discovered. In this specification, focus pointing refers to any action which affects a specific focal point or area on a user interface, including, but not limited to, moving an interactive item, moving a cursor, or interacting with a specific target interactive item.

View pointing and focus pointing may be referred to as "target-directed movements". A target interactive item may be any interactive item, where an interactive item could be, for example, a document, content item, event, file, folder, container, media item, music item, photo, video, title, clip, message, entry, text, tag, data point, character, emoji, icon, link, button, application, program, executable file, digital file, icon, menu item, hypertext link, button or any other target that may be positioned in a display region of a user interface as part of a number of such interactive items. Throughout this specification, the term "interactive item" should be broadly interpreted and is used to refer to any target provided by a user interface and which a user may wish to select, whether or not it is visible to the user at a given point in time.

A pointer may typically be a cursor provided by a user interface and controlled by an input device such as a mouse. The pointer may also be the position, movement and/or touch of any other pointing tool or the body of the user in a control region provided by the user interface. In cases where touch-sensitive displays are employed, the pointer is typically a finger or fingers of the user. Implementations have further been developed wherein electronic devices are equipped with z-axis tracking. In such a case, a device may, for example, be capable of tracking the position and/or movement of a pointer in a region above a display plane such as a touch-sensitive electronic device.

Known user interfaces generally provide different target-directed movements as distinct modes. For example, only one form of view pointing may be activated at a given point in time, and a particular signal may be required from the user in order to enter a desired mode or switch between modes. For example, in conventional "point and click" user interfaces, scrolling may be achieved by operating a scroll wheel located on a mouse, while zooming may be achieved by pressing a certain key on a keyboard while operating the scroll wheel. In touch-sensitive devices, certain discrete gestures such as pinching the screen may achieve zooming, while other gestures such as swiping may achieve scrolling.

U.S. Pat. No. 8,654,076 discloses a method of switching between three distinct modes when using an electronic device equipped with z-axis tracking. In a normal mode, a number of interactive items are displayed on a touch screen. In this mode, the pointer, which is typically a finger of a user, is out of a tracking range of the device. Once the pointer hovers over the touch screen within the tracking range but without touching it, a zooming and panning mode is entered. Once a touch input is provided, a pointing mode is entered. In this mode, panning is prevented and the user is capable of moving the pointer to select a target interactive item.

A problem associated with methods such as those described above is that at least some target-directed movements, including scrolling, zooming, panning and moving the pointer to select a target interactive object, may be implemented as distinct modes. A user may thus not be able to simultaneously perform, for example, zooming and scrolling. Furthermore, the efficiency of such user interfaces may be unsatisfactory, as the user may be required to alternate between different modes, potentially resulting in repetitions of "point and click" to ultimately select a target on an interactive object.

The present invention aims to alleviate this and other problems, at least to some extent.

SUMMARY OF THE INVENTION

In accordance with the invention there is provided a method of interacting with interactive items in a user interface, comprising:
  providing a user interface having a control region and a display region;
  displaying a plurality of interactive items in the display region;
  tracking the position and movement of a pointer in the control region;

responsive to detecting movement of the pointer along a first predefined axis or in a first predefined direction only, interpreting the movement as focus pointing and causing focus pointing to be performed in relation to the interactive items in the display region;

responsive to detecting movement of the pointer along a second predefined axis or in a second predefined direction only, interpreting the movement as view pointing and causing view pointing to be performed in relation to the interactive items in the display region; and responsive to detecting movement of the pointer having components of movement along both the first predefined axis and the second predefined axis or in both the first predefined direction and the second predefined direction, causing both focus pointing and view pointing to be substantially simultaneously performed in respect of the interactive items in the display region.

Further features provide for the method to include the step of, based on the position of the pointer on the first predefined axis, designating an interactive item as a primary interactive item; and for the step of causing focus pointing to be performed to include updating the primary interactive item according to the location or direction of movement of the pointer along the first predefined axis.

Still further features provide for causing view pointing to be performed by altering attributes of the interactive items on the display.

Yet further features provide for the behaviour of attributes of the interactive items on the display to be determined by an attribute tool; for the attribute tool to include an attribute sequence axis which is correlated to the second predefined axis of the user interface, to further include a perpendicular attribute value axis, and for the attribute tool to include one or more attribute functions that define an attribute value based on a position along the attribute sequence axis. The attributes may be any element of view pointing, such as zooming, panning or paging.

Further features provide for the method to include the step of, responsive to recognising a predetermined movement of the pointer on the second predefined axis, modifying the correlation between the attribute sequence axis and the second predefined axis; and for the predefined movement to be a rate of movement falling within a certain threshold.

A still further feature provides for the first predefined axis and the second predefined axis to be orthogonal in relation to each other.

Yet further feature provides for the control region to be either a two-dimensional or a three-dimensional region; for the control region to include the display region; and for the display region to be a display of an electronic device providing the user interface.

Further features provide for the pointer to be one of: a cursor provided by the user interface, a pointing tool which interacts with the control region of the user interface, or a part of the body of a user which interacts with the control region of the user interface.

The list of interactive items may include one or more of information elements, objects, actions, applications and events which can be selected by the user. The list of interactive items may be arranged in a hierarchical item structure such that view pointing causes navigation through different levels of the hierarchical item structure.

Still further features provide for focus pointing to include allowing the pointer to be moved in relation to the interactive items without substantially adding or removing interactive items from the display region; and for a lens function to be associated with the pointer and/or mapped to the first predefined axis and/or the second predefined axis such that interactive items in the vicinity of a pointer position along the first predefined axis and/or the second predefined axis may be enlarged or made visible according to a value of the lens function.

Yet further features provide for only a subset of the total number of interactive items in the user interface to be displayed on the display at one time; for focus pointing to include scrolling, with movement of the pointer along the first predefined axis causing the subset of interactive items to be updated by removing an interactive item from one end of the subset of interactive items at substantially the same time as adding an interactive item to an opposite end of the subset; for the control region to include at least one scroll region; for movement of or locating the pointer in the scroll region to cause updating of the subset of interactive items by scrolling; and for a scroll region to be provided at or near opposing ends of the first predefined axis.

Further features provide for the method to include the step of, responsive to focus pointing being performed immediately before the pointer is removed from the display, continuing to perform focus pointing at a continuously reducing rate until no more focus pointing occurs; and the step of, responsive to view pointing being performed before the pointer is removed from the display, continuing to perform view pointing in at a continuously reducing rate until no more focus pointing occurs.

According to one aspect of the invention, the first predefined axis is a vertical axis of the control region and the second predefined axis is a horizontal axis of the control region. A list of interactive items may be vertically arranged in the display region. Different levels in a hierarchical item structure may be horizontally arranged. Movement of the pointer along the horizontal axis towards and away from the interactive items may cause view pointing, and movement of the pointer along the vertical axis may cause focus pointing. In some embodiments, movement along the horizontal axis towards the interactive items causes at least a view pointing element of zooming in to be performed, and movement along the horizontal axis away from the interactive items causes at least a view pointing element of zooming out to be performed.

According to a further aspect of the invention, the method may further include the steps of: receiving a signal indicating that a selection interaction mode is to be entered; and, responsive to receiving the signal, entering a selection interaction mode providing a conventional graphical user interface (GUI) state wherein focus pointing and view pointing are distinct actions which cannot be simultaneously performed. The signal indicating that a selection interaction mode is to be entered may be a selection of an interactive item, and the selection interaction mode may provide options relating to the selected interactive item.

According to a still further aspect of the invention, the primary interactive item is a current interactive item for selection.

The method may further include presenting markers in the display region for guiding movement of the pointer to a desired interactive item. The markers may be indications of interactive items which can be reached, and movement substantially towards a particular marker causes the desired interactive item to eventually become the current interactive item for selection.

One of the first predefined direction and first predefined axis or the second predefined direction and second predefined axis may be a z-axis or include movement in the z-axis. The z-axis may extend substantially normally above an x-y plane of the control region or the display region.

The invention extends to an electronic device having a user interface, comprising:

a control component for providing a control region in the user interface;

a display component for displaying a plurality of interactive items in a display region of the user interface;

a tracking component for tracking the position and movement of a pointer in the control region; and a pointing processing component configured to:

responsive to detecting movement of the pointer along a first predefined axis or in a first predefined direction only, interpreting the movement as focus pointing and causing focus pointing to be performed in relation to the interactive items in the display region;

responsive to detecting movement of the pointer along a second predefined axis or in a second predefined direction only, interpreting the movement as view pointing and causing view pointing to be performed in relation to the interactive items in the display region; and responsive to detecting movement of the pointer having components of movement along both the first predefined axis and the second predefined axis or in both the first predefined direction and the second predefined direction, causing both focus pointing and view pointing to be substantially simultaneously performed in respect of the interactive items in the display region.

A further feature provides for the electronic device to include a display region updating module for dynamically updating interactive items displayed in the display region based on the movement or position of the pointer.

Still further features provide for the electronic device to include a primary interactive item allocation component for, based on the position of the pointer on the first predefined axis, designating an interactive item as a primary interactive item; and for the primary interactive item allocation component to be configured to update the primary interactive item according to the position and movement of the pointer along the first predefined axis.

Yet further features provide for the electronic device to include an attribute tool component for determining attributes of the interactive items on the display; for the attribute tool component to include an attribute sequence axis component configured to facilitate correlation of an attribute sequence axis with the second predefined axis so that a position and/or movement of the pointer along the second predefined axis may be interpreted as a position and/or movement of the pointer on the attribute sequence axis; for the attribute tool component to be configured to cooperate with the display region updating module to dynamically update interactive items according to the position or movement of the pointer along the attribute sequence axis.

In at least one embodiment, the sequence axis component is configured to combine a variety of signals received from the control region into an integrated signal, the integrated signal representing a position along the attribute sequence axis. The signals may be a system state, a user input, or a value derived therefrom. An example of system state is time, examples of user input is cursor position, button state, swipe state, touch state or the like, while an example of a value that may be derived therefrom include speed or polar coordinates. Based on the value of the integrated signal, the attribute tool will determine a value for the various attributes.

Further features provide for the pointer processing component to be configured to, in response to recognising a predetermined movement of the pointer on the second predefined axis, modify the correlation between the attribute sequence axis and the second predefined axis.

A still further feature provides for the electronic device to include a lens component associated with the pointer and/or mapped to the first predefined axis and/or the second predefined axis, the lens component configured such that interactive items in the vicinity of a pointer position along the first predefined axis and/or the second predefined axis may be enlarged or made visible according to attributes of the lens function.

Yet further features provide for the control component to include a scroll component configured to, responsive to movement of the pointer along the first predefined axis, cause a subset of interactive items displayed on the display to be updated by scrolling, thereby removing an interactive item from one end of the subset of interactive items at substantially the same time as adding an interactive item to an opposite end of the subset; and configured to, responsive to movement of or locating of the pointer in a scroll region, facilitate scrolling through the plurality of interactive items by updating the subset of interactive items on the display.

Further features provide for the electronic device to include a selection component for, responsive to receiving a signal indicating that a selection mode is to be entered, entering a selection interaction mode providing a conventional GUI state wherein focus pointing and view pointing are distinct actions which cannot be simultaneously performed.

Still further features provide for the electronic device to include a pointing continuation component configured to, responsive to focus pointing being performed immediately before the pointer is removed from the display, continue to perform focus pointing at a continuously reducing rate until no more focus pointing occurs; and to, responsive to view pointing being performed before the pointer is removed from the display, continue to perform view pointing in at a continuously reducing rate until no more focus pointing occurs.

The user interface may be a coordinate dependent or coordinate independent interface. In the case where the user interface is coordinate independent, interactive items may be displayed and updated during scrolling and/or zooming based at least partially on logical relations between interactive items and user input which are encoded through causal relations.

BRIEF DESCRIPTION OF THE DRAWINGS

The invention will now be described, by way of example only, with reference to the accompanying representations in which.

DETAILED DESCRIPTION WITH REFERENCE TO THE DRAWINGS

Embodiments described herein provide an electronic device having a user interface, and method of interacting with interactive items in a user interface. Whereas in a conventional graphical user interface (GUI), a pointer may be moved solely to change the position of the pointer in relation to interactive items, embodiments described herein enable a user to move the pointer so as to essentially effect a change in interactive item behaviour.

Figure 1:
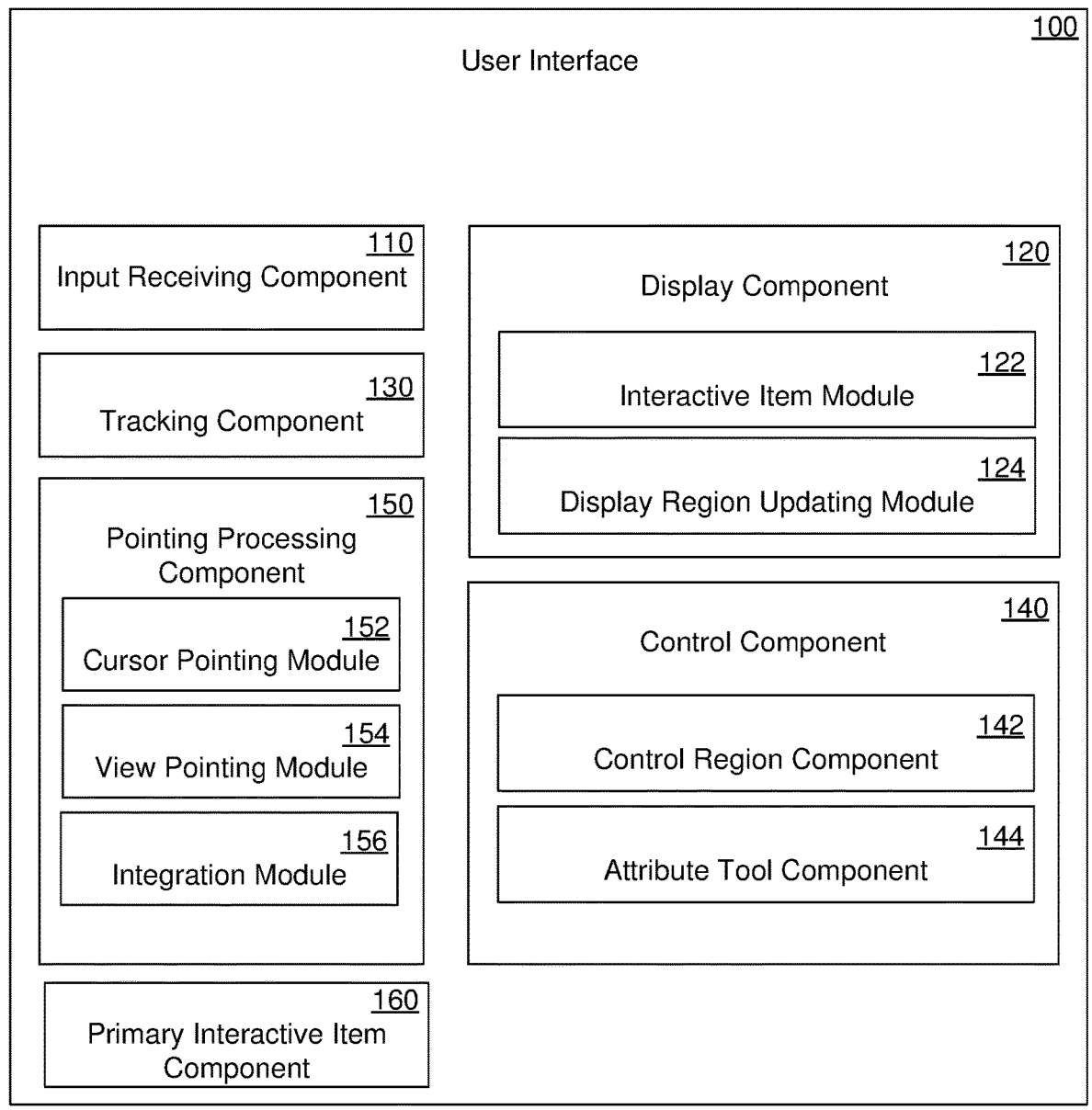
FIG. 1 is a block diagram illustrating logical components of an embodiment of an electronic device that includes a user interface.

Logical components of an embodiment of an electronic device that has a user interface (100) are illustrated in FIG. 1. These logical components are representations of functional modules that comprise computer-executable instructions, data structures, program modules and other data, and are provided by a computer readable medium of the electronic device having stored program code executable by a processor of the electronic device. The electronic device may be a mobile phone, personal computer, a handheld or tablet computer, a television, a gaming controller or the like.

The electronic device includes an input receiving component (110) for receiving user input, a display component (120) for displaying a plurality of interactive items in a display region, and a tracking component (130) for tracking the position and movement of a pointer in a control region. The display component (120) may include an interactive item module (122) for displaying the interactive items, and a display region updating module (124) for dynamically updating interactive items displayed in the display region based on the movement or position of the pointer. A primary interactive item component (160) is provided for designating an interactive item in the display as a primary interactive item.

The control region is provided by a control component (140) which may include a control region component (142) and an attribute tool component (144). The user interface (100) further includes a pointing processing component (150) which may include a focus pointing module (152), a view pointing module (154), and an integration module (156).

Figure 2:
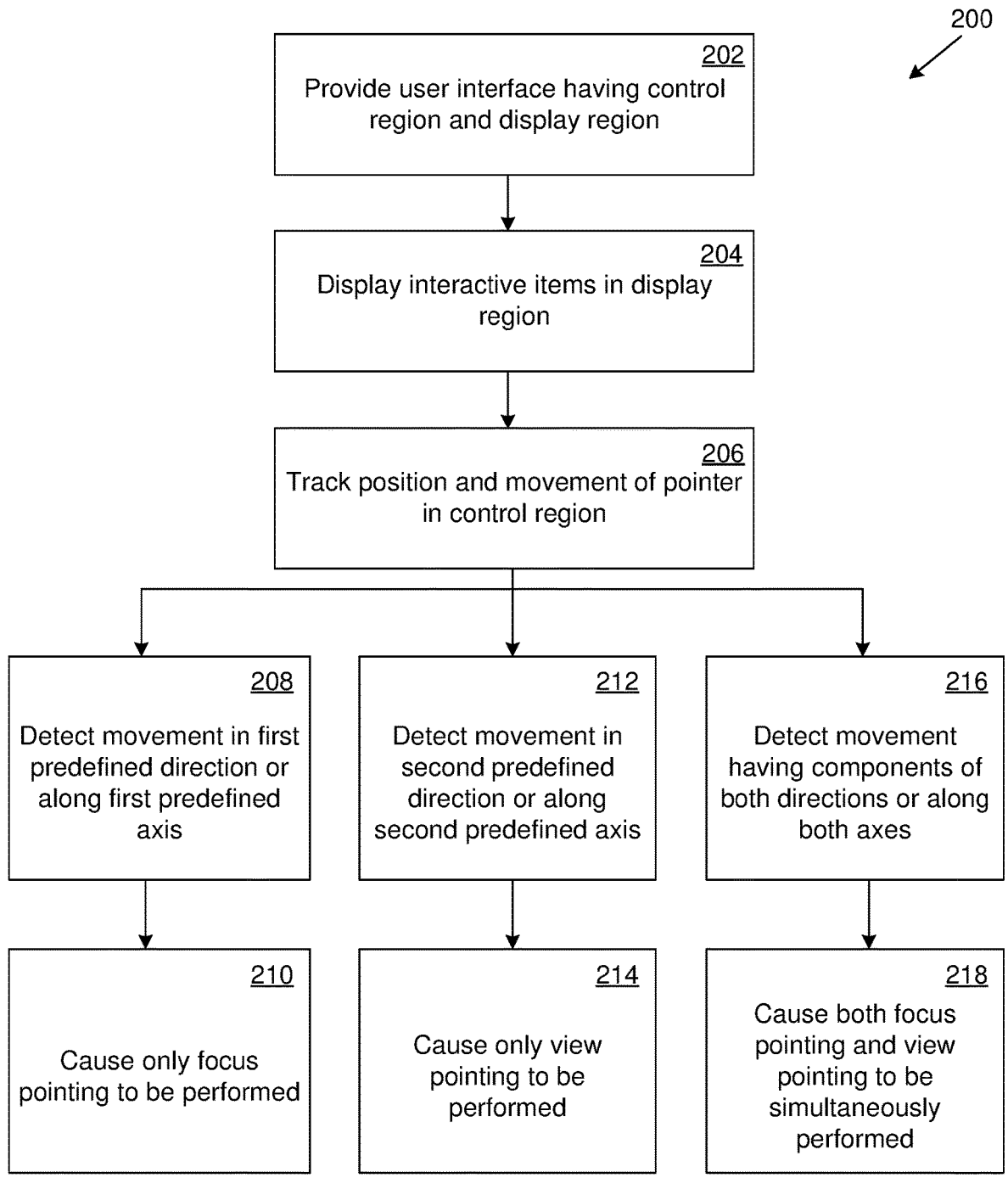
FIG. 2 is a block diagram illustrating steps performed in a method of interacting with interactive items in a user interface.

The user interface (100) is configured to provide an integrated focus pointing and view pointing mechanism. The block diagram (200) of FIG. 2 illustrates a method of view pointing and focus pointing using the user interface (100) of FIG. 1.

At a first stage (202), a user interface (100) is provided which has a control region and a display region associated therewith. A plurality of interactive items are displayed in the display region at a next stage (204). The interactive items may include one or more of information elements, objects, actions, applications and events which can be selected by a user. The interactive items may, in some embodiments, be arranged in a hierarchical item structure such that view pointing causes navigation through different levels of the hierarchical item structure. The list of interactive items may also be arranged in graph structure such that the items are the nodes that are connected by edges which may or may not be directed and/or weighted.

The control region may be either a two-dimensional or a three-dimensional region. In some embodiments, the control region is a touch-sensitive region of an electronic device. The display region is typically a display of an electronic device providing the user interface (100). The control region may include the display region, for example, in cases where the method is carried using a touch-sensitive display of an electronic device such as a mobile phone, tablet computer, television, or the like.

The user interface (100) then, at a next stage (206), tracks the position and movement of a pointer in the control region. The pointer is a pre-defined or system-defined interaction point, which provides a focus point or focus area. The pointer may be a cursor provided by the user interface, a pointing tool which interacts with the control region of the user interface, or a part of the body of the user which interacts with the control region of the user interface. In embodiments in which the display region and control region are a touch-sensitive display, the pointer may be the finger or fingers of the user. Based on the position of the pointer, the primary interactive item component (160) may allocate an interactive item on the display as a primary interactive item.

The tracking component (130) tracks the position and movement of the pointer, which may then be analysed using the control component (140) and/or the pointing processing component (150), as will be described in greater detail below.

The focus pointing module (152) of the pointing processing component (150) may be configured to, responsive to the user interface (100) detecting movement of the pointer in a first predefined direction or along a first predefined axis only at one stage (208), interpret the movement as focus pointing and cause focus pointing to be performed in relation to the interactive items in the display region at a further stage (210). The primary interactive item component (160) may update the primary interactive item based on the movement of the pointer in the first predefined direction or along the first predefined axis during this step.

The view pointing module (154) may be configured to, responsive to the user interface (100) detecting movement of the pointer in a second predefined direction or along a second predefined axis only at one stage (212), interpret the movement as view pointing and cause view pointing to be performed in relation to the interactive items in the display region at a further stage (214). View pointing may include enlarging or shrinking items, changing the scale of interactive items, navigating a hierarchy of interactive items, and/or implementing other attributes mapped to the second predefined axis, as will be described in greater detail below.

Further, the integration module (156) may be configured to, responsive to the user interface (100) detecting movement of the pointer having components of movement in both the first predefined direction and the second predefined direction or along both the first predefined axis and the second predefined axis at one stage (216), cause both focus pointing and view pointing to be substantially simultaneously performed in respect of the interactive items in the display region at a further stage (218).

In this way, the user interface (100) is capable of providing seamless focus pointing and view pointing in the display region when the pointer is moved in one or both of the first predefined direction and second predefined direction or along one or both of the first predefined axis and second predefined axis, without requiring a distinct signal from the user to switch between a focus pointing and a view pointing mode.

The attribute tool component (144) may provide one or more control-display functions which are used to adapt a control-display ratio or rate according to movement or position of the pointer. The functions may be defined along an attribute sequence axis provided by an attribute sequence axis component. The attribute sequence axis may be mapped to the second predefined axis, such that the position or movement of the pointer along the second predefined axis may be interpreted as a position or movement along the attribute sequence axis. This may allow a value or values of the one or more functions at that particular position on the attribute sequence axis to be used to determine the attributes of interactive items based on the position and/or movement of the pointer on the second predefined axis. The functions may include a enlarging or shrinking function for determining the size of interactive items, a scale function for changing the scale of interactive items in relation to one another, a hierarchy function for determining when a hierarchy is expanded or collapsed, and the like. The pointer processing component (150) may be configured to, in response to recognising a predetermined movement of the pointer on the second predefined axis, modify the correlation between the attribute sequence axis and the second predefined axis.

Further, a lens function may be mapped to the pointer and/or to the first predefined axis and/or the second predefined axis. Interactive items corresponding to a pointer position along the first predefined axis and/or the second predefined axis may be enlarged or made visible according to a value, strength or range of the lens function. These aspects will be described in greater detail in the exemplary implementations below.

FIGS. 3A to 3E are screenshots of a display (300) illustrating a first exemplary implementation of a user interface. In this embodiment, the user interface is provided on an electronic device such as a mobile phone or a tablet computer of a user, and the display region (302) is a touch-sensitive display of the electronic device, which also provides the control region (304). A pointer (306) is displayed as a dot in the display region (302), and the user is capable of moving the pointer (306) around in the display region (302) through appropriate movements against the touch-sensitive display. In some embodiments, the pointer is dragged in one continuous motion, while in other embodiments the user may, for example, lift its finger up from the control region without affecting the interactive items displayed.

Figure 3A:
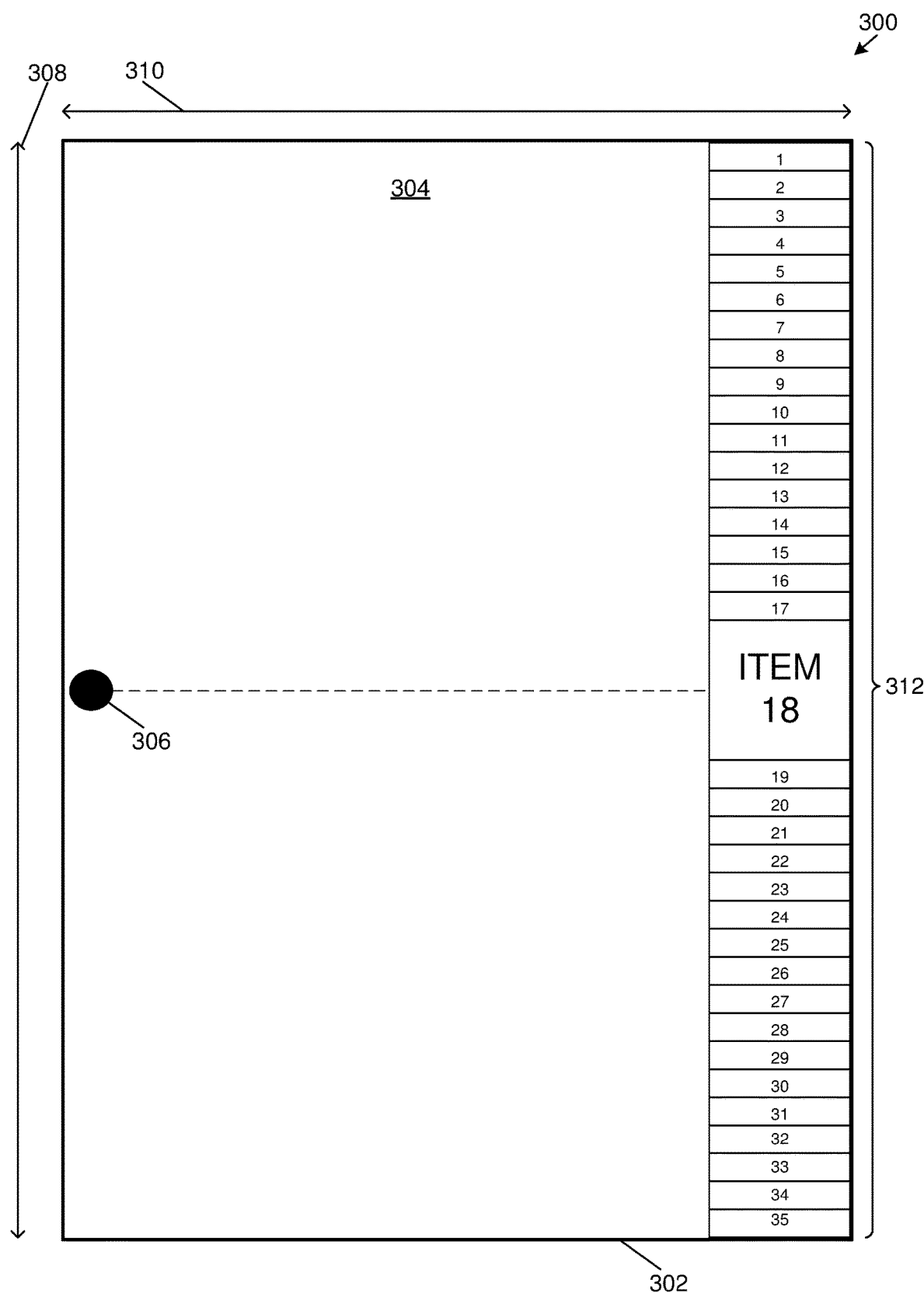
FIGS. 3A to 3E is a schematic illustration of a first exemplary method of interacting with interactive items in an embodiment of a user interface.

In this embodiment, the first predefined axis is a vertical axis (308) of the control region (304) and the second predefined axis is a horizontal axis (310) of the control region (304). Movement in the first predefined direction, in this example, refers to movement upwards and downwards along the vertical axis (308), while movement in the second predefined direction refers to movement to the left and to the right along the horizontal axis (310). These components and orientations are best illustrated in FIG. 3A.

A plurality of interactive items (312) available for selection by the user are vertically arranged in the display region (302). The interactive items may, for example, be items in a media library such as music albums, a folder structure created by the user, or any other suitable data structure to be navigated.

In this embodiment, movement of the pointer (306) along the horizontal axis (310) towards and away from the interactive items (312) causes view pointing, movement of the pointer along the vertical axis (308) causes focus pointing, and movement having components of direction along both axes (308, 310) causes focus pointing and view pointing to be simultaneously performed.

In the example of FIGS. 3A to 3E, movement along the horizontal axis (310) towards the interactive items (312) causes, among other things, enlarging and scaling of the interactive items to be performed, and movement along the horizontal axis (310) away from the interactive items causes, among other things, shrinking and scaling to be performed. These aspects will now be described in greater detail by reference to a series of steps shown in FIGS. 3A to 3E.

FIG. 3A illustrates a starting position of the pointer (306). For exemplary purposes, 35 interactive items are shown which can be selected by the user. It is foreseen that the technique described herein may be useful when an item is to be selected from a relatively large number of options, such as 100, 200, 300 or more.

Figure 3B:
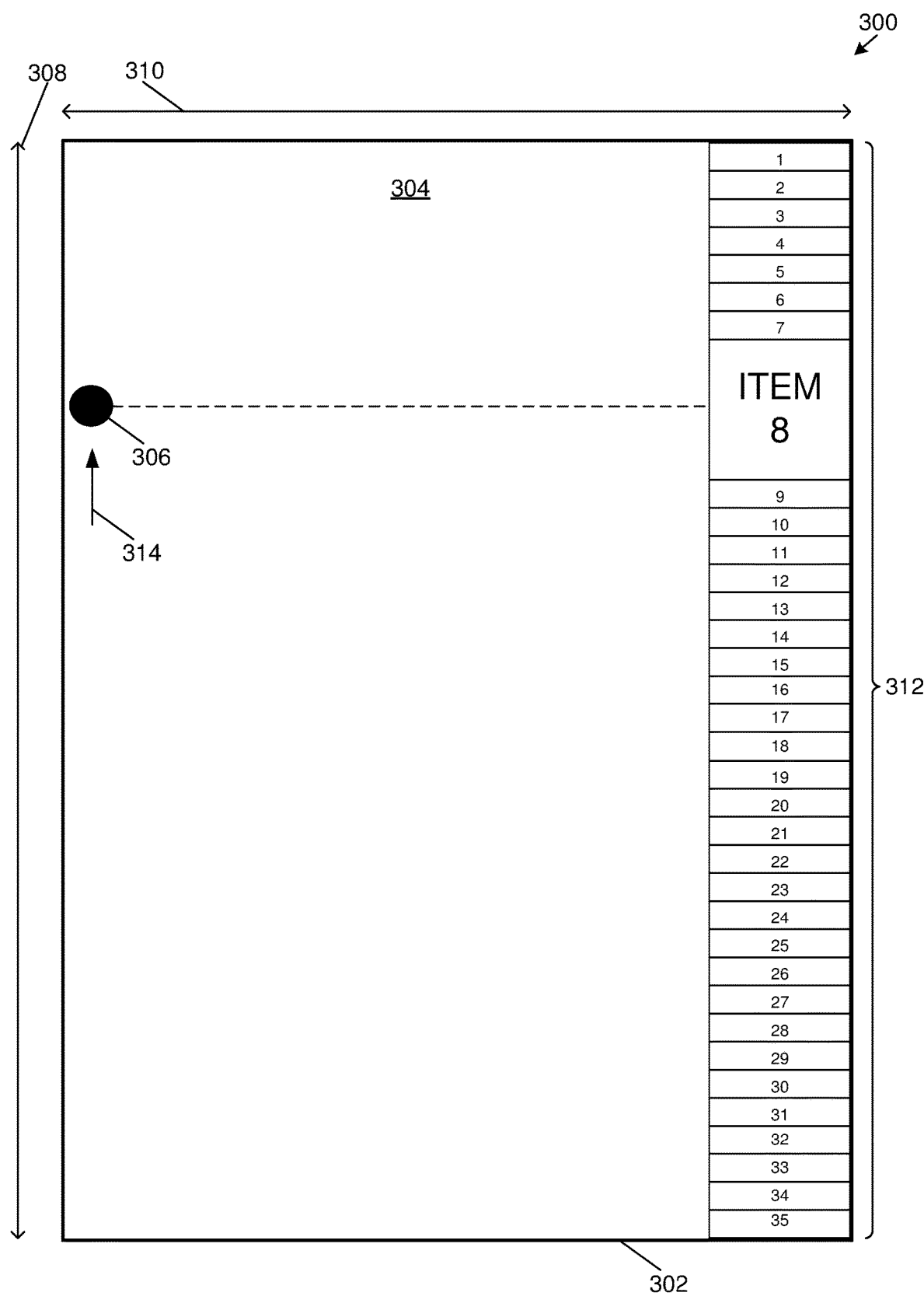

When moving the pointer (306) only along the vertical axis (308), focus pointing is performed, as shown by the directional arrow (314) in FIG. 3B. In this embodiment, focus pointing allows the pointer (306) to be moved in relation to the interactive items (312) without adding or removing interactive items from the display region (302). In this embodiment, and to aid the user, a primary interactive item is dynamically enlarged, and the other interactive items are shrunk based on the position and movement of the pointer (306) along the vertical axis (308). As shown in FIGS. 3A and 3B, the pointer (306) is moved upwards along the vertical axis (308) such that the primary interactive item changes from "ITEM 18" to "ITEM 8".

In this embodiment, moving the pointer (306) purely along the vertical axis (308) does not cause any element of view pointing. Therefore all of the interactive items (312) shown in FIG. 3A, namely "1" to "35", remain in the display region in FIG. 3B.

If a target interactive item is not visible in the display region (302) or if the target interactive item is visible but the user wishes to enlarge it or change its properties in some other way, zooming needs to be performed.

When the pointer (306) is moved along the horizontal axis (310), view pointing in the form of zooming is caused. In this embodiment, the interactive items displayed in the display region (302) are dynamically updated based on the movement of the pointer (306) in the horizontal axis (310). If the pointer (306) is moved closer to the interactive items (312), the number of interactive items are decreased by zooming in and scaling is performed, and if the pointer (306) is moved away from the interactive items (312), the number of interactive items are increased and zooming out is performed. Additionally, zooming involves enlarging one or more of the interactive items and/or shrinking one or more of the interactive items based on the position and movement of the pointer (306).

Figure 3C:
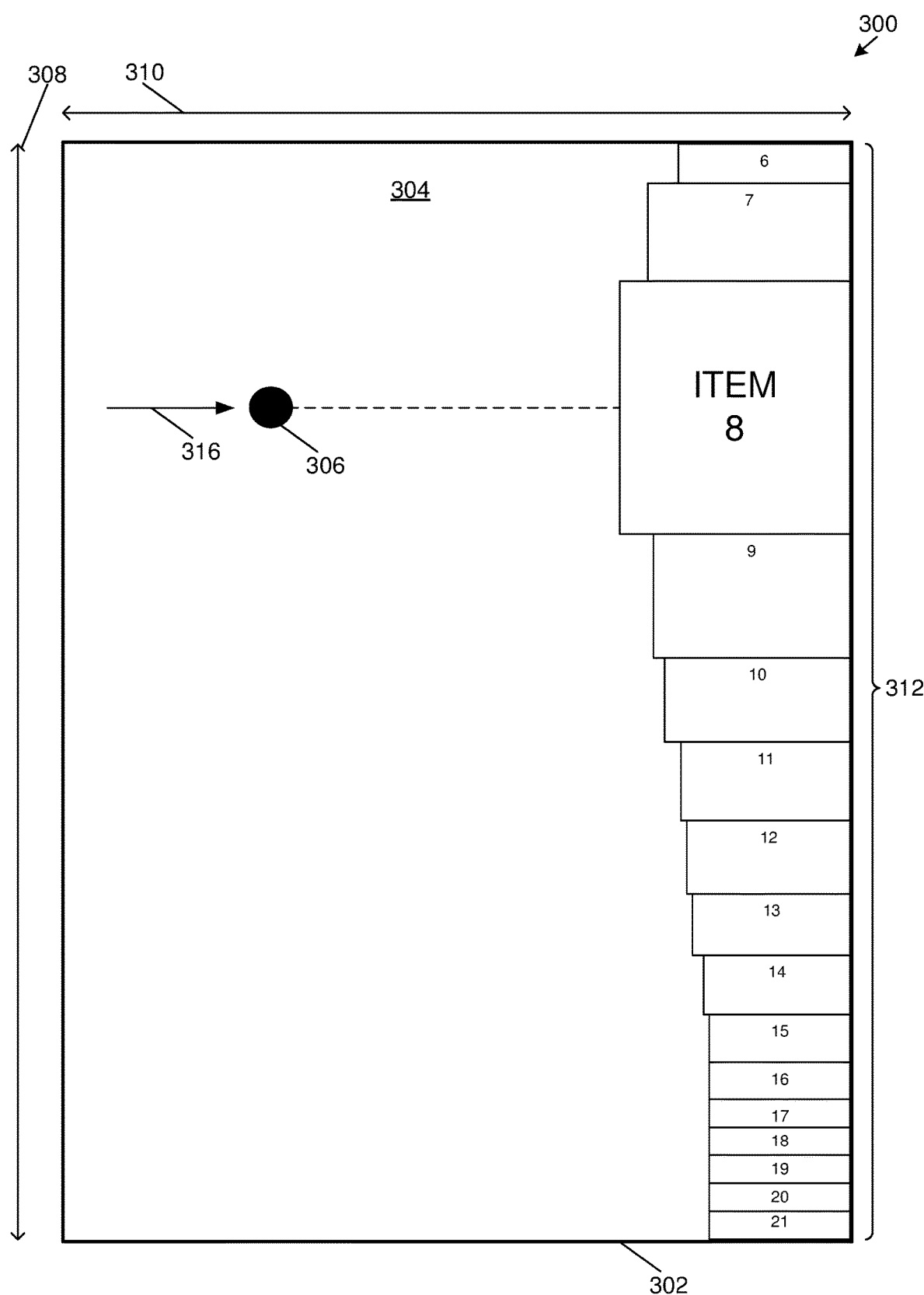

FIG. 3C illustrates the effect of zooming when the pointer (306) is moved towards the interactive items (312) as indicated by the directional arrow (316). Fewer interactive items are displayed at this stage shown, in other words, only "6" to "21" are now visible, whereas "1" to "35" were visible before view pointing when the pointer (306) was positioned further away from the interactive items (312). Furthermore, the interactive items to which the pointer (306) is being moved are greatly enlarged, while the other interactive items are shown in a smaller form, in an attempt to account for the intention shown by the movement of the user.

Moving the pointer (306) purely along the horizontal axis (310) does not cause focus pointing. Therefore the primary interaction item, "ITEM 8", does not change when moving the pointer (306) from the position shown in FIG. 3B to the position shown in FIG. 3C.

The interactive items populating the display region (302) and the manner in which the interactive items are displayed at a given point in time may be controlled by a number of control-display functions, and a control-display ratio or rate may be adapted to control and display the interactive items in the display region (302) according to movement or position of the pointer. An attribute tool may be provided to configure the control-display functions, and is described in more detail below.

For example, a zooming function and/or a scaling function may be defined so as to dynamically change the manner in which zooming and/or scaling is applied to interactive items as the pointer is moved in relation thereto. Furthermore, to facilitate acquisition of the target interactive item, control-display ratio adaptation and/or control-display rate adaptation may be implemented. The control-display ratio defines the distance the pointer has to cover in the physical world to move the pointer in the display region by a given distance. A typical control-display ratio adaptation is so-called "pointer acceleration". Also, the rate at which interactive items are displayed in relation to the rate of movement of the pointer may also be adjusted.

Figure 3D:
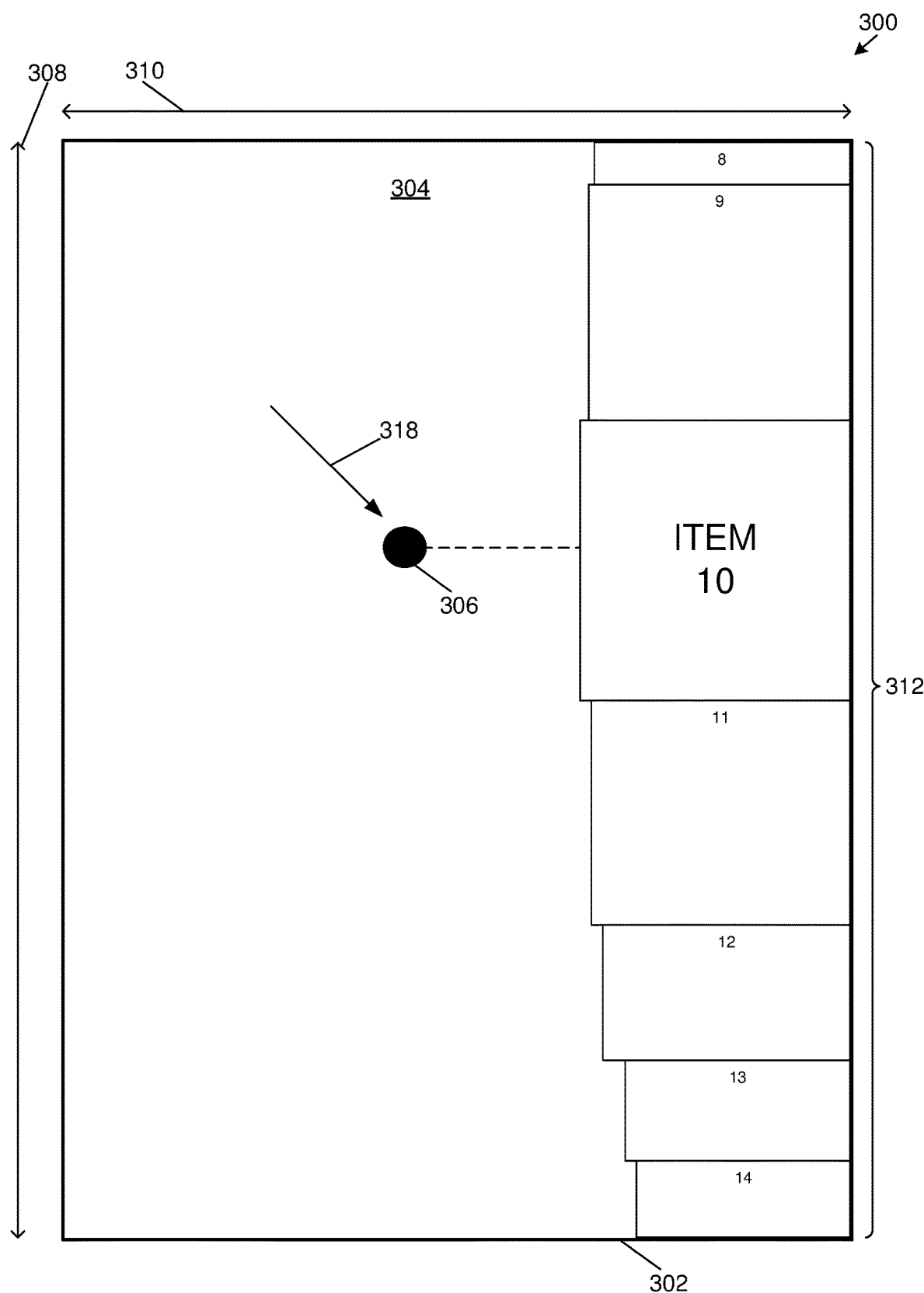
Figure 3E:
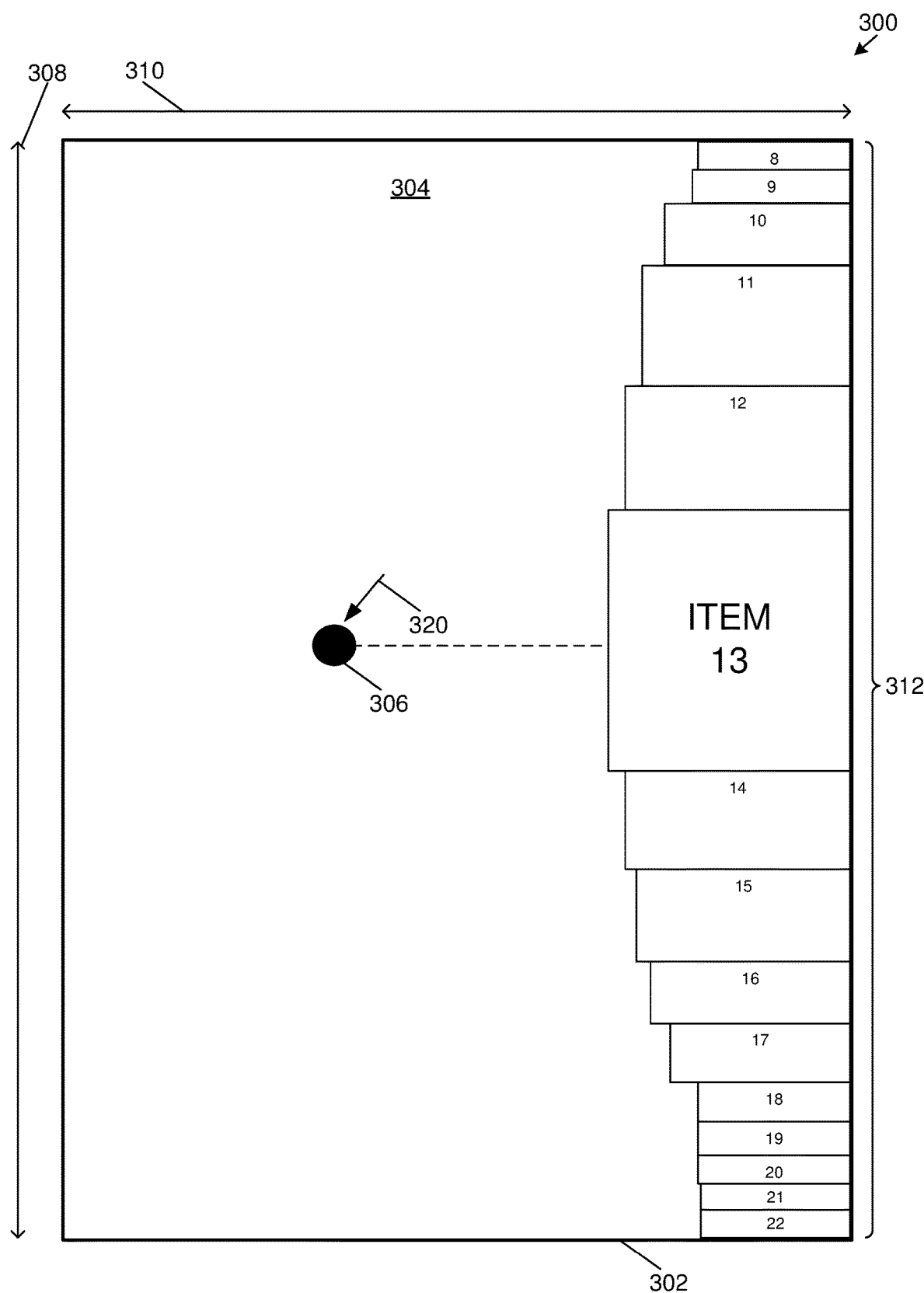

Turning to FIG. 3D, the user may wish to simultaneously perform focus pointing and view pointing in the form of zooming. To achieve this, focus pointing and view pointing are integrated when the pointer (306) is moved in a direction having components along both the horizontal (310) and the vertical (308) axes. FIG. 3D indicates the manner in which focus pointing and view pointing are carried out at the same time when the pointer (306) is moved in the direction shown by the directional arrow (318).

The movement of the pointer (306) in the indicated direction (318) results in both focus pointing, in other words a change in the primary interactive item, and zooming, in other words an adjustment in the number of interactive items shown, the position and scale of the interactive items, and the like. Using this technique, a user may essentially "zoom into" and select a target interactive item through an integrated focus pointing and view pointing mechanism. The user may, for example, continue movement in the direction of the directional arrow (318) of FIG. 3D to ultimately select "ITEM 11".

It should be appreciated that focus pointing need not always change the current item for selection. Focus pointing may simply change the position of the pointer in the display region and/or may make new interactive items visible, thereby including scrolling through a number of interactive items currently displayed in the display region. In this specific embodiment, this change in position also influences the primary interactive item.

The user may wish to adjust the display region (302) such that a target interactive item becomes visible for selection. For example, when in the position of FIG. 3D, the user may wish to select "ITEM 20", which cannot be selected by moving closer to the interactive items. In such a case, the pointer (306) is moved back along the horizontal axis (310) and also downwards along the vertical axis (308), as indicated by the directional arrow (320) of FIG. 3E.

This movement once again causes both focus pointing and view pointing to be performed simultaneously, and "ITEM 20" becomes visible in the display region (302) as a result of zooming out. The pointer (306) can then simply be moved toward the target interactive item in the same movement in order to ultimately select it. It should be appreciated that the user is not required to firstly enter a view pointing mode and zoom, scroll or pan until the target interactive item becomes visible, before entering a different mode to move the pointer to and select the item. In one embodiment, the user may simply move its finger along a touch-sensitive display until it reaches the item, and then lift the finger up in order to select the item or tap to select the item. In this way, view pointing to locate an item, focus pointing to locate a pointer on the item, and selecting the item can be integrated and the user can select a target item in one motion without requiring a number of "point and click" repetitions.

It should be appreciated that the pointer may not be visible or shown in the display region in some embodiments, and the user may navigate to a target item simply through finger movements. The user may in some embodiments drag his or her finger along the touch-sensitive display and select a target interactive item, or may simply lift up his or her finger at a certain stage and place it at a desired point on the touch-sensitive display so as to select an interactive item which has been brought into a desired position using the technique described.

FIGS. 4A to 4D are screenshots of a display (400) illustrating a second exemplary implementation of a user interface. The user interface of this embodiment is similar to the user interface described with reference to FIGS. 3A to 3E, and like reference numerals refer to like components and orientations.

Figure 4A:
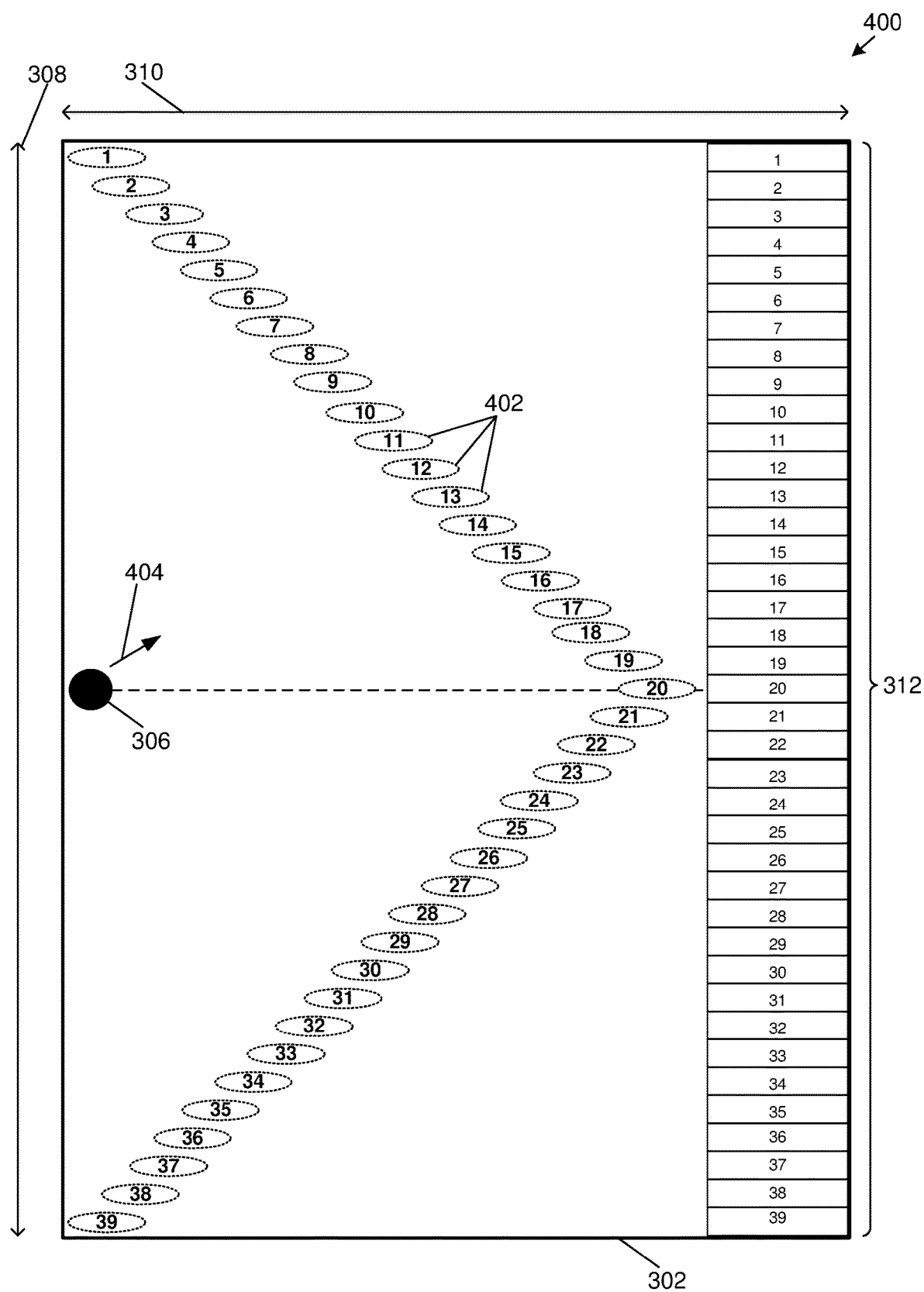
FIGS. 4A to 4D is a schematic illustration of a second exemplary method of interacting with interactive items in an embodiment of a user interface.
Figure 4B:
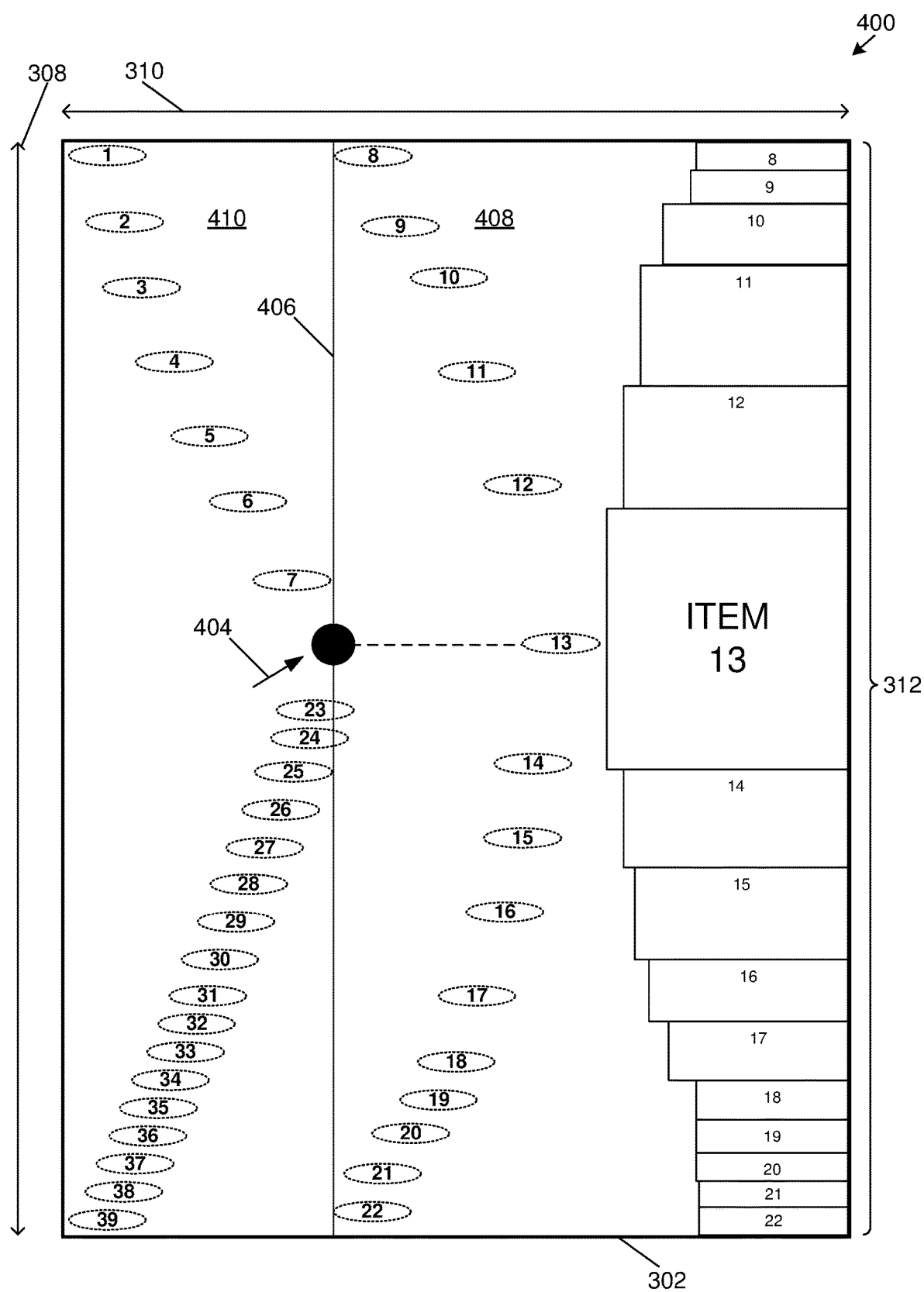

In this embodiment, however, the user is guided by visual markers (402) which are presented in the display region (302) for guiding movement of the pointer (306) to a desired interactive item, as shown in FIGS. 4A and 4B. In this embodiment, the markers (402) are indications of interactive items which can be reached, and movement substantially towards a particular marker (402) eventually causes the desired interactive item to become the current item for selection.

When the pointer (306) is moved from a starting position in the direction indicated by the directional arrow (404) to the position shown in FIG. 4B, the markers are dynamically updated.

A vertical time axis (406) is generated, and markers to items which can be reached by moving towards the interactive items (312) are shown in a future region (408), while markers to items which can be reached by moving in the opposite direction are shown in a past region (410). For example, if the user wishes to select "ITEM 9", which is visible in the display region (302) in FIG. 4B, the pointer (306) must be moved towards the interactive items (312) and upwards in the direction of the marker indicating "9". Contrastingly, if the user wishes to select "ITEM 2", which is not in the display region (302) in FIG. 4B, the pointer (306) must be moved away from the interactive items (312) and in the direction of the marker indicating "2" such that "ITEM 2" becomes visible in the display region (302).

Figure 4C:
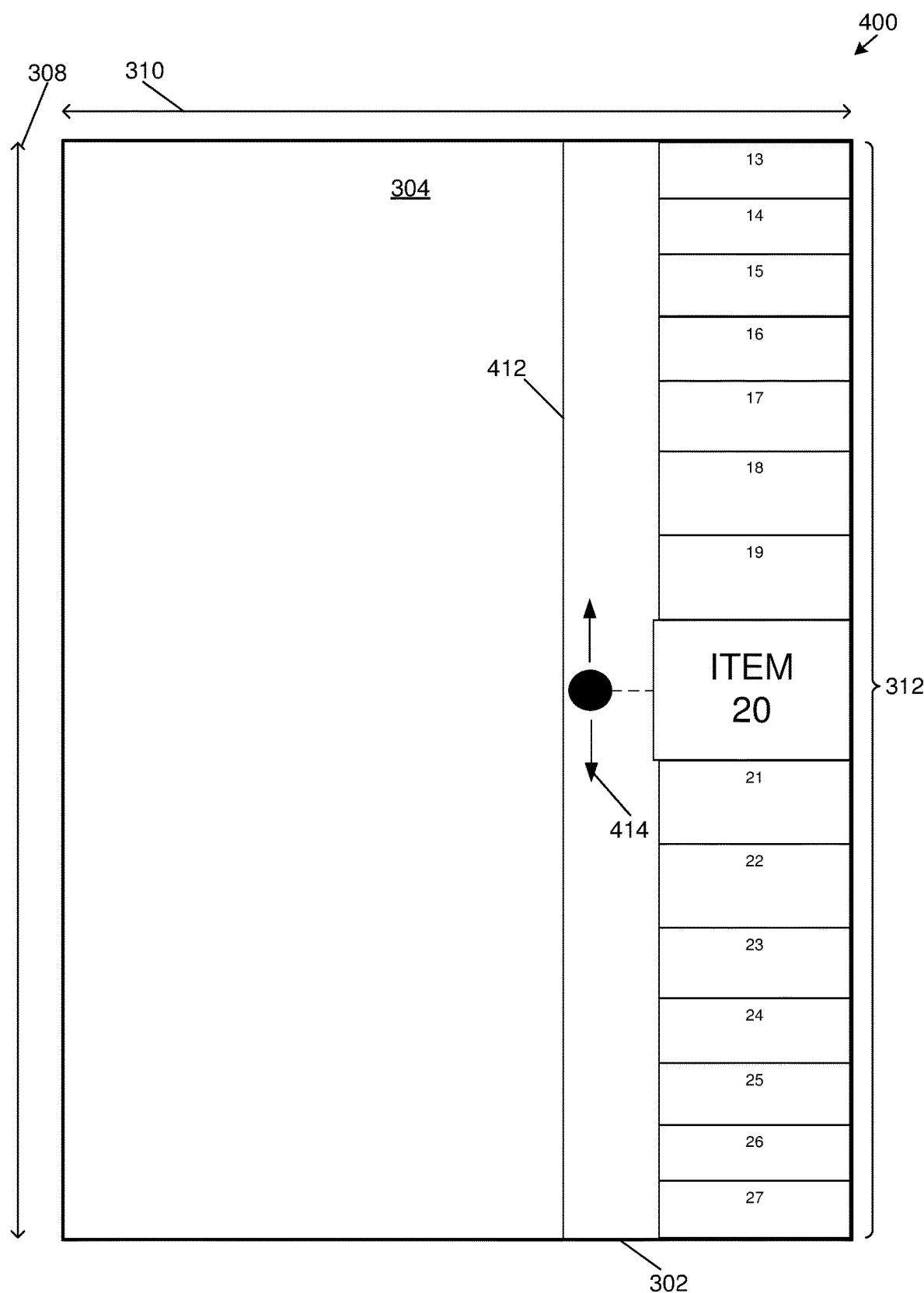

In this embodiment, the integrated focus pointing and view pointing state as described herein, is combined with a conventional graphical user interface (GUI) state wherein they are distinct actions. FIG. 4C illustrates a scrolling threshold (412) which extends vertically across the display region (302). Once the pointer (306) is moved past the scrolling threshold (412), a scrolling mode is entered wherein movement along the vertical axis causes scrolling in relation to the interactive items (312). The scrolling mode allows the user to move the pointer in the directions indicated by the directional arrow (414) in FIG. 4C to bring interactive items not currently shown in the display region (302) into view. When in the scrolling mode, view pointing in the form of zooming is not performed when moving along the horizontal axis.

Furthermore, once a selection threshold (not shown) has been reached, a conventional GUI mode may be entered wherein scrolling and zooming are distinct modes. For example, once the pointer of FIG. 4C has been moved so as to select "ITEM 20", such a conventional mode may be entered, an example of which is illustrated in FIG. 4D.

Figure 4D:
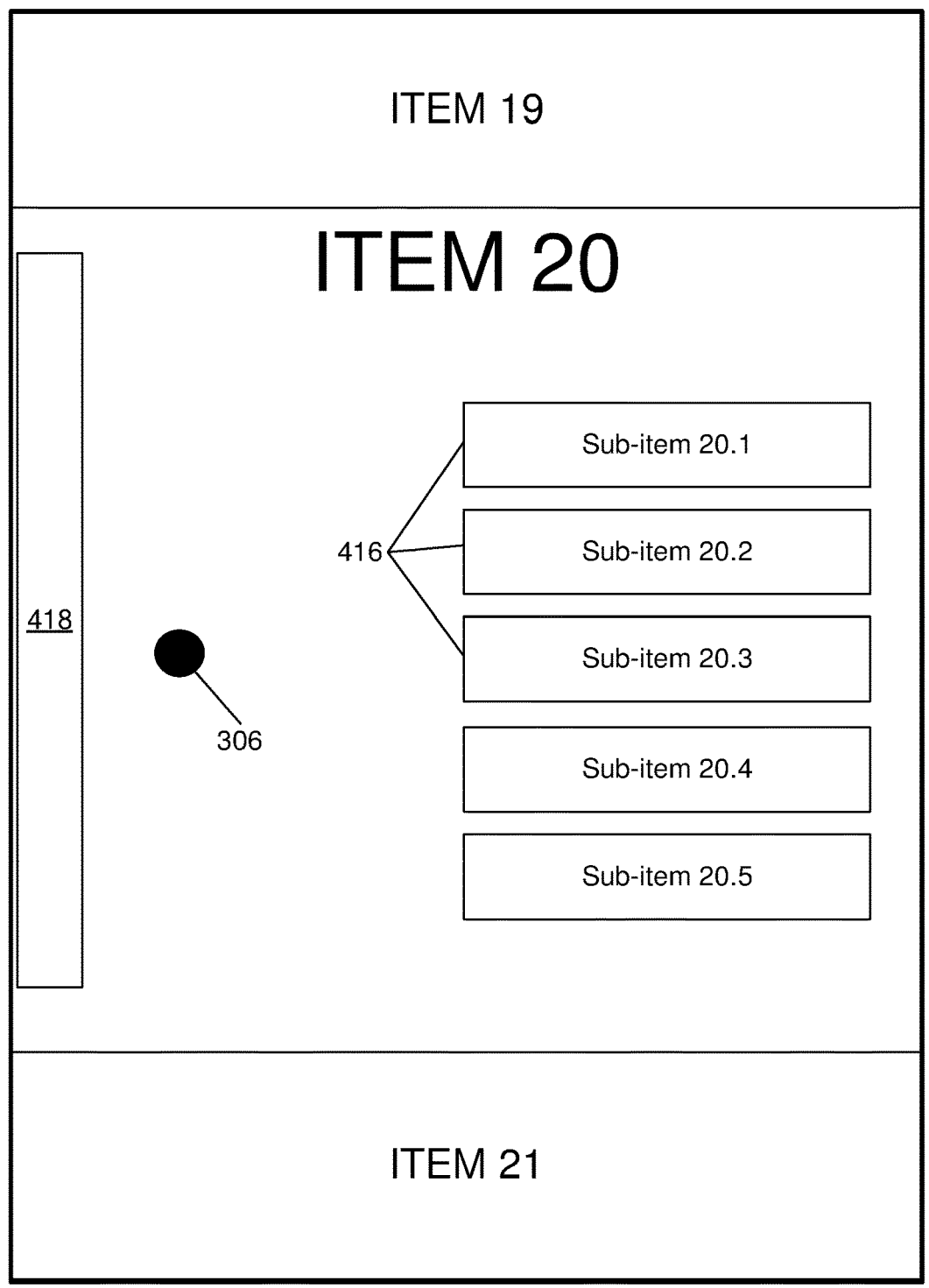

FIG. 4D shows a selection interaction mode, in which sub-items (416) of the selected interactive item may be selected in a conventional manner. Focus pointing may be used to view sub-items of other interactive items, in this case, for example, sub-items of "ITEM 19" and "ITEM 21", but in this state focus pointing and view pointing are performed in separate modes.

Any suitable signal may cause a selection interaction mode or the conventional GUI state to be entered such that focus pointing and view pointing are distinct actions which cannot be simultaneously performed. The signal indicating that a selection interaction mode or the conventional GUI state is to be entered may be a selection of an interactive item as described above, or may be provided as a distinct option to the user.

In some embodiments, a user may be permitted to switch between an integrated state wherein focus pointing and view pointing can be substantially simultaneously performed, and a conventional GUI state wherein they are distinct actions which cannot be simultaneously performed. Switching between the integrated state and the conventional GUI state may be triggered when the pointer is movement past a switching threshold and/or when an interactive item is selected. For example, the user may be permitted to move the pointer (306) back from its position in FIG. 4D to a boundary area (418), and once the boundary area (418) is entered or as the pointer (306) moves towards the boundary area, the conventional GUI state is terminated and the integrated state may once again be entered.

The user interface described therefore provides, at least in some embodiments, an ability to continuously transform between the integrated state and the conventional GUI state. The continuous transformation between the integrated and the conventional GUI state is diagrammatically illustrated in FIG. 5.

Figure 5:
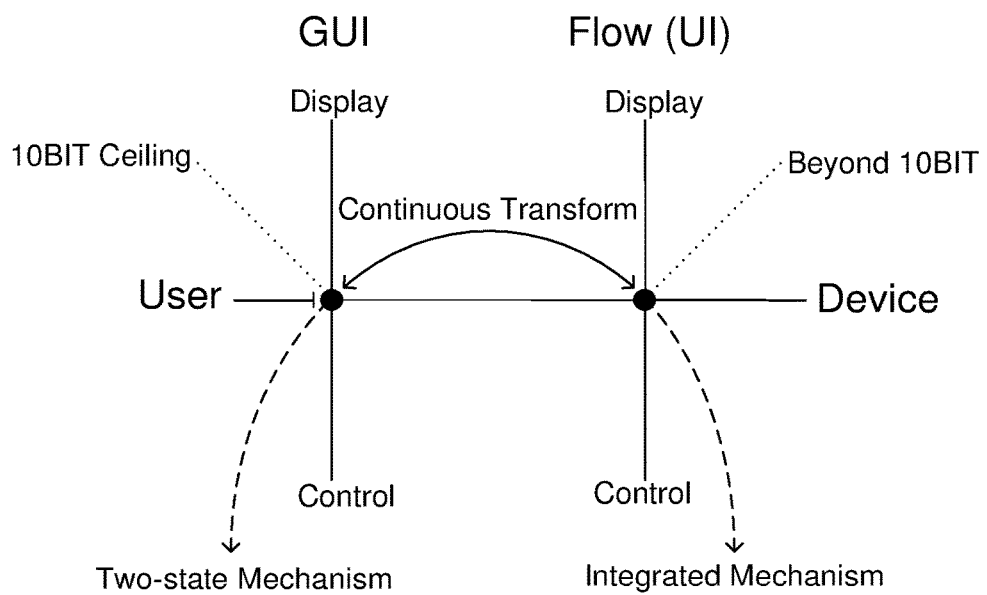
FIG. 5 is a schematic illustration of continuous transformation between an integrated focus pointing and view pointing state and a conventional GUI state provided by embodiments of a user interface described herein.
Figure 5:
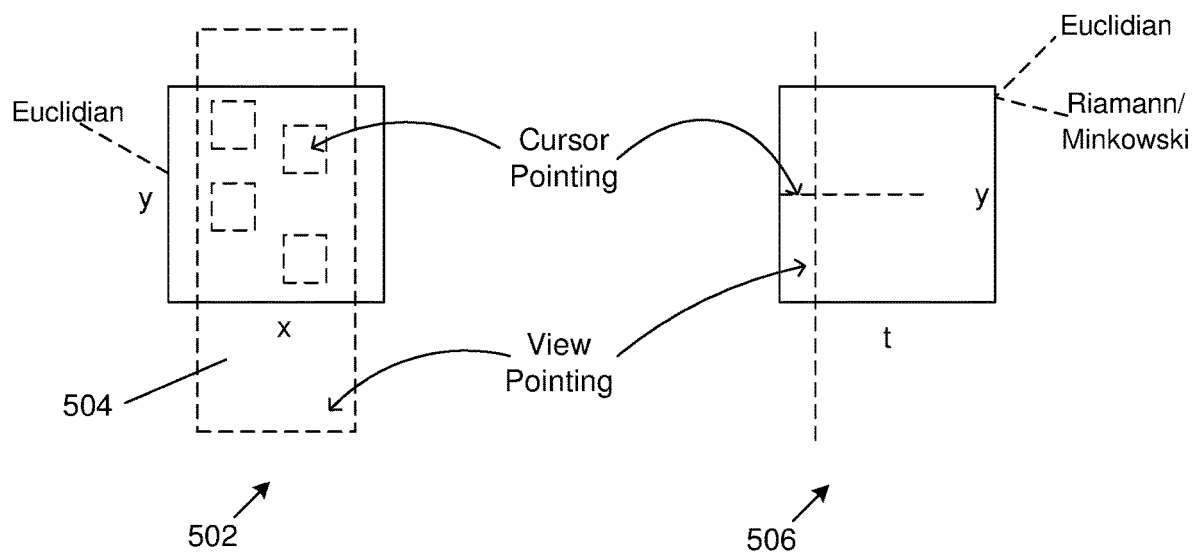

In FIG. 5, the integrated state is referred to as "Flow (UI)" as opposed to "GUI", which denotes conventional techniques in which focus pointing, wherein a target is visible in a display region of an electronic device which is provided by a user interface, and a user is capable of selecting the target by bringing a pointer to the target via focus pointing, and view pointing types such as zooming and scrolling, are separate modes.

The GUI (502) illustrated in FIG. 5 is an example of atypical user interface in which view pointing actions such as scrolling, paging, zooming and panning are distinct modes and are also separated from "point and click" focus pointing actions as described above. Examples of such interfaces are well-known touch versions of Facebook™ and Instagram™, typically operated using mobile phones, tablet computers, and the like.

In such versions, a continuous plane (504) of information may be provided that is scrolled through vertically to provide a linear view of posts, while horizontal scrolling or paging may provide additional information relating to a particular post. Further information is acquired through focus pointing by, for example, selecting "Like" buttons, "Comment" buttons and media such as images or videos.

The Flow (UI) (506) shown in FIG. 5 integrates these pointing modes. In some embodiments, focus pointing and view pointing can be simultaneously achieved through movement along two axes or dimensions, as indicated by the axes "t" and "y" in FIG. 5.

The user interface may be a coordinate dependent or coordinate independent interface, as indicated by the terms "Euclidian" and "Riemann/Minkowski" in FIG. 5. In the case where the user interface is coordinate independent, interactive items may be displayed and updated during focus pointing and/or view pointing based at least partially on logical relations between interactive items and user input which are encoded through causal relations.

Fitts's law, which models the act of pointing in target-directed movement in human computer interaction, predicts that the time required to rapidly move to a target interactive item is a function of the distance to the target and the size of the target. According to Fitts, a movement tasks' difficulty can be quantified using information theory by the metric "bits", as will be well understood by those skilled in the art.

Conventional focus pointing as described above may be restricted to 10 bit pointing difficulty tasks, whereas conventional view pointing that allows scale changes, such as panning and zooming, may accommodate pointing difficulty of beyond 30 bit.

However, in order to achieve such high values in terms of Fitts's law, techniques of human-computer interaction are often confined to high Fitts's law time index values. A contributing factor may be that view pointing and focus pointing may not be simultaneously performed, increasing the time needed to complete a target-directed movement.

By implementing an integrated technique as herein described, a user may zoom, scroll and move the pointer to select an item in a single motion, and it may be possible to move beyond the so-called "10 bit barrier" of typical GUIs as described with reference to FIG. 5, without substantially high Fitts's law time indexes. This may improve a user's experience during target-directed movement in a user interface.

One of the main contributing factors to lowering Fitts's time indexes may be the ability of the user to understand information flow in the view pointing mode. It has been found that the size of items are linked, at least to a certain extent, to the ability of the user to comprehend flow. In general, the larger the item, the quicker for the user to view. By essentially introducing time (shown as "t" in FIG. 5) as a dimension in the target-directed movement of a pointer, the integrated pointing method provided allows the user to "look ahead", and also uses control-display functions to increase item viewing size. Additionally, the user may "look back" as described with reference to FIG. 4B to potentially further reduce time index values.

The markers provided in some embodiments may allow the user to "look ahead" into the data structure to be navigated without needing to perform zooming. Moving closer to the interactive items may trigger view pointing, but does not terminate focus pointing, in other words, bringing the pointer to a target item, potentially reducing the Fitts's law time index.

The method and interface described may provide greater efficiency in human-computer interaction. By employing dynamically mapping control-display functions in the integrated state, the control-display rate may also be managed to align with the intention and information goals of the user. Conventional repetitions of "point and click" or time-consuming navigation of multiple menus and/or submenus may be significantly reduced or completely eliminated. Furthermore, the method and interface may allow for smoother and more dynamic human-computer interaction.

Figure 6A:
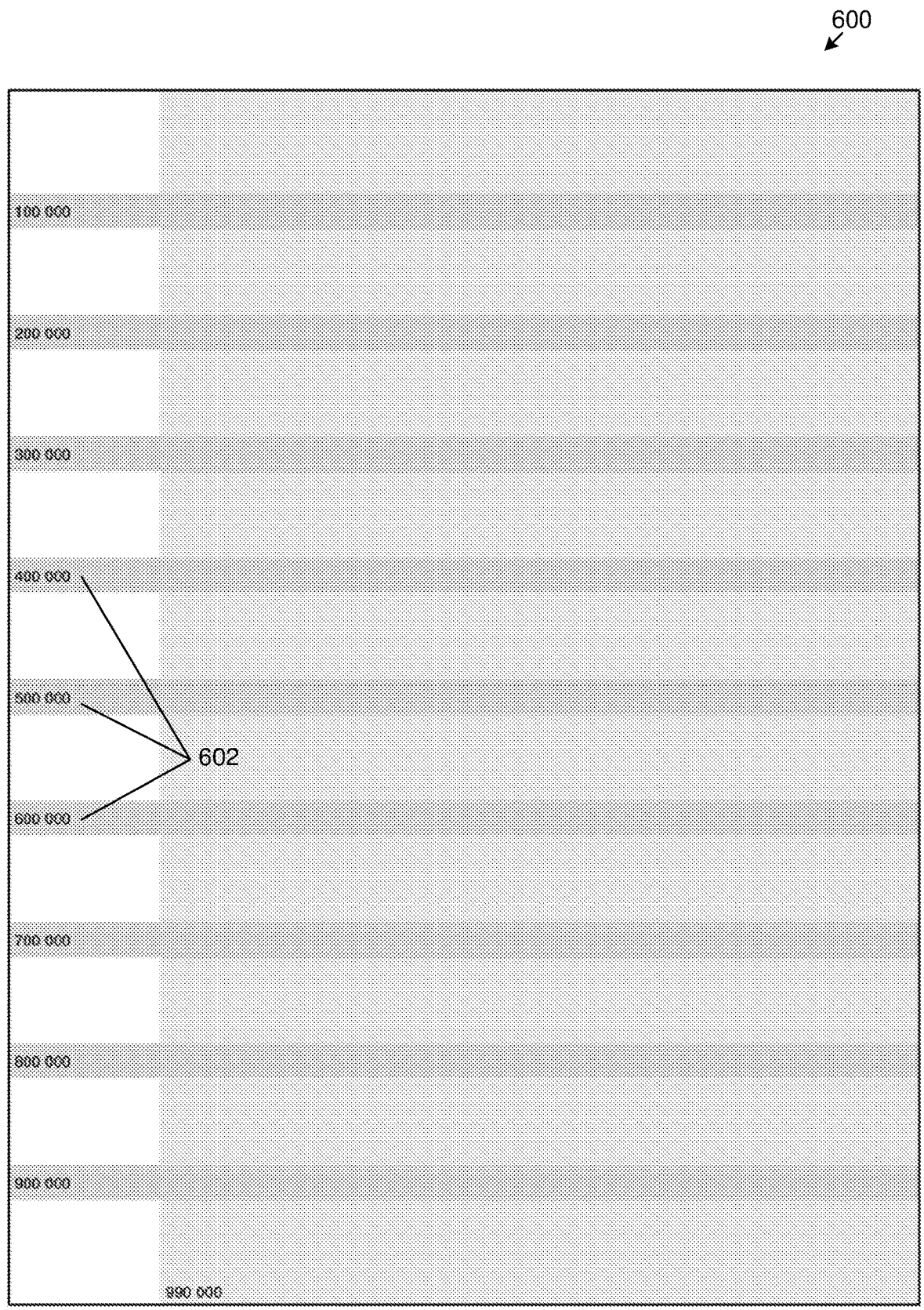
FIGS. 6A to 6H is a schematic illustration of a third exemplary method of interacting with interactive items in an embodiment of a user interface.

FIGS. 6A to 6H are screenshots of a display (600) illustrating a third exemplary implementation of a user interface. In this embodiment, there are 1,000,000 interactive items arranged in a hierarchical item structure such that view pointing in the form of zooming causes navigation through different levels of the hierarchical item structure. In FIG. 6A, a first level (602) of interactive items is visible. In order to reach a target interactive item, the pointer (604) is moved to cause focus pointing and view pointing, as shown in FIGS. 6B to 6H.

Figure 6B:
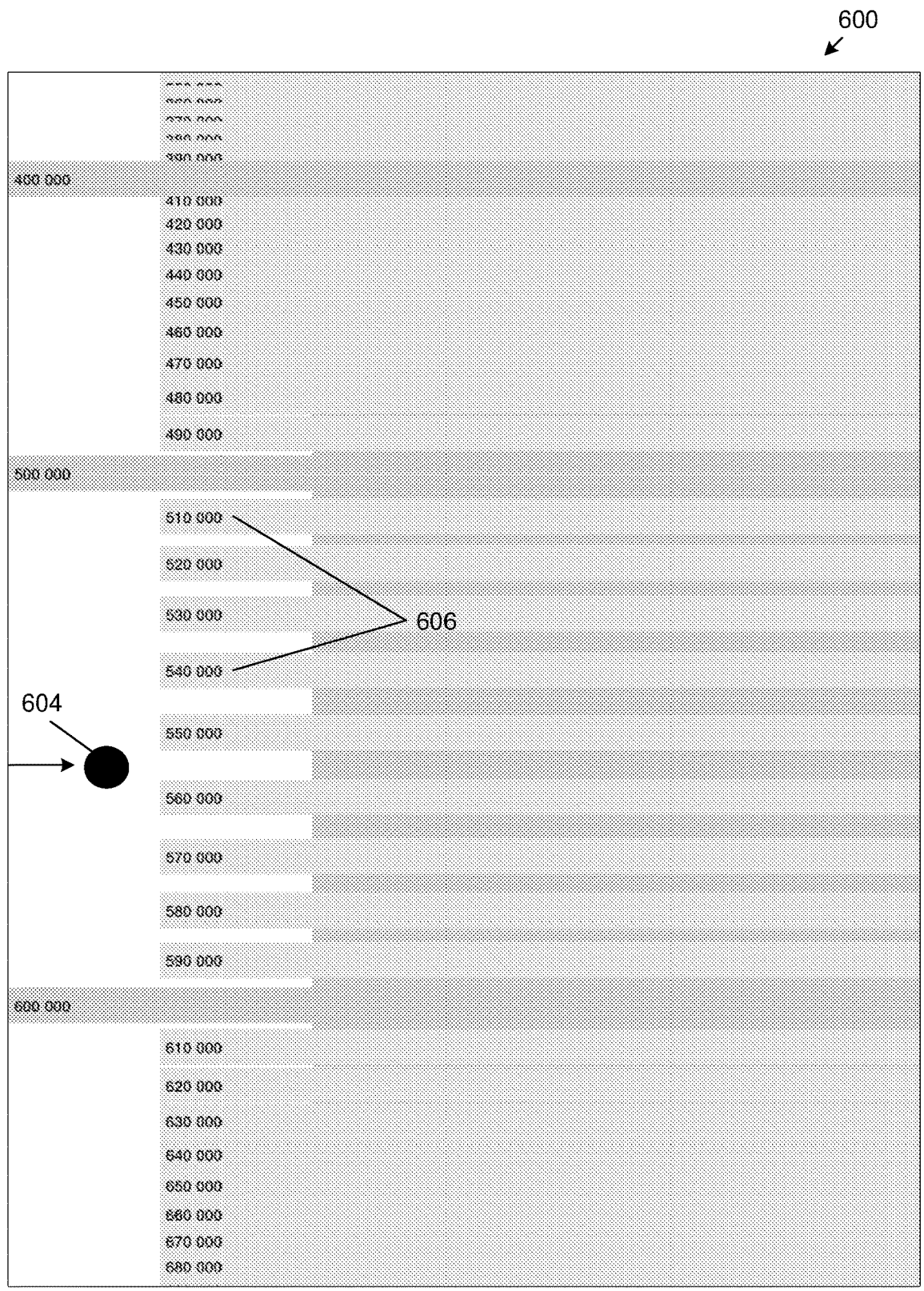

In this example, the interactive item "555,555" is the target interactive item. The pointer is thus initially moved between "500,000" and "600,000", as shown in FIG. 6B. Once the pointer reaches a certain hierarchy threshold, it causes opening or revealing of a lower level in the item structure. In FIG. 6B, it is shown that a second level (606) is opened. Similarly, moving the pointer (604) back along the horizontal axis may result in moving out of lower levels and/or into a higher level of the item structure upon reaching certain hierarchy thresholds.

In this embodiment, the functions employed to dynamically update the interactive items as the pointer is moved include a zooming function, a scaling function and a lens function. The lens function causes the region corresponding to the cursor position to be enlarged in relation to other interactive items, as shown in FIG. 6B. The lens function provides a distorted view of the interactive items in an attempt to show the context created by the movement of the user.

Figure 6C:
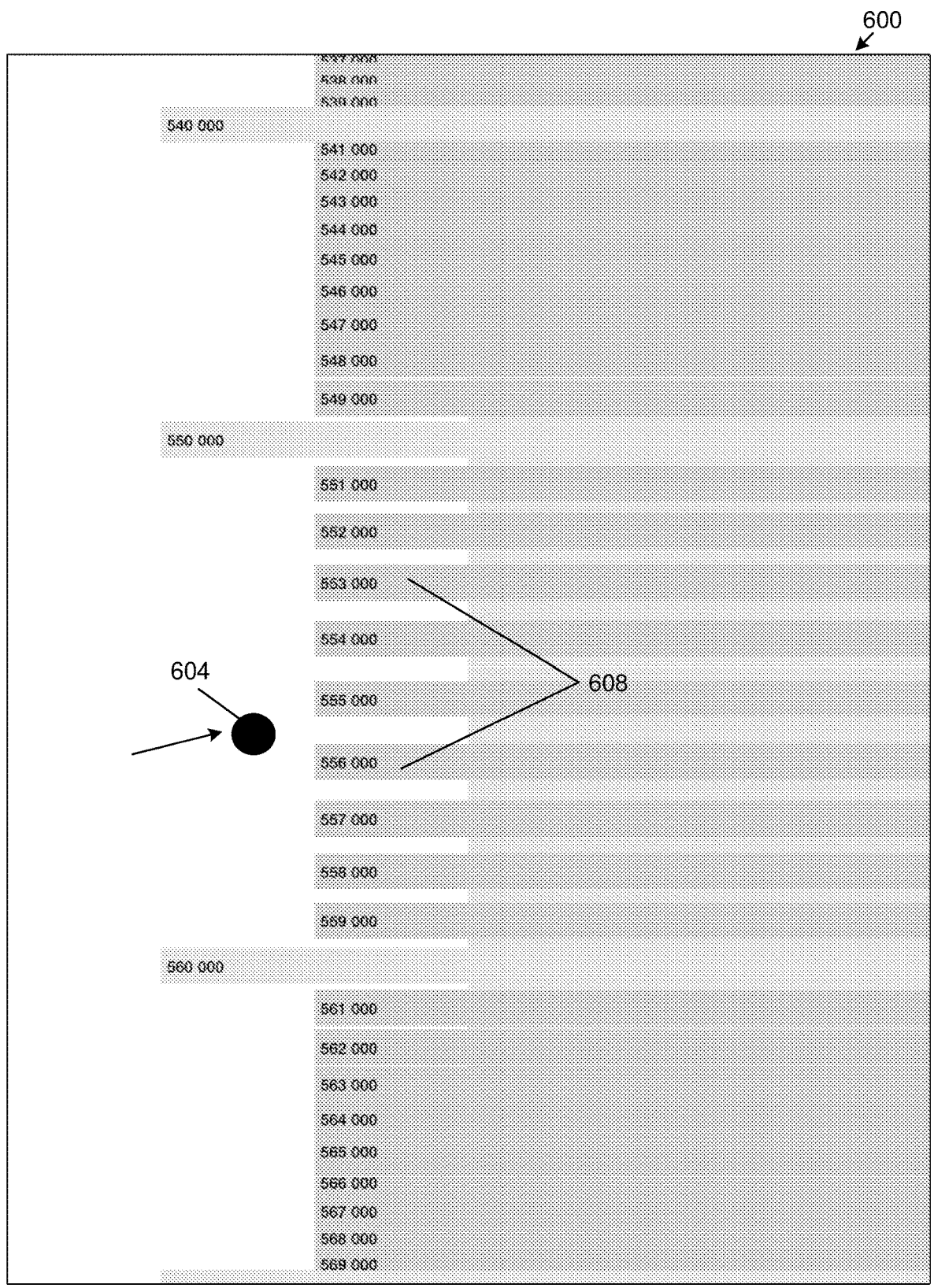

The user proceeds to move the pointer between "550,000" and "560,000" and then between "555,000" and "556,000" as a third level (608) is opened, which is shown in FIG. 6C.

Zooming, in this case by navigating a hierarchy structure, therefore results in both moving interactive items not relevant to the intent shown by the user out of the display region and moving interactive items which were not initially displayed in the display region into the display region as the pointer moves "deeper" into the hierarchical levels. The scaling, zooming and lens functions are used to enlarge the relevant interactive items in response to the movement of the pointer (604).

Figure 6D:
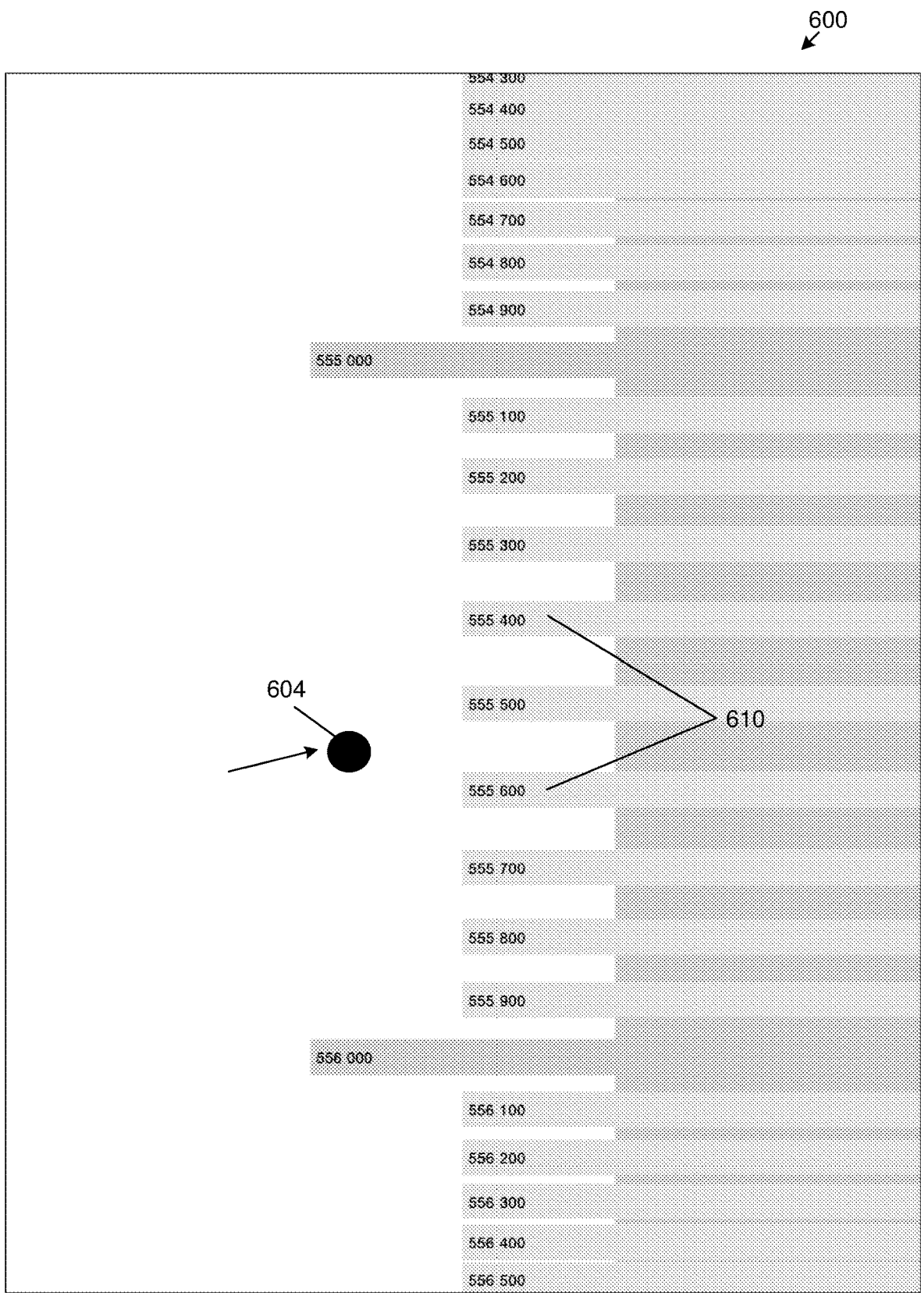
Figure 6E:
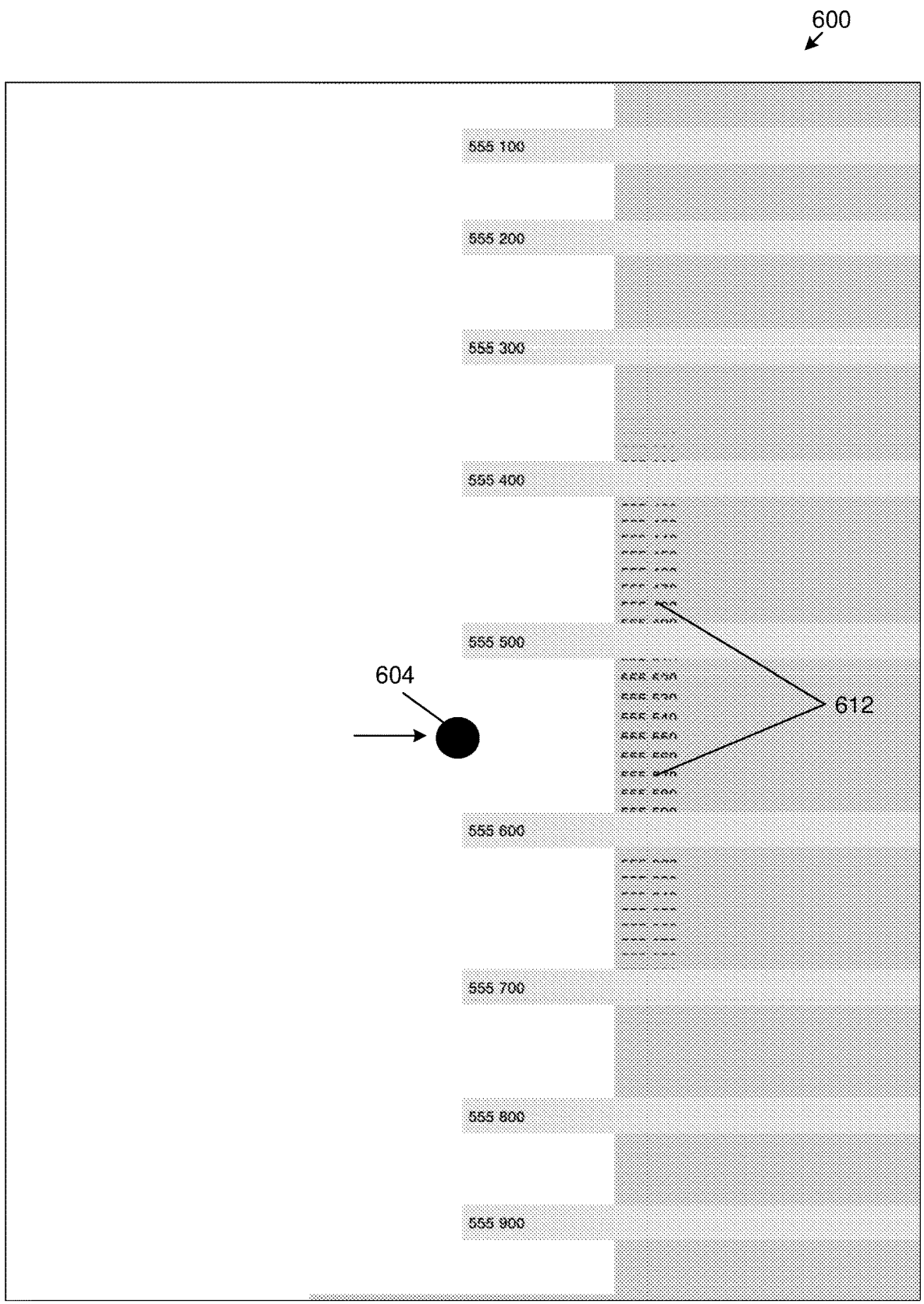
Figure 6F:
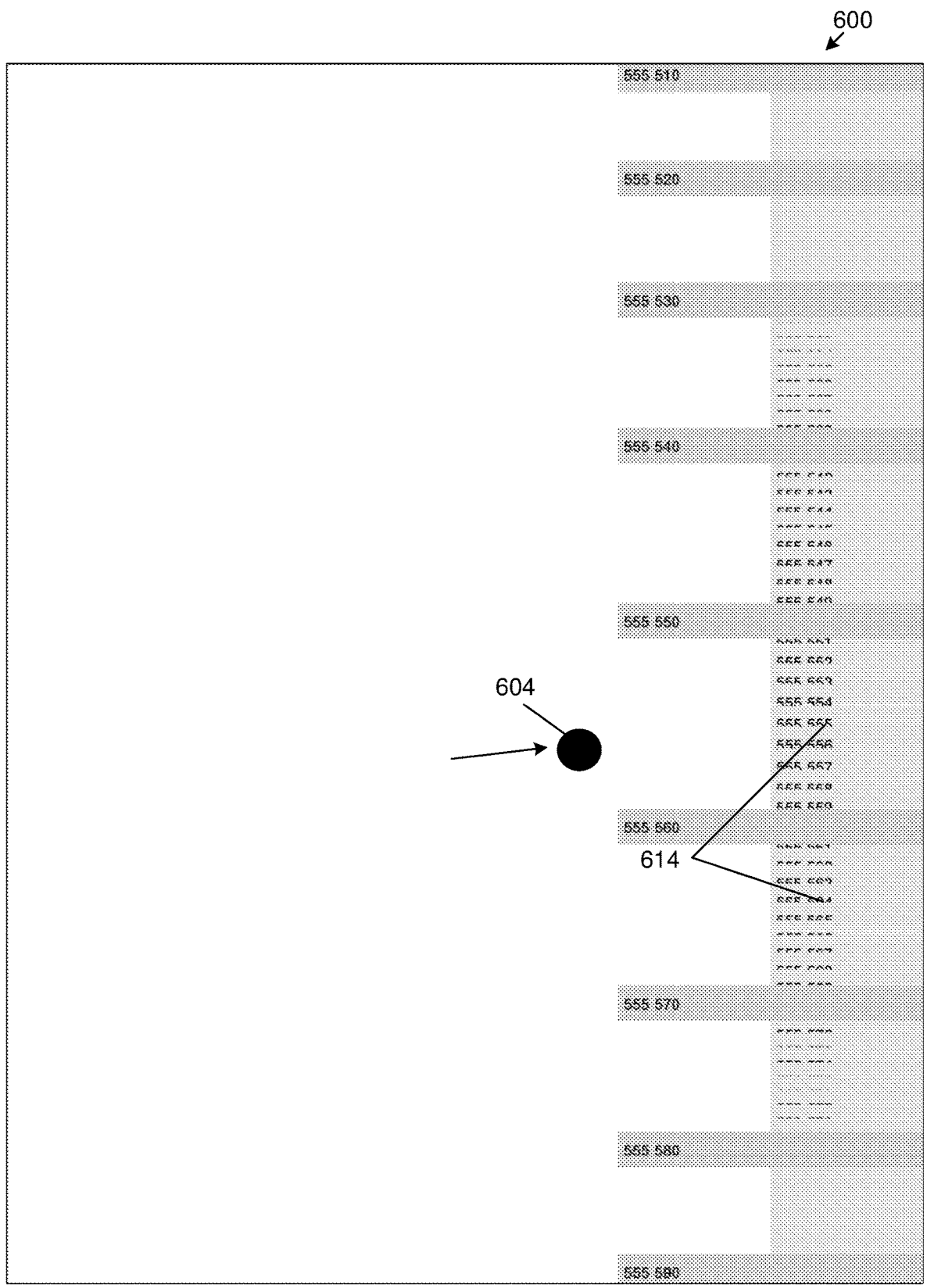

The pointer (604) is further moved between the interactive items "555,500" and "555,600", as shown in FIGS. 6D and 6E, to reveal a fourth (610) and fifth (612) level of the item structure. Once the pointer is moved until the sixth level (614) is revealed, the target interactive item, "555,555" becomes visible. FIG. 6F indicates the manner in which the lens function highlights a target area, while interactive items in areas above and below the target area are not shown.

At the stage shown in FIG. 6F, the user may, instead of moving the pointer closer to the sixth level (614), move the pointer up or down along the vertical axis to cause focus pointing and scrolling. In this way, the user may, for example, scroll up to make interactive item "555,532" visible and select it without moving the pointer (604) closer along the horizontal axis to cause zooming in. Embodiments thus permit a user to essentially scroll a zoomed area when moving up and down on the first predefined axis. In some embodiments, scrolling does not involve panning, but rather navigating interactive items with a lens function.

Figure 6G:
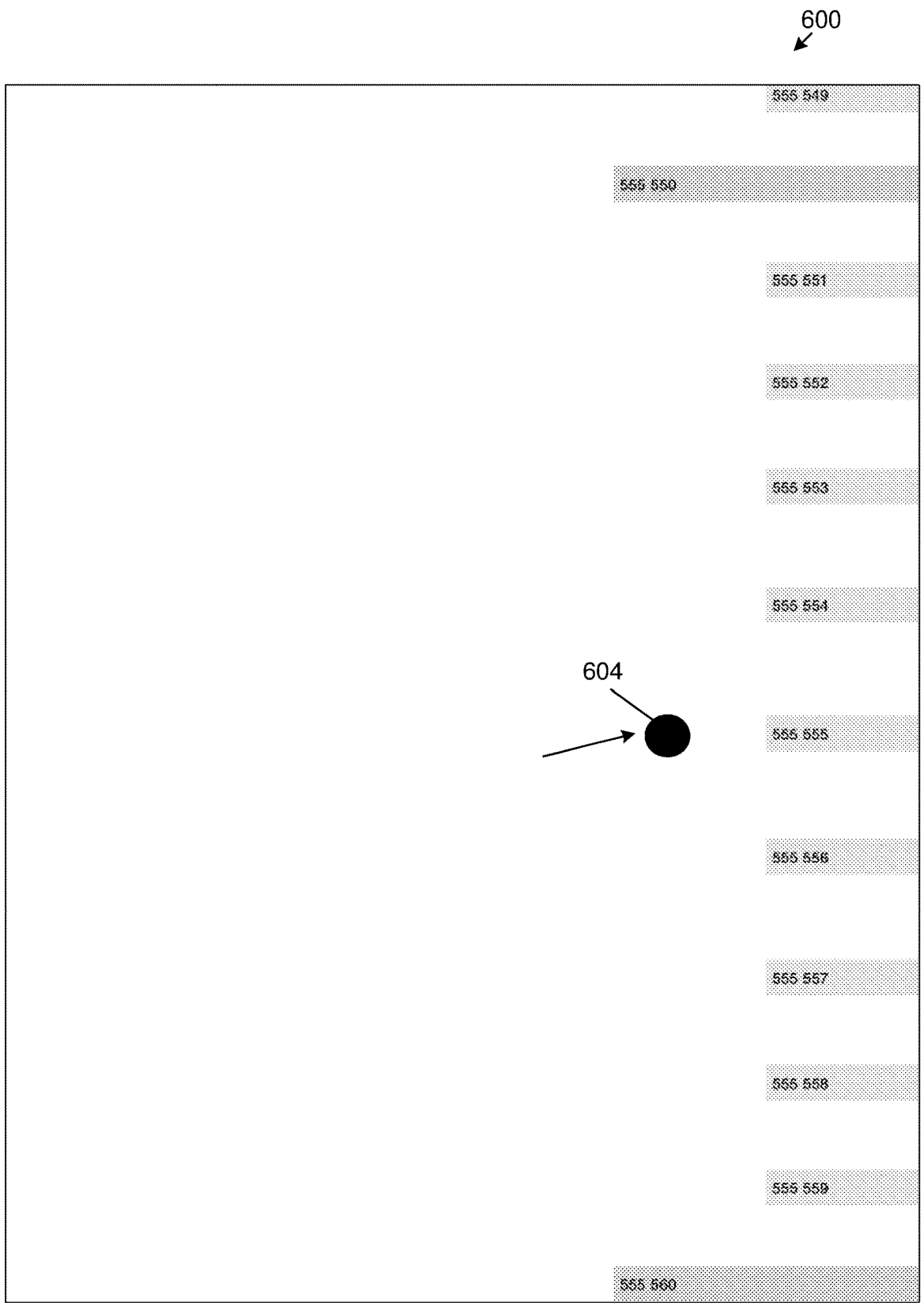
Figure 6H:
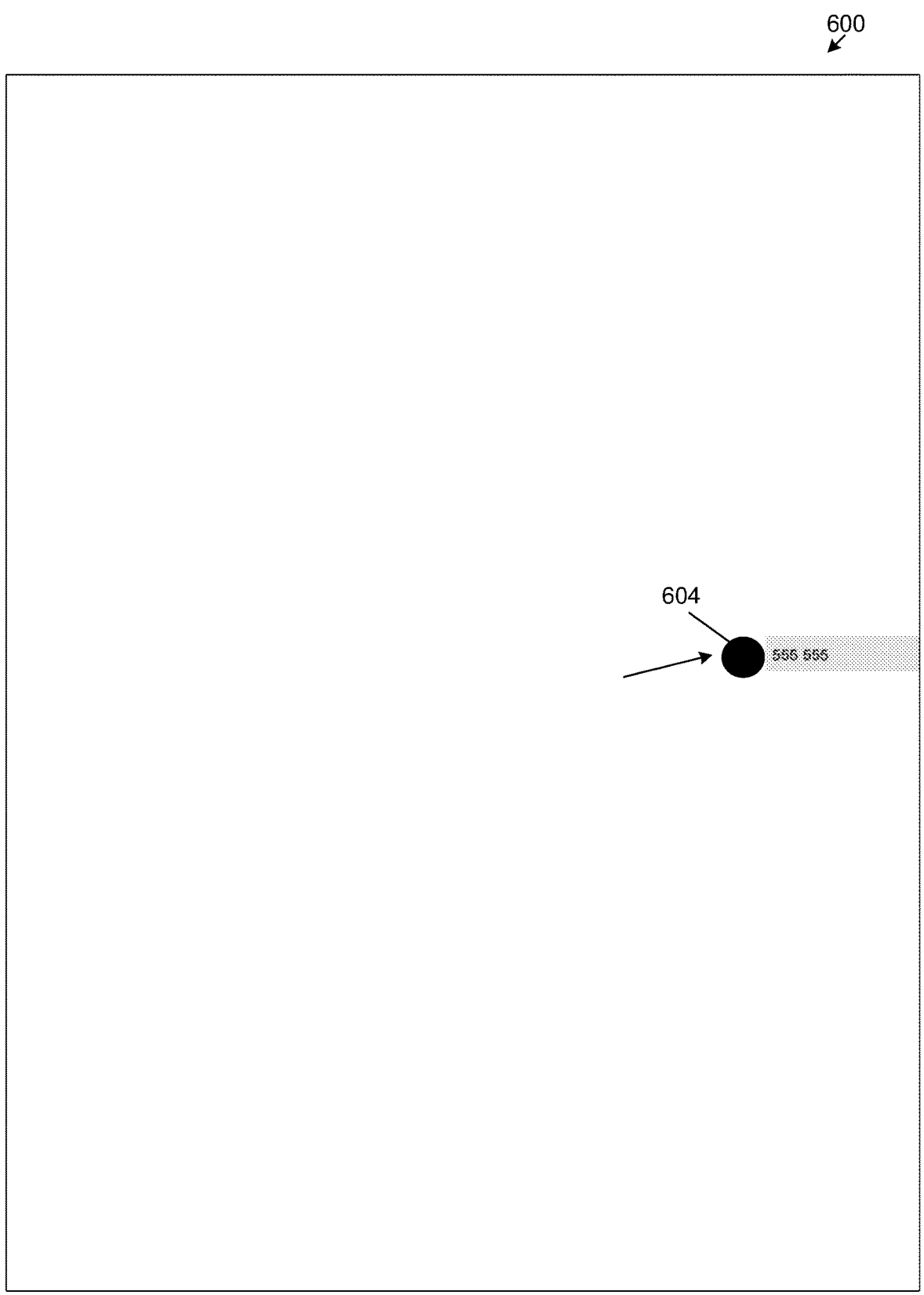

In this example, the user keeps moving the pointer (604) to interactive item "555,555", as shown in FIGS. 6G and 6H, until only the target interactive item remains visible. All of the other interactive items are moved out of the display region according to the intent shown by the user in moving towards "555,555". The control-display functions implemented thus allow the user to zoom into the hierarchical structure and simultaneously scroll to a target interactive item in a specific level of the hierarchy.

The interactive item may be selected in any suitable manner. The user may, for example, lift its finger up to cause selection, or click on a target interactive item, depending on the implementation.

Figure 7A:
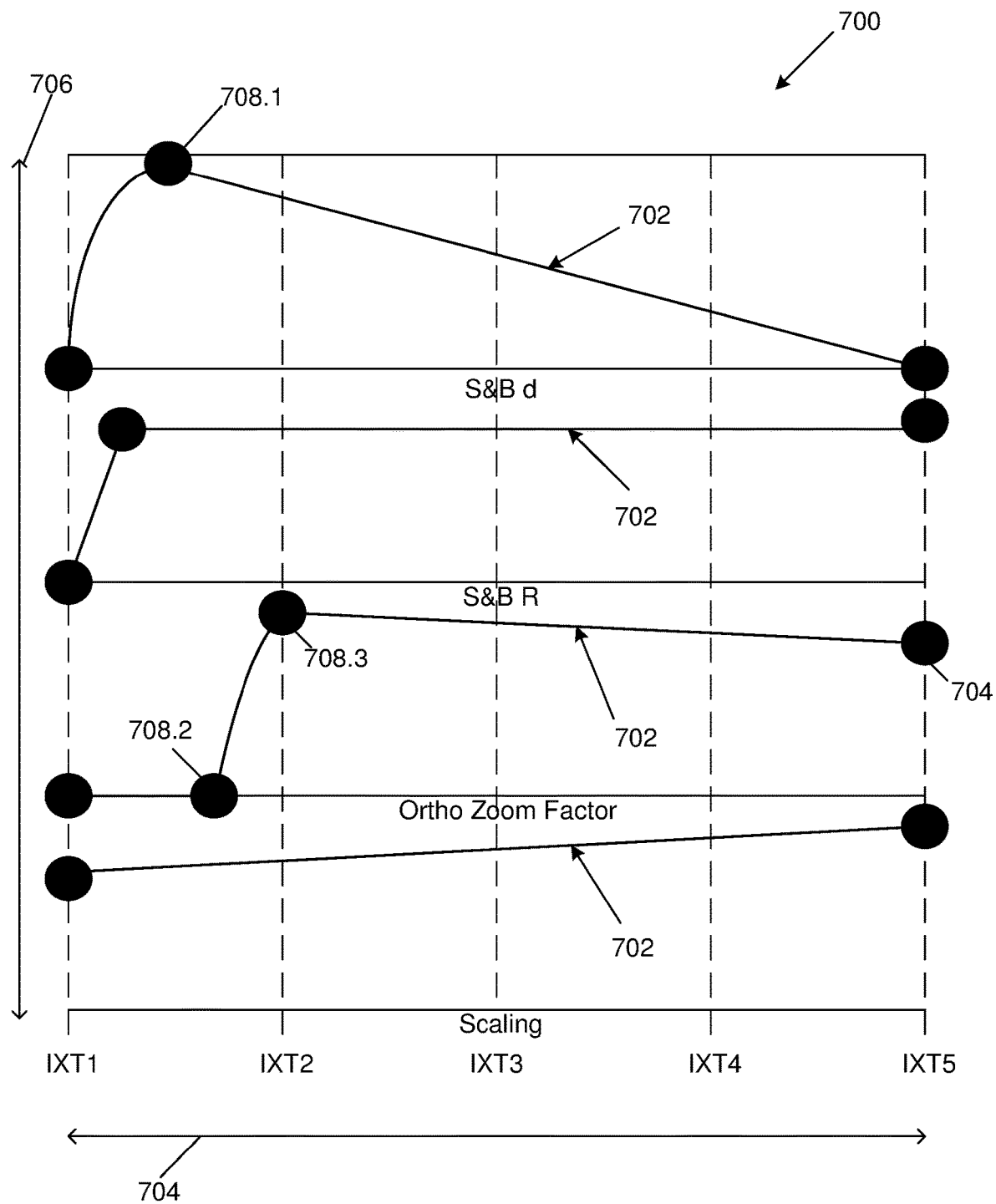
FIGS. 7A to 7C shows an exemplary attribute tool which may be used for configuring control-display functions.
Figure 7B:
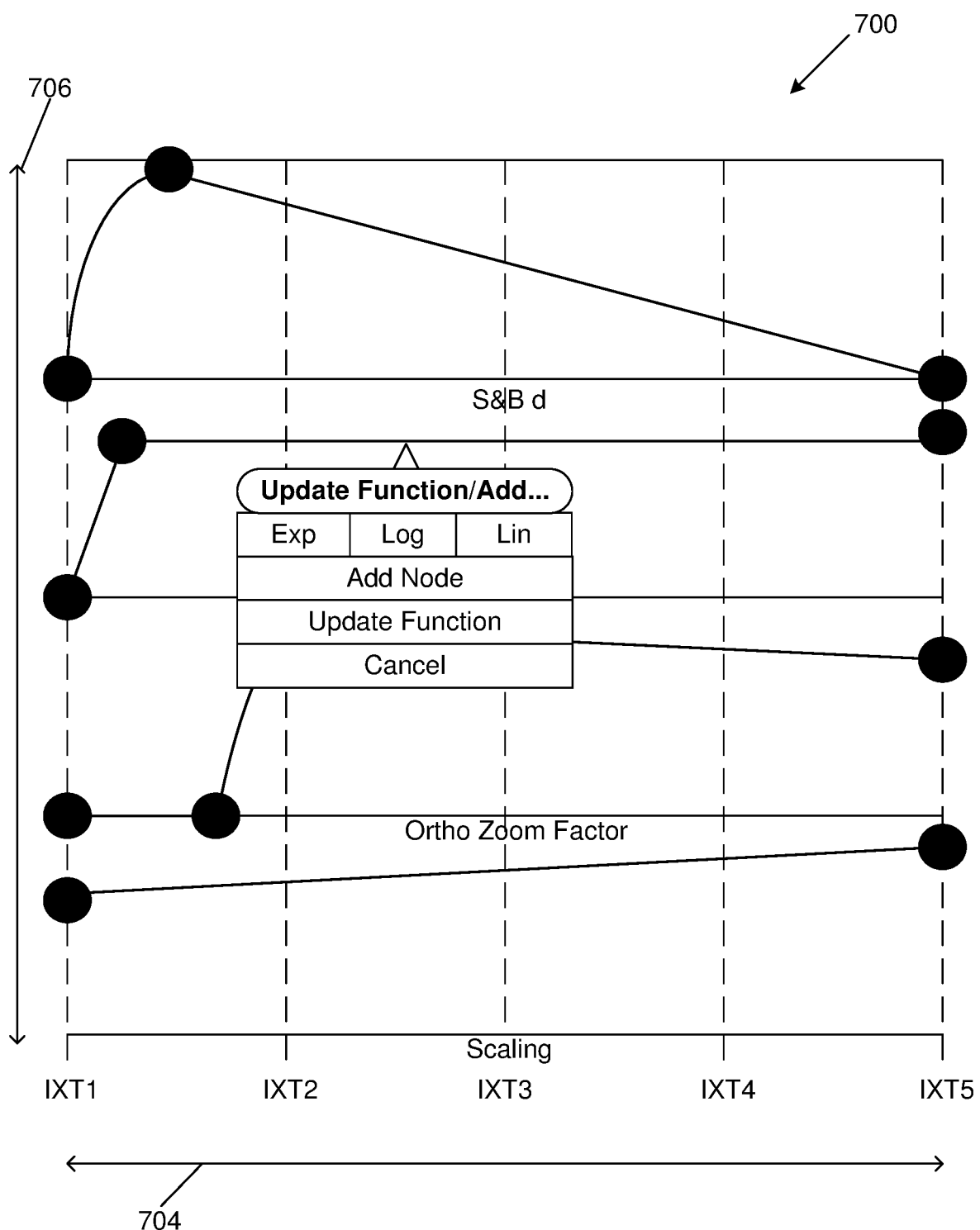
Figure 7C:
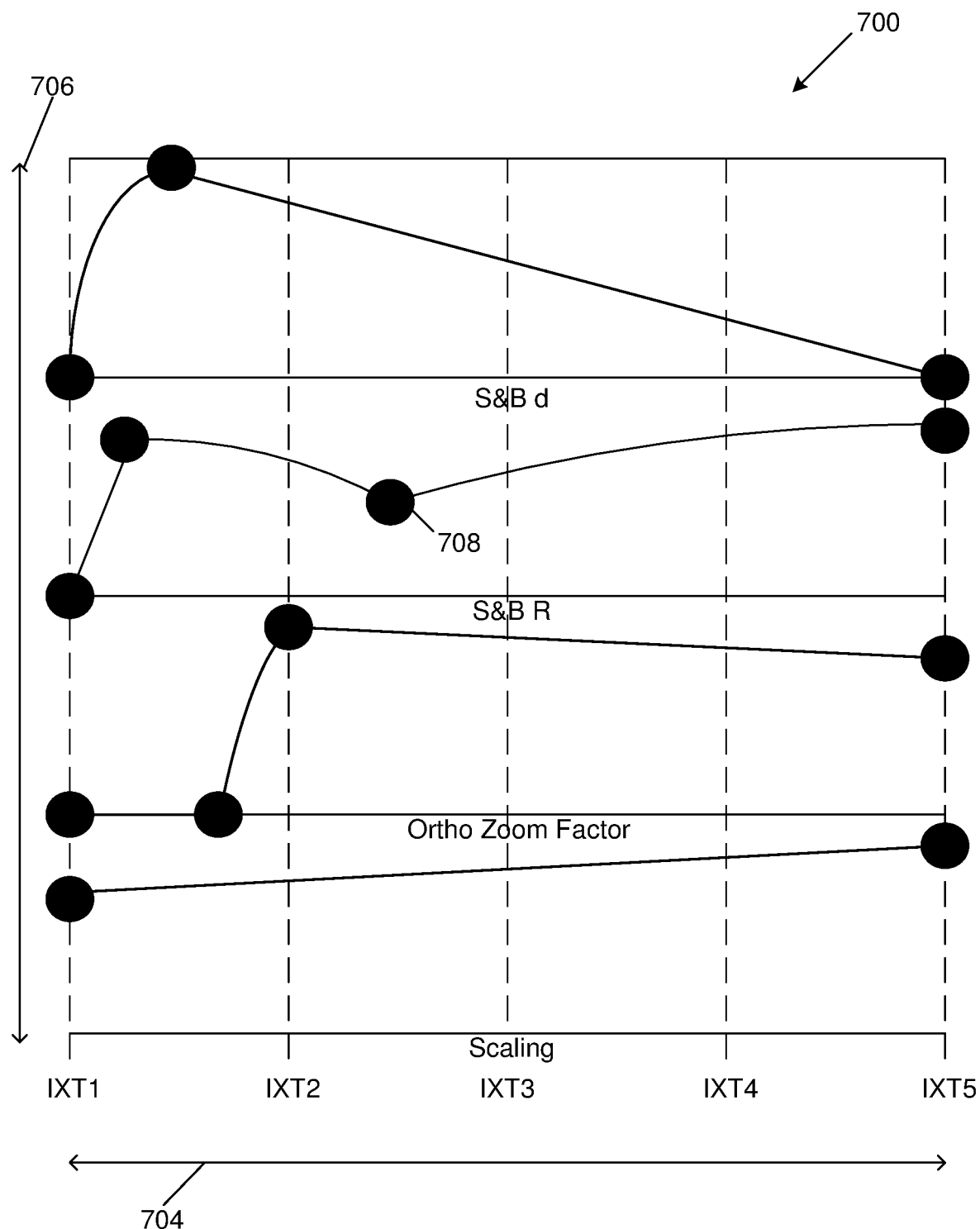

FIGS. 7A to 7C illustrate an attribute tool (700) which may be employed to design the appearance and operation of the user interface. The attribute tool has a number of attribute functions (702) which may be arranged one above the other as shown in the present embodiment. It should be noted that other arrangements may, of course, also be used. Each attribute function (702) is a control-display function that controls a specific attribute of the user interface.

In the present embodiment, the attribute tool (700) has a horizontal attribute sequence axis (704) which is correlated to the second predefined axis of the user interface, namely the axis that controls view pointing. The position of the pointer along the second predefined axis is therefore correlated with a position on the attribute sequence axis (704) such that a value for each of the attribute functions (702) at a particular position along the attribute sequence axis may be obtained from the corresponding value for the function along a perpendicular, attribute value axis (706). Defined attributes of the interactive items or the display are adapted according to the corresponding value of the one or more attribute functions.

In this illustration there are four attribute functions, "S&B d", "S&B R", "Ortho Zoom Factor" and "Scaling". The first two represent lens function attributes, "Ortho Zoom Factor" represents a zooming factor function attribute, and "Scaling" represents an object scale function attribute. Each attribute function can be adjusted in the attribute tool by creating new node points (708), defining the function between node points, and dragging the node points to applicable positions.

For example, "S&B d" has a start and end node point and one intermediate node point (708.1). The function between the start node point and intermediate node point is inverse exponential and the function between the intermediate node point and end node point is linear. This attribute will cause the interactive items to have a lens function applied to them that first increases according to an inverse exponential relationship and then decreases linearly, as the pointer is moved horizontally along the view pointing axis from left to right by a user in the control region of the user interface.

The "Ortho Zoom Factor" has two intermediate node points (708.2, 708.3). Between its start node point and first intermediate node point there is no zooming, then the zooming increases along an inverse exponential curve, and then the zooming decreases slowly in a linear manner.

It will be appreciated that the attribute tool (700) therefore provides an interface for a developer to quickly design and customize the behaviour of an application in the user interface. Many complex interrelationships can be established and additional attribute functions can be added to give an application a particular functionality and appearance.

The vertical axes marked "TXT" represent hierarchical thresholds which, when passed through by the pointer, open or reveal deeper levels in an interactive item hierarchy, as described above. For example, in a media library, a first level may be "Artists", a second level may be "Albums", and a third level may be "Songs".

In an embodiment where the electronic device includes Z-axis tracking, movement in the Z direction, which corresponds to view pointing, may be correlated with the attribute sequence axis (700).

FIGS. 7B and 7C show techniques for editing or changing the attribute functions which may be carried out by a developer. The developer, in this example, adjusts the lens function so as to reduce the degree of enlargement of interactive items in a specific range of the horizontal axis. A node (708) is added to the S&B R function in the illustration of FIG. 7C.

The attribute functions may be modified so that substantially any type of progression of a function may be represented, including a linear, logarithmic, exponential, cosine function or the like. Additionally, multiple nodes may be provided per function, with a different type of progression between each node being possible. It is envisaged that the attribute tool may be editable by users of the user interface themselves, or it may be used only as a development tool so that developers of applications may use the tool to provide a specific look and feel to their applications, without necessarily providing the user of the application with the option to adjust the developed application.

Certain aspects of the embodiments described may provide various technical advantages over known user interfaces. The input of the user essentially changes the behaviour of interactive items in the display region, as the user changes the values of control-display functions during movement towards a target item or away from a target item. For example, the degree of zoom and the scale of interactive items are changed as the pointer is moved along one axis, while the user may then scroll or navigate these zoomed items using another axis, which is an orthogonal axis in these examples.

The second predefined axis, which is shown as a horizontal axis in the examples, forms a timeline along which the user may "look ahead" or "look back" to navigate to a target item as quickly as possible. Whereas many known user interfaces use the position of a pointer to indicate absolute position in a display region, embodiments described herein use the relative position of the pointer to interactive items such that the pointer is moved to change object behaviour and not only pointer position.

The attribute tool may be considered a flow map, which forms a storyline. The attribute tool provides a mapping of the state values of various attributes. The attribute sequence axis may comprise an integrated signal, composed of, amongst others, pointer location and position as measured in the control region. The integrated signal serves as controller of the attributes, and therefore of the interface. The integrated signal may include any system state, for example time, user input, for example position along the first and second predefined axes, a button state, a swipe state or a touch state, as well as any value derived from these states. It may therefore include speed or polar coordinates determinable from measuring the states in the control region. Continuous or discrete values may be considered.

Attributes may be any parameter that a designer desires to modify, either directly or indirectly, in order to alter the visual appearance and dynamic behaviour of the interface. Some examples include view zoom factors and offsets, as well as the size, location, visibility, alignment and transparency of user interface items. Continuous and/or discrete values may be controlled, for example a continuous zoom factor or a discrete visibility parameter.

The mapping between the integrated signal and an attribute's state values may be any function taking all, or part, of the integrated signal as domain. Examples include constant, polynomial, exponential or cosine functions. The output of each attribute may be used to set a corresponding interface value directly, for example transparency, or indirectly via an intermediary transform, for example y-position via a zoom transform.

The attribute tool, or flow map, describes a "storyline", where the state sequences of the attributes governs the visual appearance and dynamic behaviour of the user interface, including associated user experience, as the integrated signal changes over time. This may in some cases be considered similar to techniques used in animation tools, with a time domain of animation tools replaced by the integrated signal.

Figure 8A:
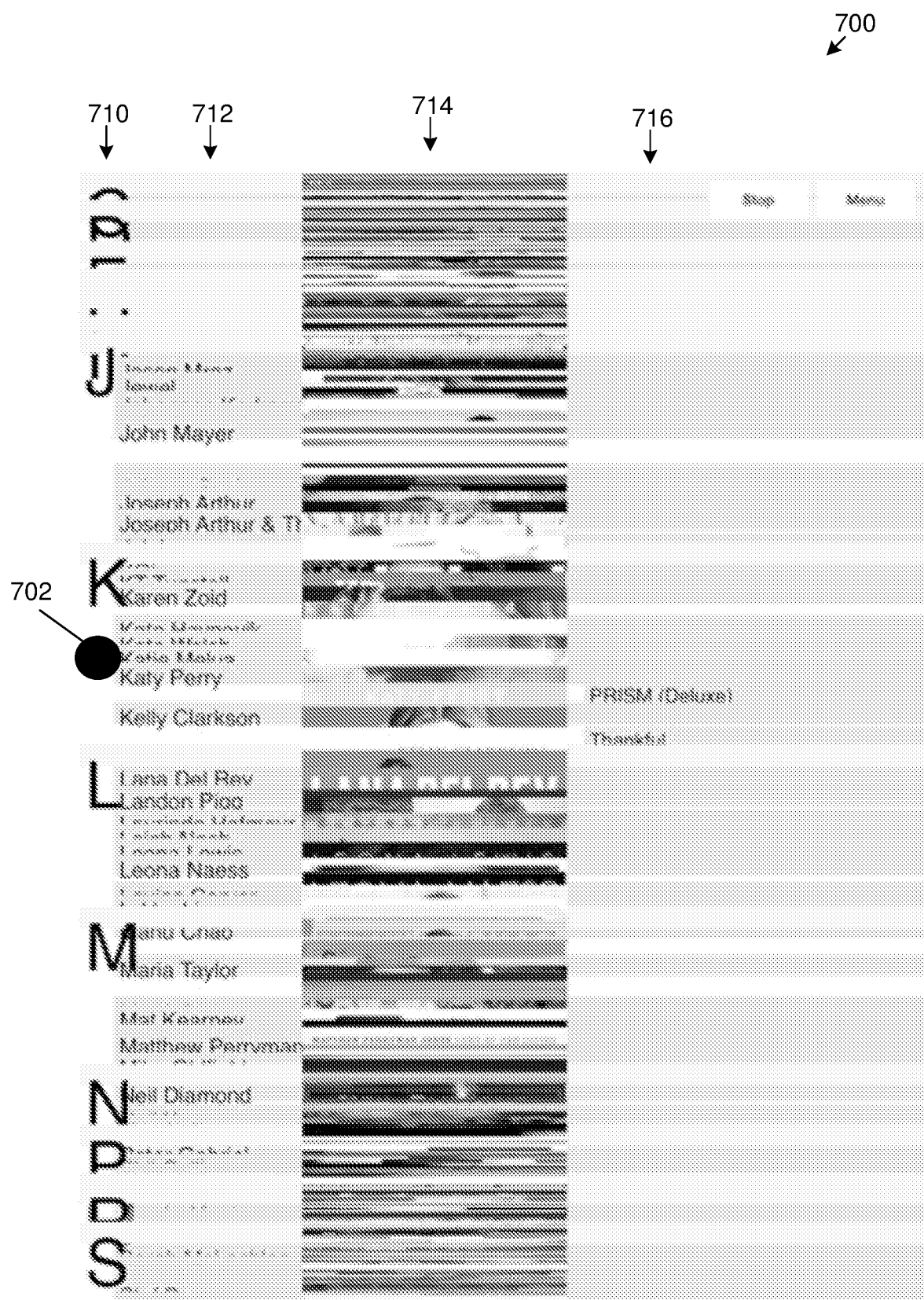
FIGS. 8A to 8L is a schematic illustration of a fourth exemplary method of interacting with interactive items in an embodiment of a user interface.

FIGS. 8A to 7L are screenshots of a display (700) illustrating a fourth exemplary implementation of a user interface. In this embodiment, a music library is provided in a hierarchical item structure such that zooming causes navigation through different levels of the hierarchical item structure. The hierarchy consists of, from left to right, "Letter of the alphabet" (710), "Artist" (712), "Album art" (714), "Album name" (716) and "Song name" (718).

In this embodiment, a lens function is employed. As is apparent from FIG. 8A, the lens function acts as a "shutter" to reveal and enlarge interactive items within a certain range of the pointer (702), while other interactive items are smaller, obscured and/or not visible. Similarly to other embodiments described, the user may wish to scroll up or down in the vertical axis, for example, to reveal the artists under the letter "T".

Figure 8B:
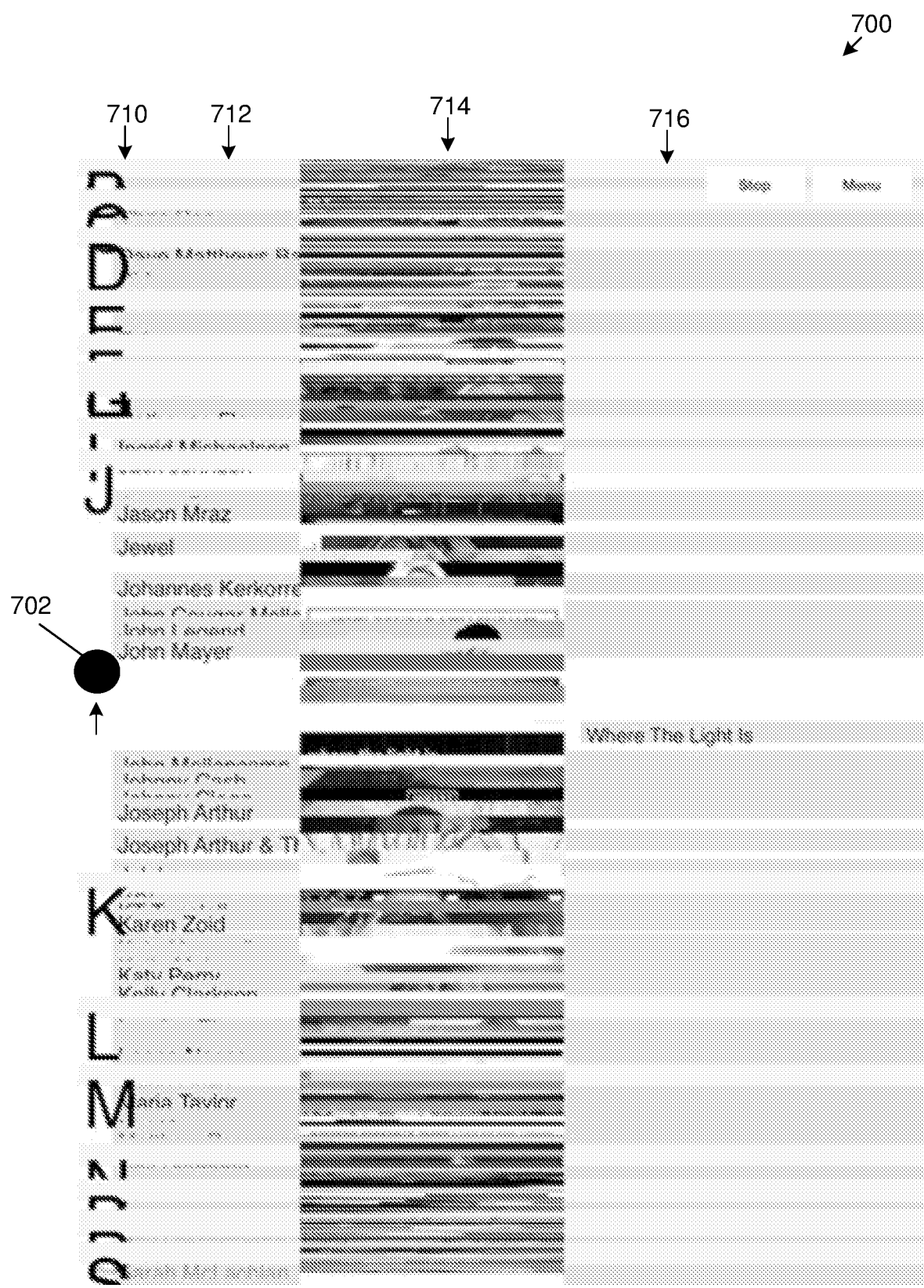
Figure 8C:
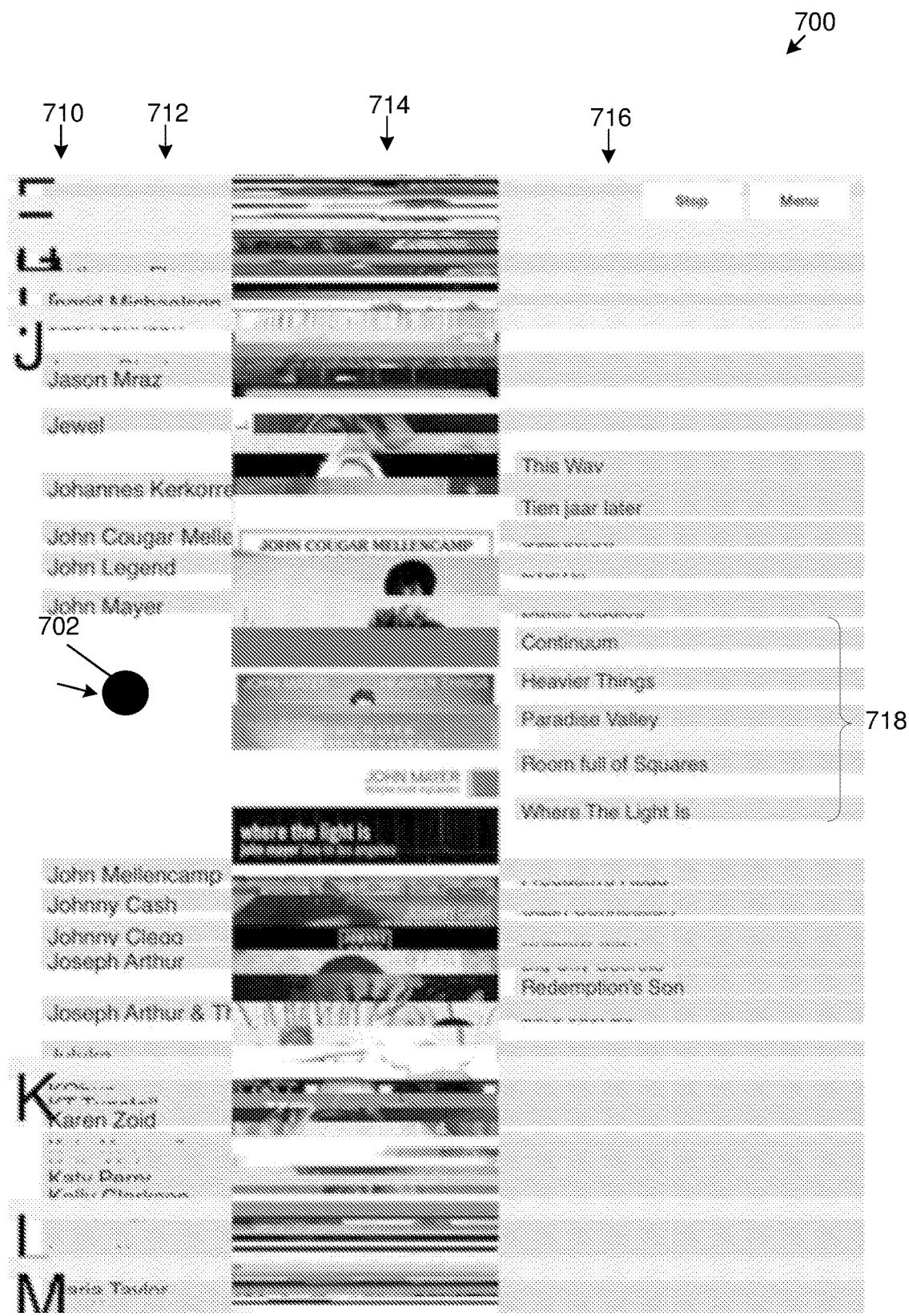

In this example, the user wishes to navigate to the album "Paradise Valley" by the artist "John Mayer". The pointer is thus initially moved such that the letter "J" is in the greatest focus of the lens function, as shown in FIG. 8B. At a next stage, the pointer is moved along the horizontal axis and down along the vertical axis such that zooming and scrolling takes place. Sub-levels of the "Artist" level, namely "Album illustration" and "Album name" are revealed. Also, the lens function's focus shifts towards the centre of the display region as the pointer moves in that direction. This is illustrated in FIG. 8C, wherein the interactive item "Paradise Valley" becomes visible.

In this example, zooming does not only refer to enlarging or shrinking items, but also refers to navigating deeper into or out of different levels of a hierarchical item structure.

Figure 8D:
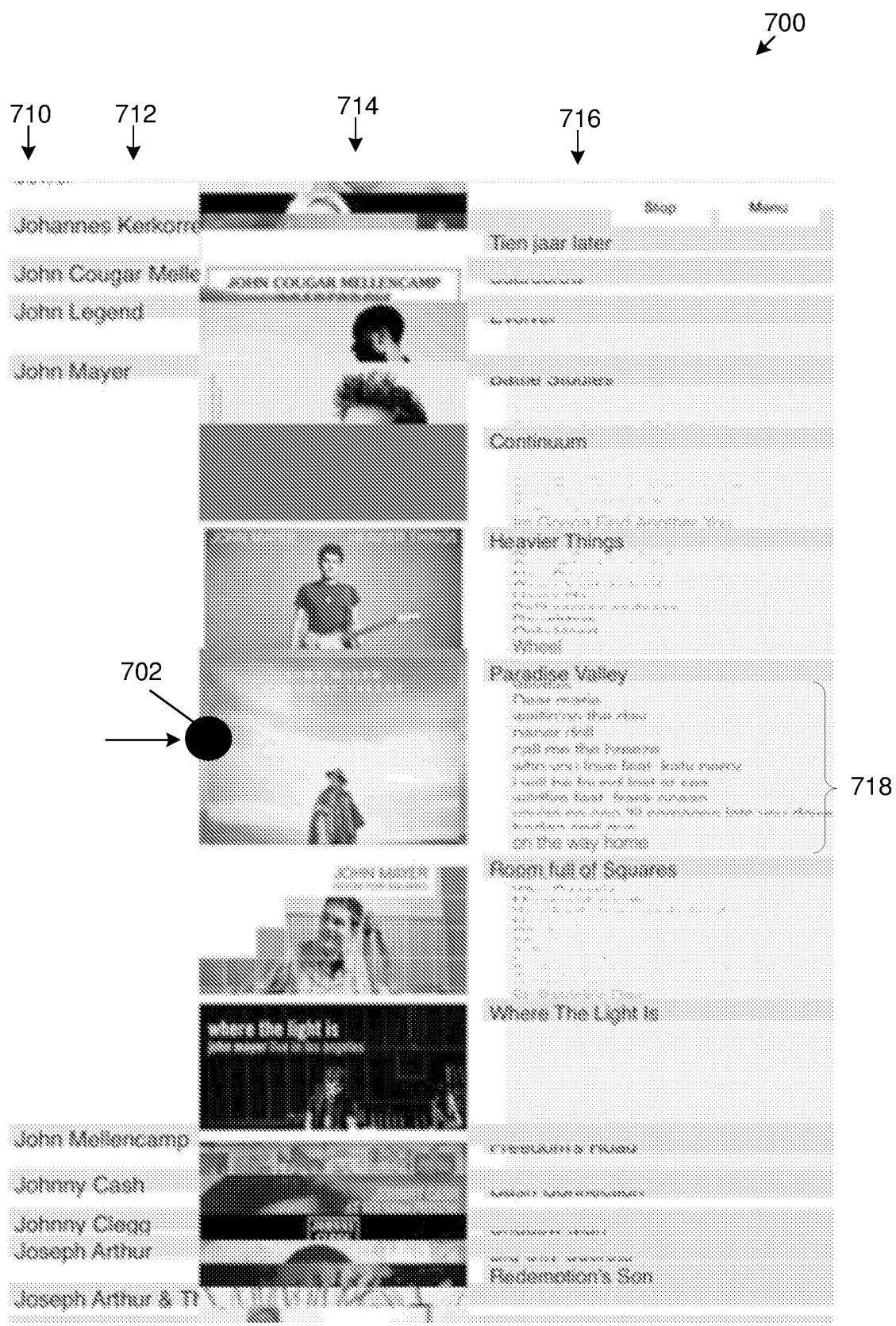
Figure 8E:
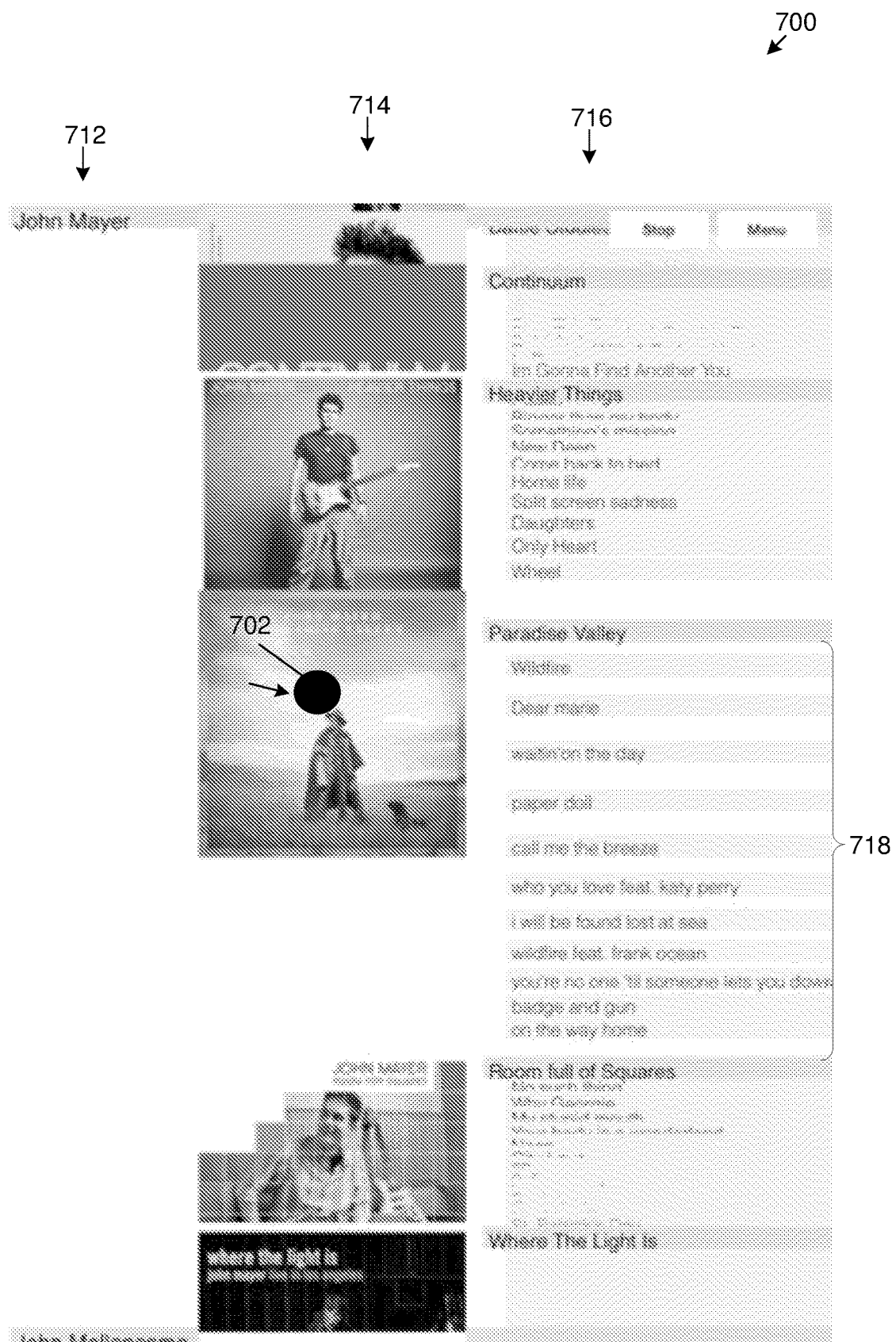
Figure 8F:
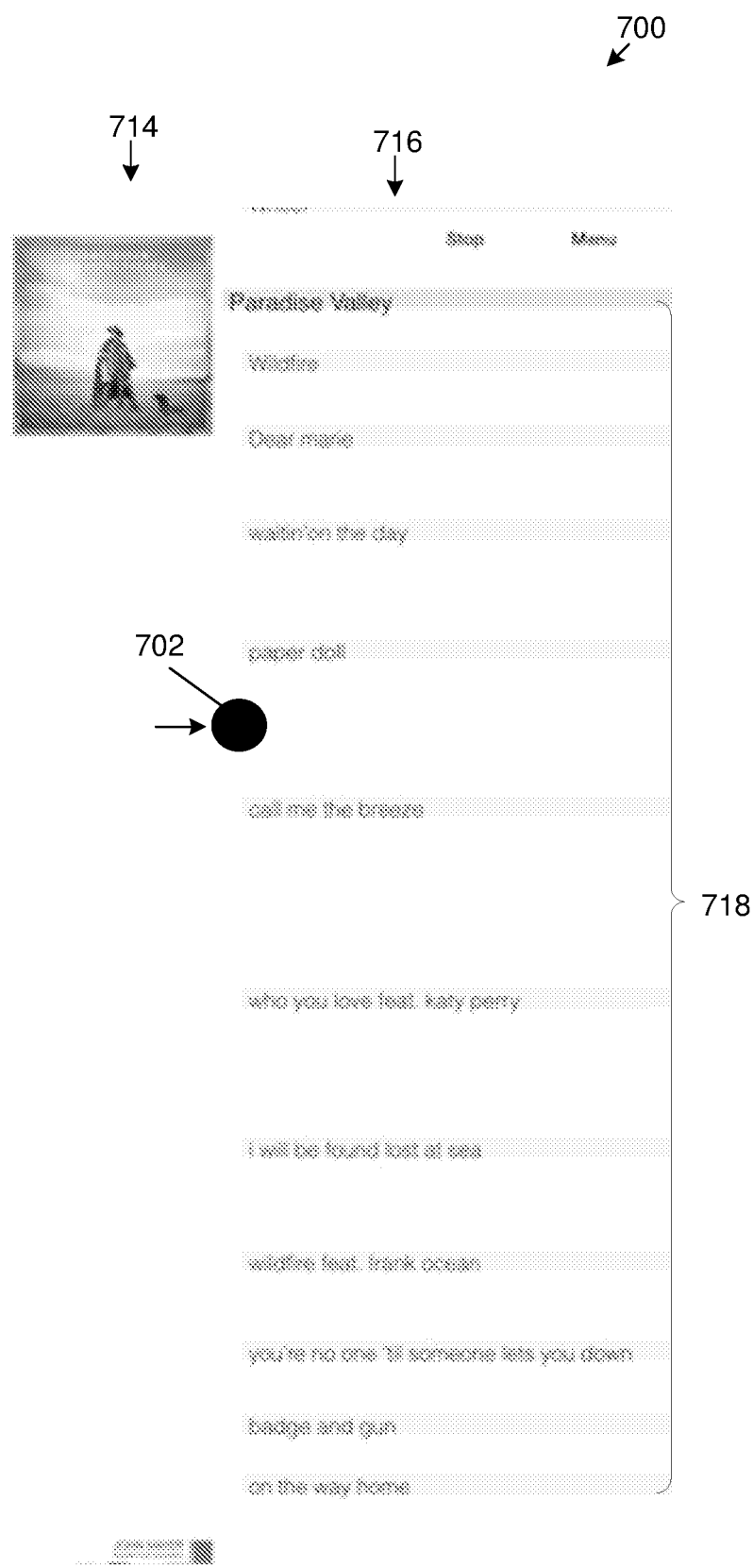

The pointer (702) is moved further towards "Paradise Valley" which results in some of the interactive items being moved out of the display region, while sub-items of the most relevant albums become visible and enlarged, as described with reference to the prior embodiments. These steps are clearly illustrated in FIGS. 8D to 8F. From the above description it is apparent that the method provides a continuous navigation mechanism, as opposed to conventional "point and click" mechanisms for reaching a sub-item in a user interface.

A target interactive item may be selected in any suitable manner, as described above. Alternatively, the user may move the pointer back to make more albums or songs visible, or may scroll up or down to reach a song which is not visible in the view shown in FIG. 8F.

Figure 8G:
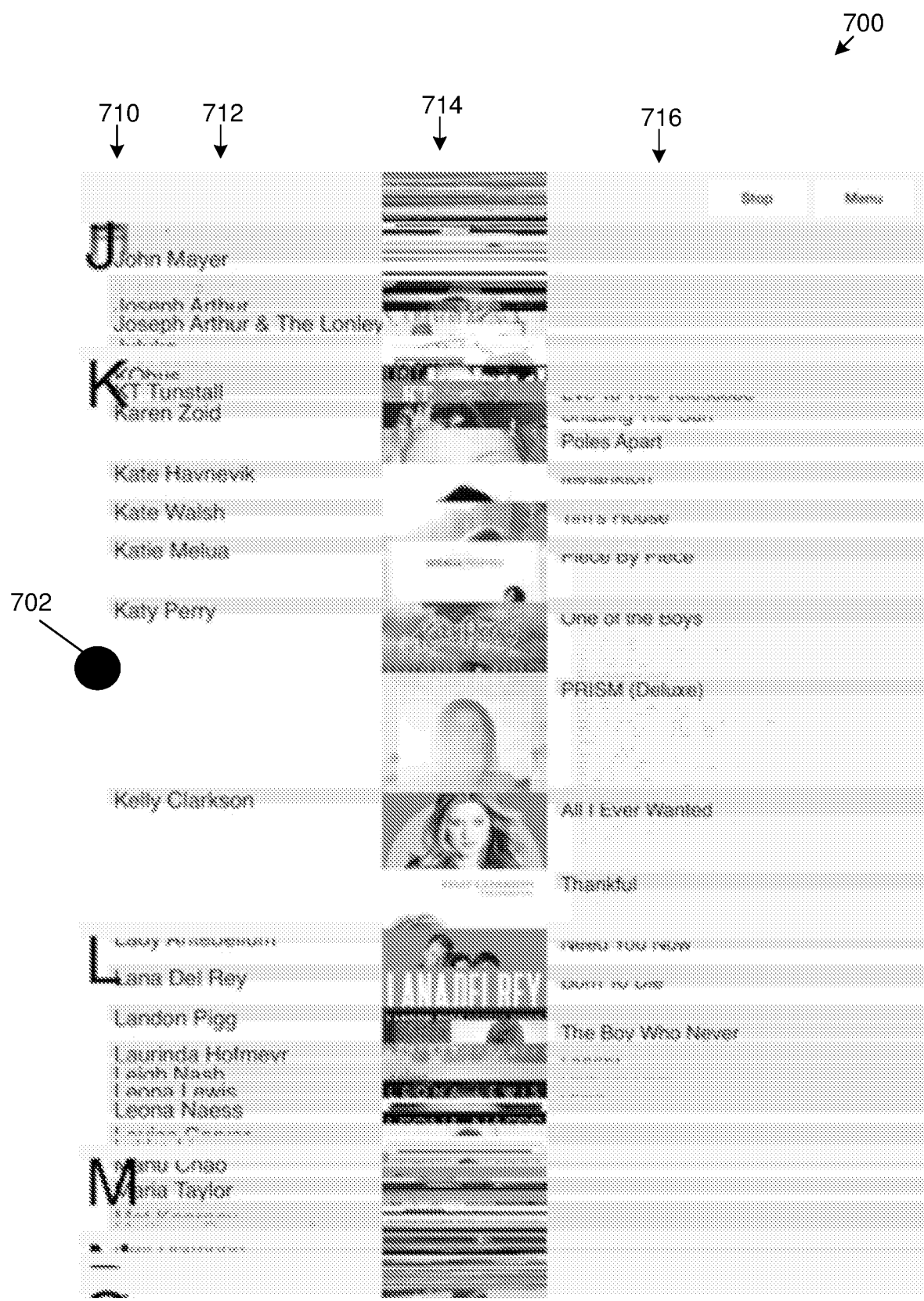

FIGS. 8G to 7L show an example similar to the user interface described with reference to FIGS. 8A to 8F, and like reference numerals refer to like components.

In this example, however, the strength and/or range of the lens function used has been increased. FIG. 8G shows that the increased lens function strength causes a larger area to be enlarged, and sub-items deeper into the item hierarchy to be revealed when compared to the lens function used in FIG. 8A.

Figure 8H:
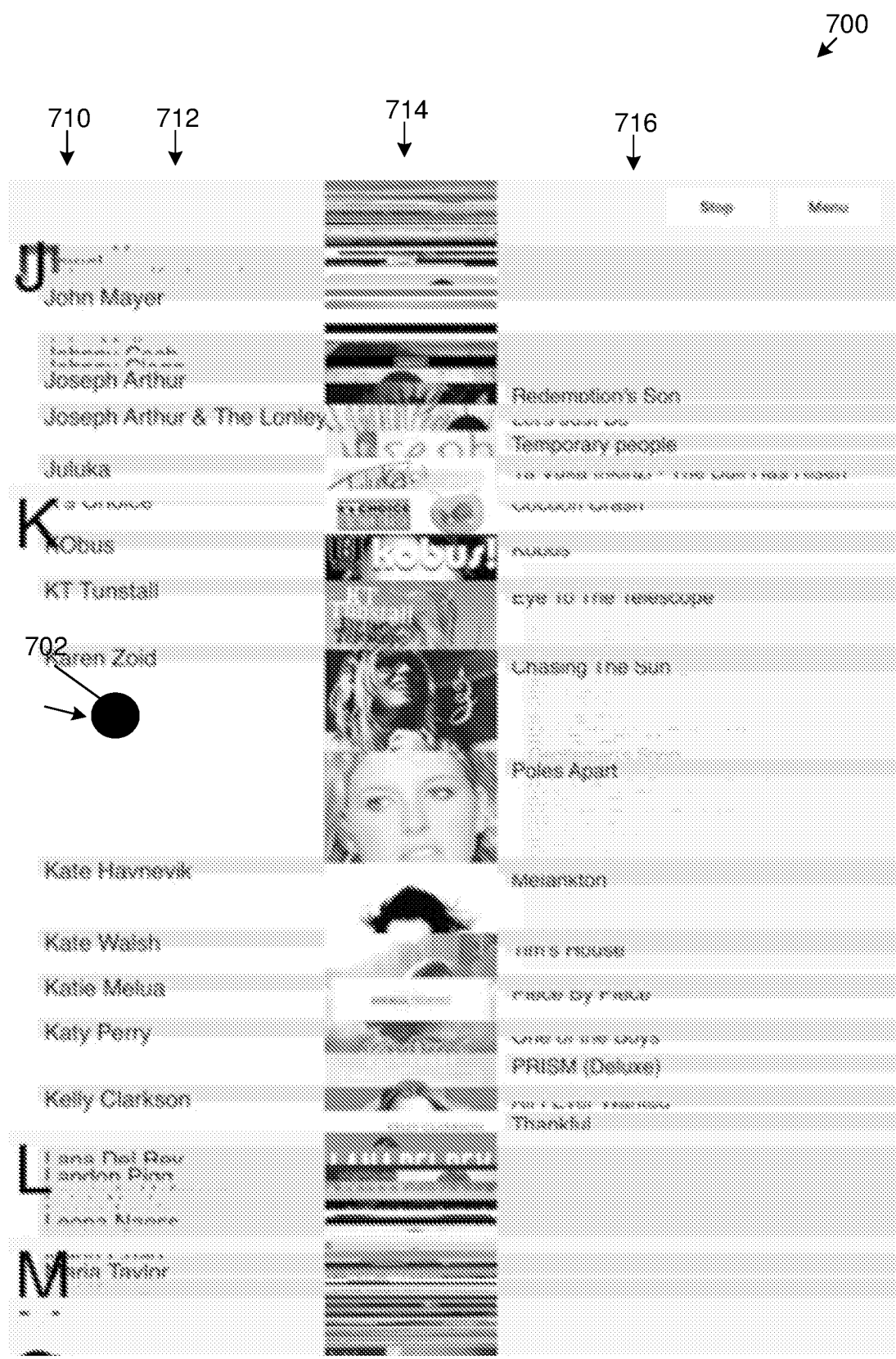
Figure 8I:
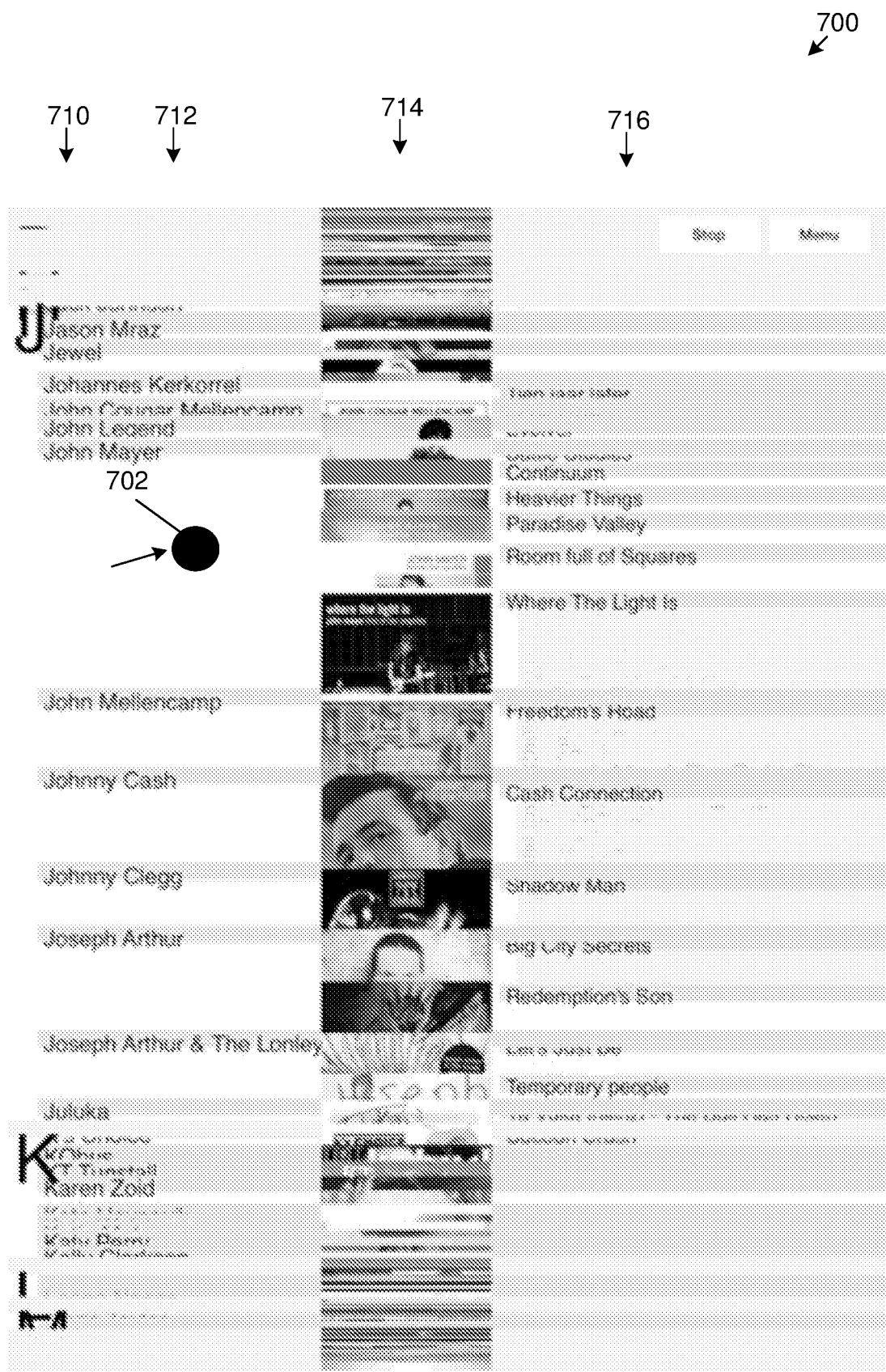
Figure 8J:
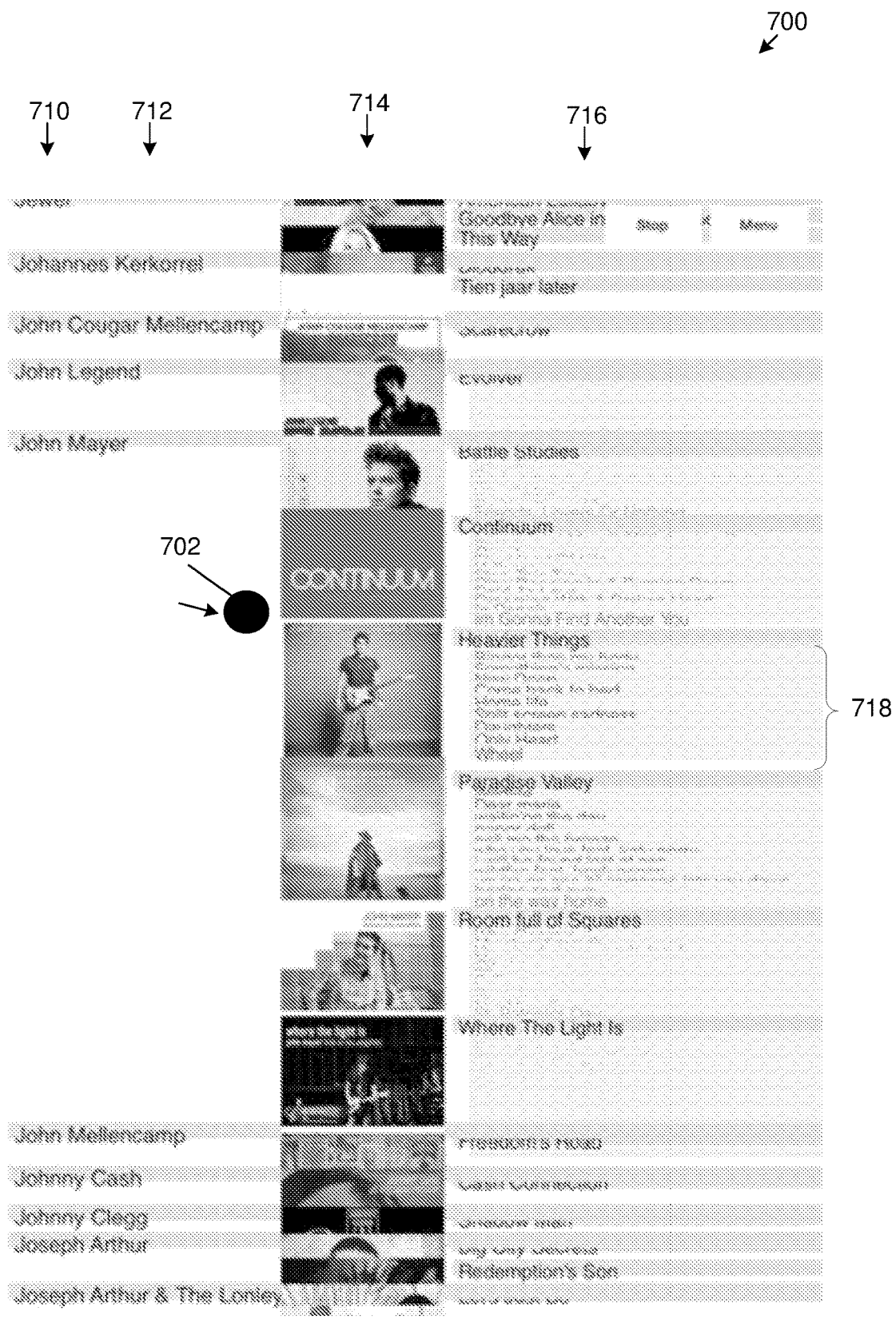
Figure 8K:
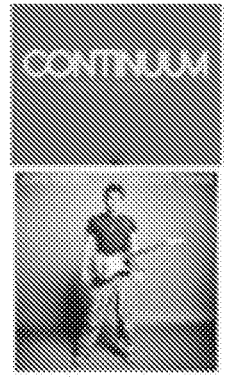
Figure 8K:
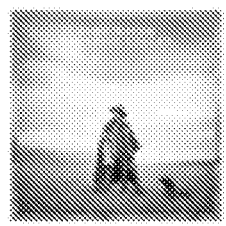
Figure 8K:
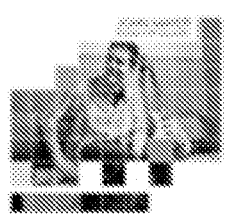
Figure 8L:
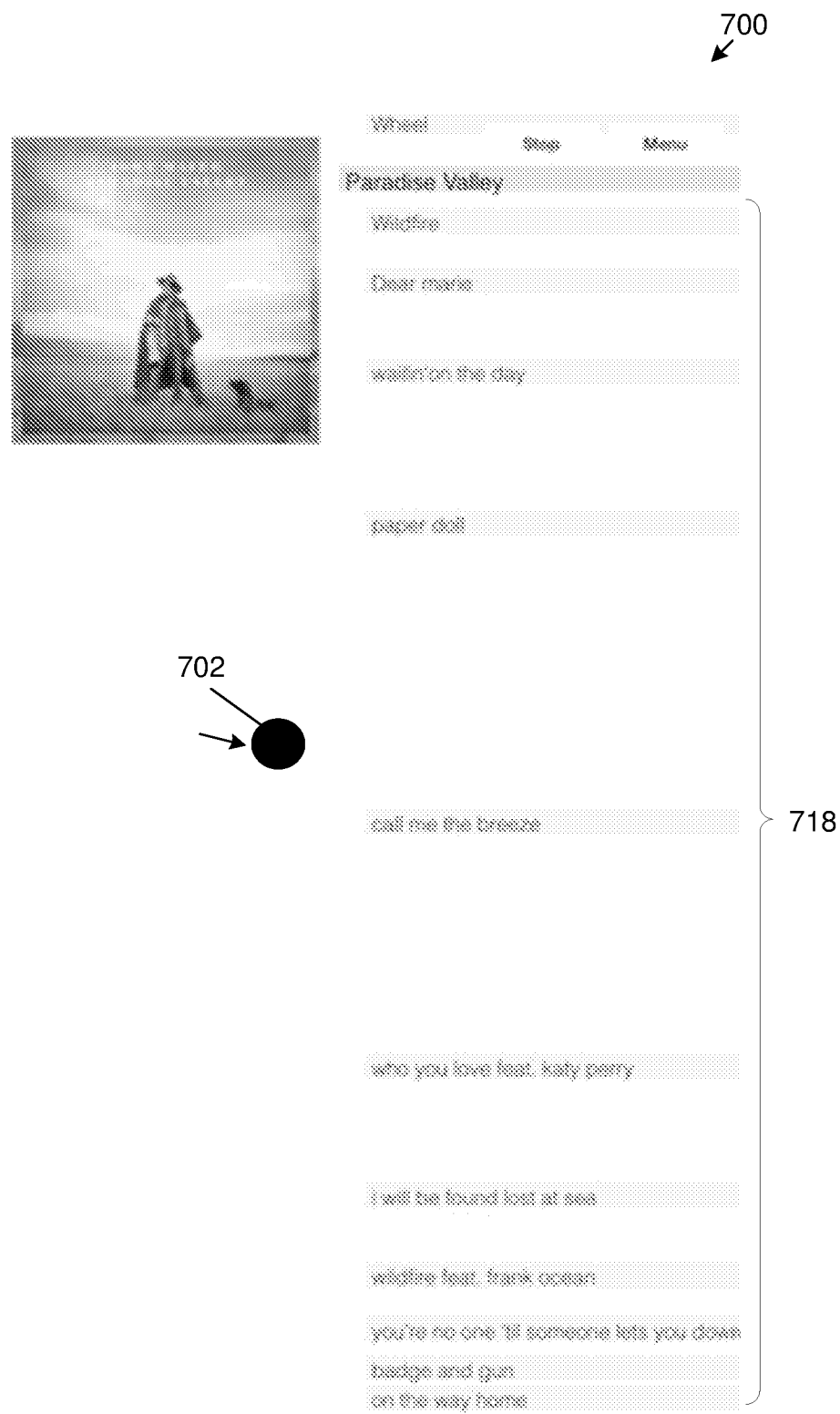

The steps followed to reach the songs under "Paradise Valley" shown in FIGS. 8H to 7L are the same as those shown in FIGS. 8B to 8F. However, the difference in lens function strength results in different visual transformations. In other words, the lens function of FIGS. 8G to 7L has a wider range and therefore essentially "opens up" a larger portion of the display region.

FIG. 9A to 9D shows an embodiment in which a scrolling zone is incorporated. Screenshots of a display (800) illustrate a further exemplary implementation of a user interface, similar to the user interface of FIGS. 3A to 3E. Again, a plurality of interactive items (802) available for selection by the user are vertically arranged in the display region (804). In this embodiment, the number of interactive items is too high to display all of them on the display at a single time. In the present embodiment, only 35 interactive items can be displayed on the display at once, even if the lowest zoom level is applied. The total number of interactive items are, however, 300 in the present embodiment.

Figure 9A:
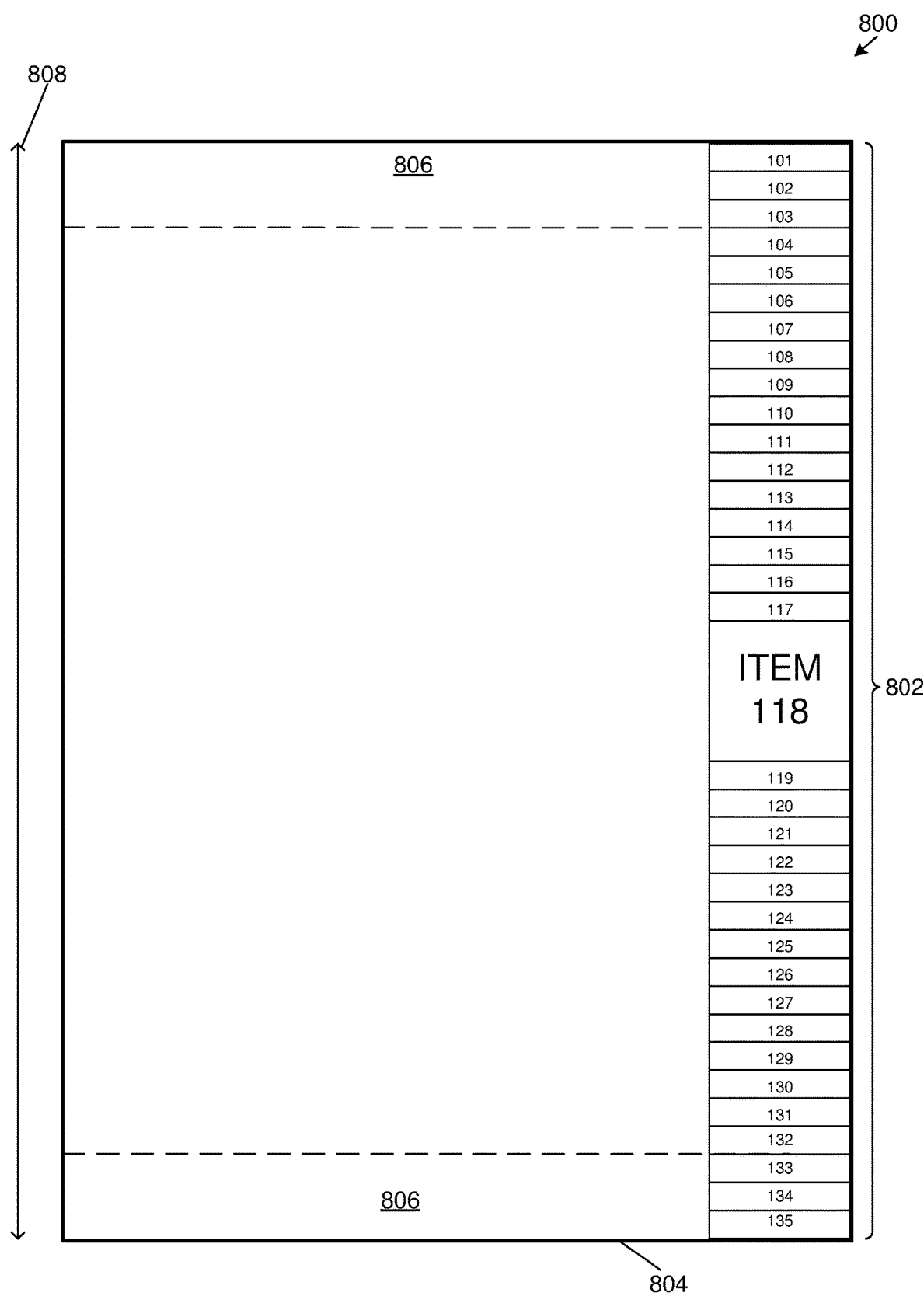
FIGS. 9A to 9D is a schematic illustration of a fifth exemplary method of interacting with interactive items in an embodiment of a user interface.
Figure 9B:
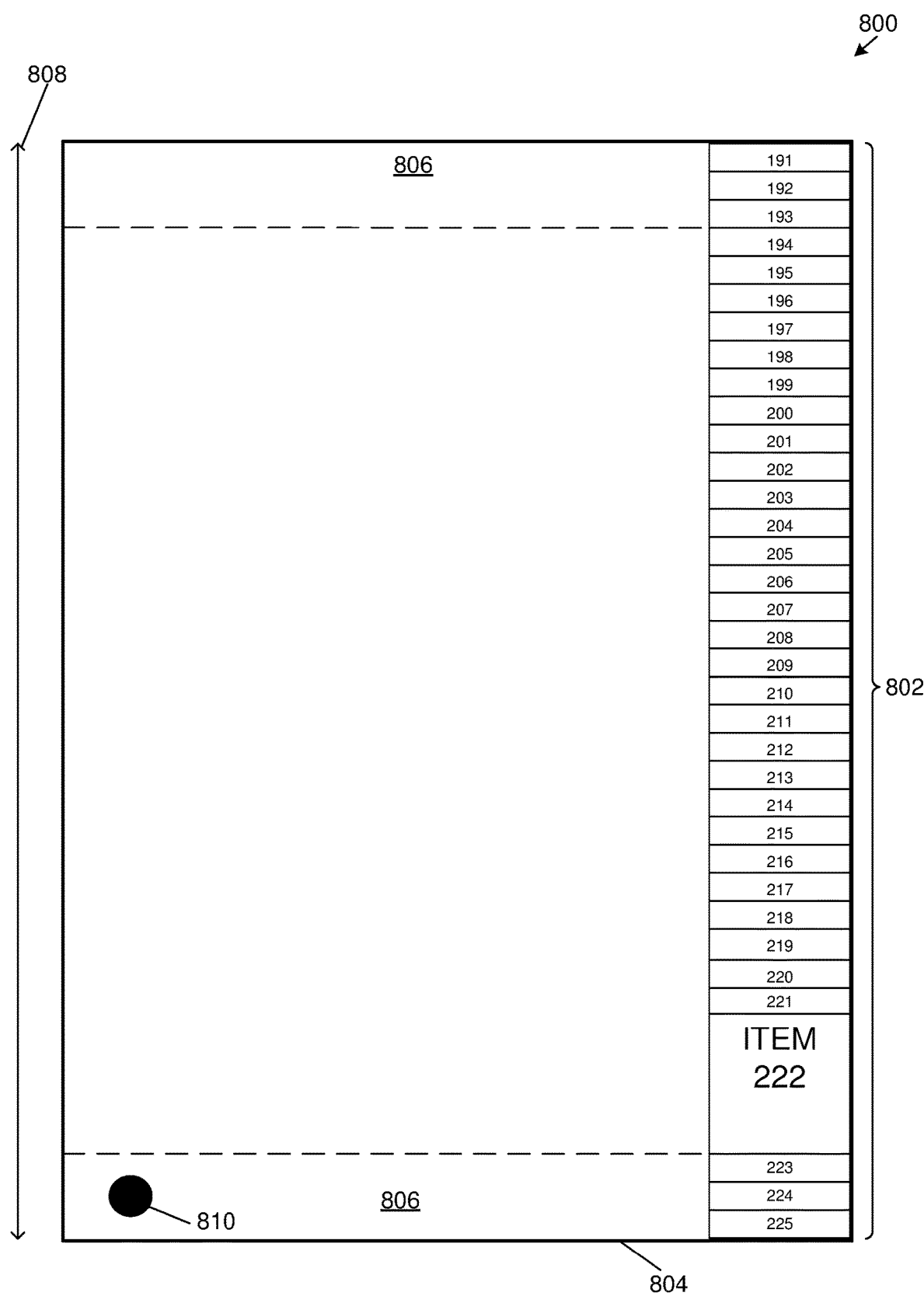

FIG. 9A shows, for purposes of illustration, items 101 to 135 on the display. Only this subset of the total number of available interactive items are displayed on the display at once. In order to reach item 250, the interactive items on the display will need to be updated. The primary interactive item is item 118, even though the pointer is not yet on the display.

To reach item 250, a user may place or move the pointer into a scrolling zone (806) provided at either end of the first predefined axis, also the vertical axis (808) in the present embodiment. This can be seen in FIG. 3B, where the pointer has been placed in the scrolling zone (806) located at a bottom of the display (804). When the pointer (310) is in the scrolling zone (306), scrolling is performed, with an interactive item being added to the subset of interactive items on the display at or near the scrolling zone at substantially the same time that interactive items are removed from the subset of interactive items at an opposite end of the display. The primary interactive item is updated whilst the subset is updated via scrolling. In FIG. 3B, the subset of interactive items on the display includes items 191 to 225, while the primary interactive item (222) is the item immediately above the scrolling zone (806), where the pointer will be located when moved from the scrolling zone.

Figure 9C:
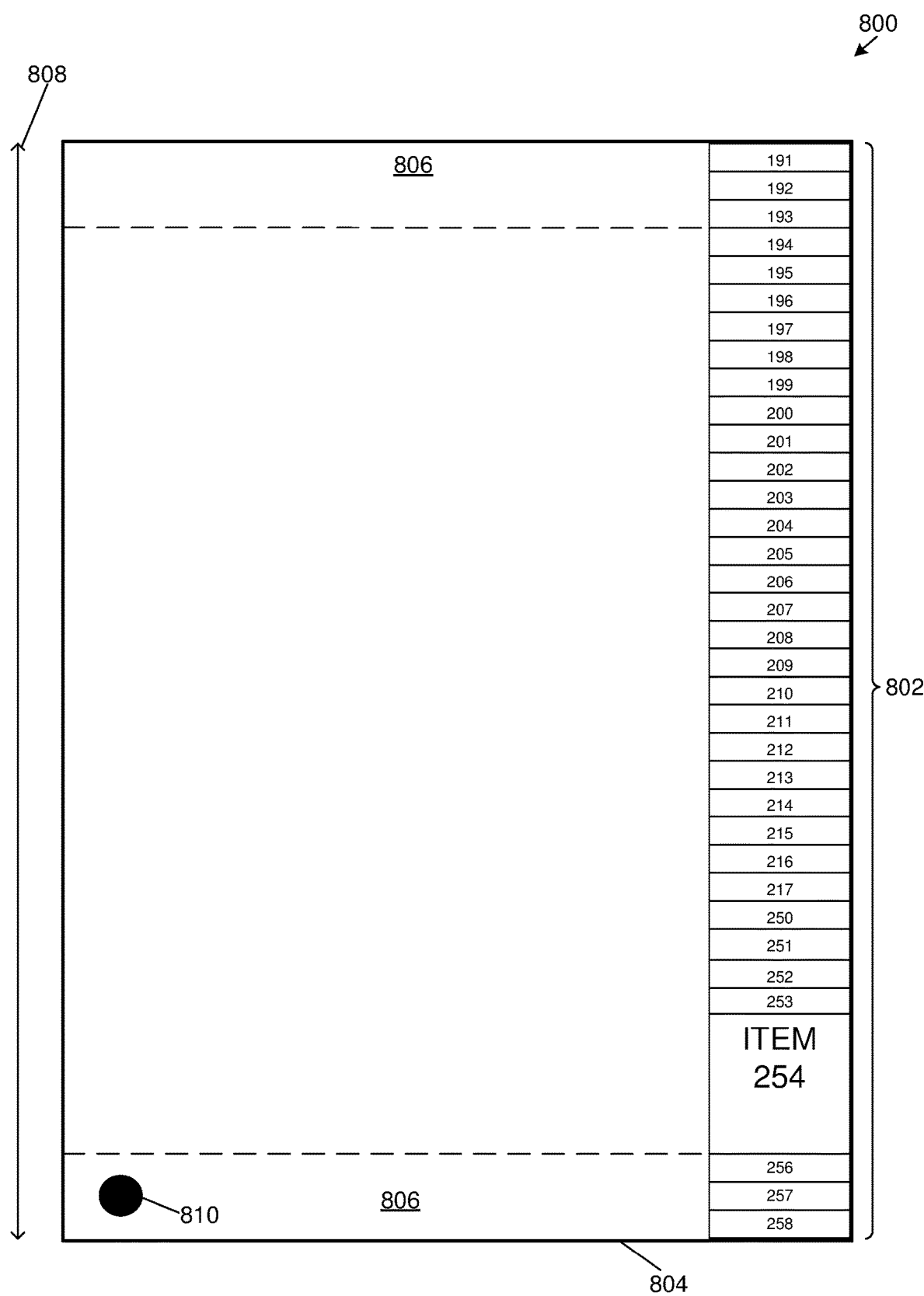
Figure 9D:
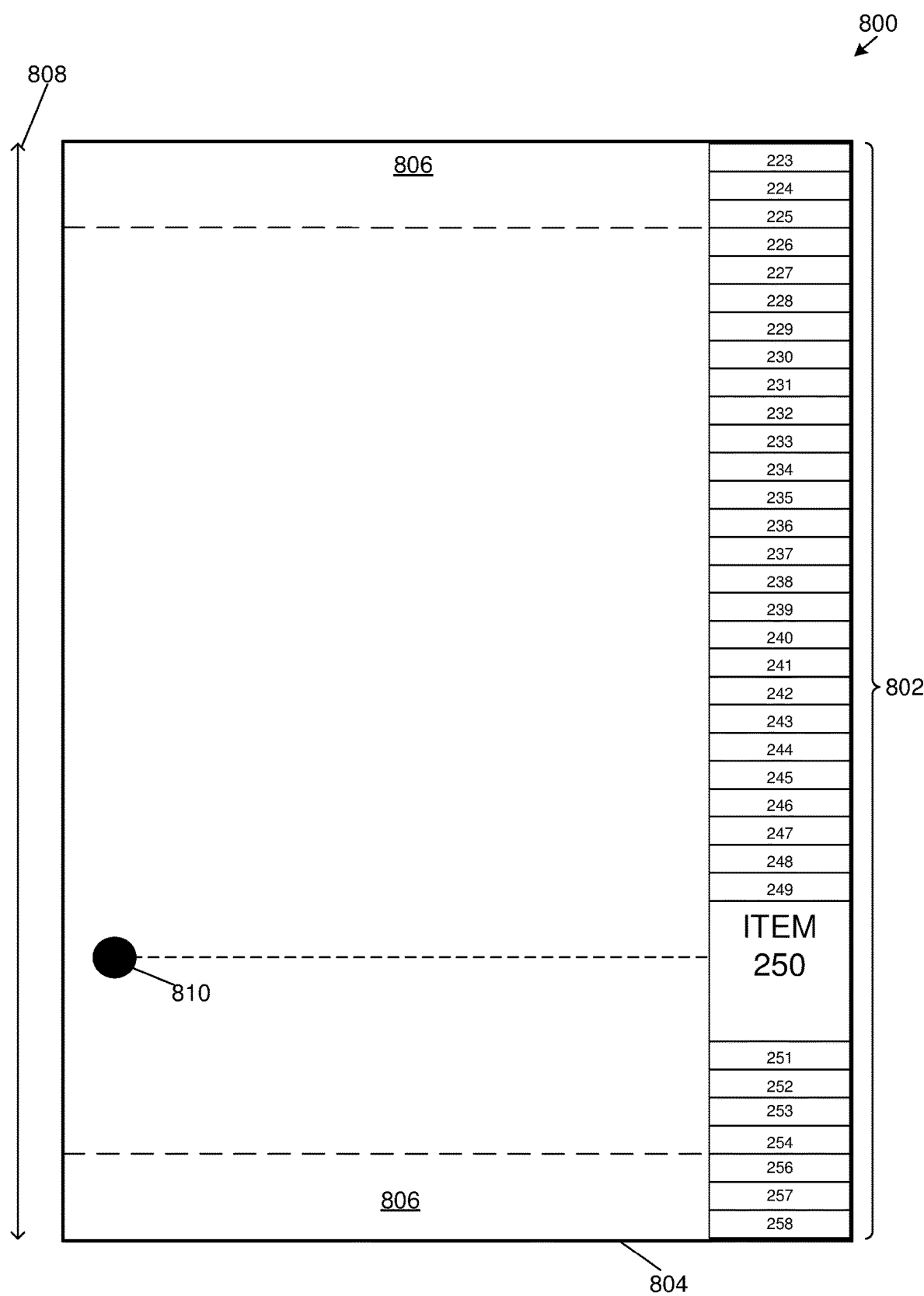

FIG. 9C shows the display when the subset of interactive items has been updated via scrolling such that item 250 can be seen on the display. To interact with item 250, the user moves the pointer out of the scrolling zone, as shown in FIG. 9D. The user may then interact with the item via view pointing by moving the pointer in a horizontal direction as explained above, or may select the item in any suitable manner. In order for the user to make it the primary interactive item, they can move the pointer as shown in FIG. 9D. To update the subset of interactive items to include a lower interactive item not currently part of the subset of interactive items, the user may use the scrolling zone located at the top of the vertical axis in the same manner as described above with reference to the lower scrolling zone. Providing scrolling zones may assist a user in navigating an extensive set of interactive items without the need for repetitive point-and-click manoeuvres.

Figure 10A:
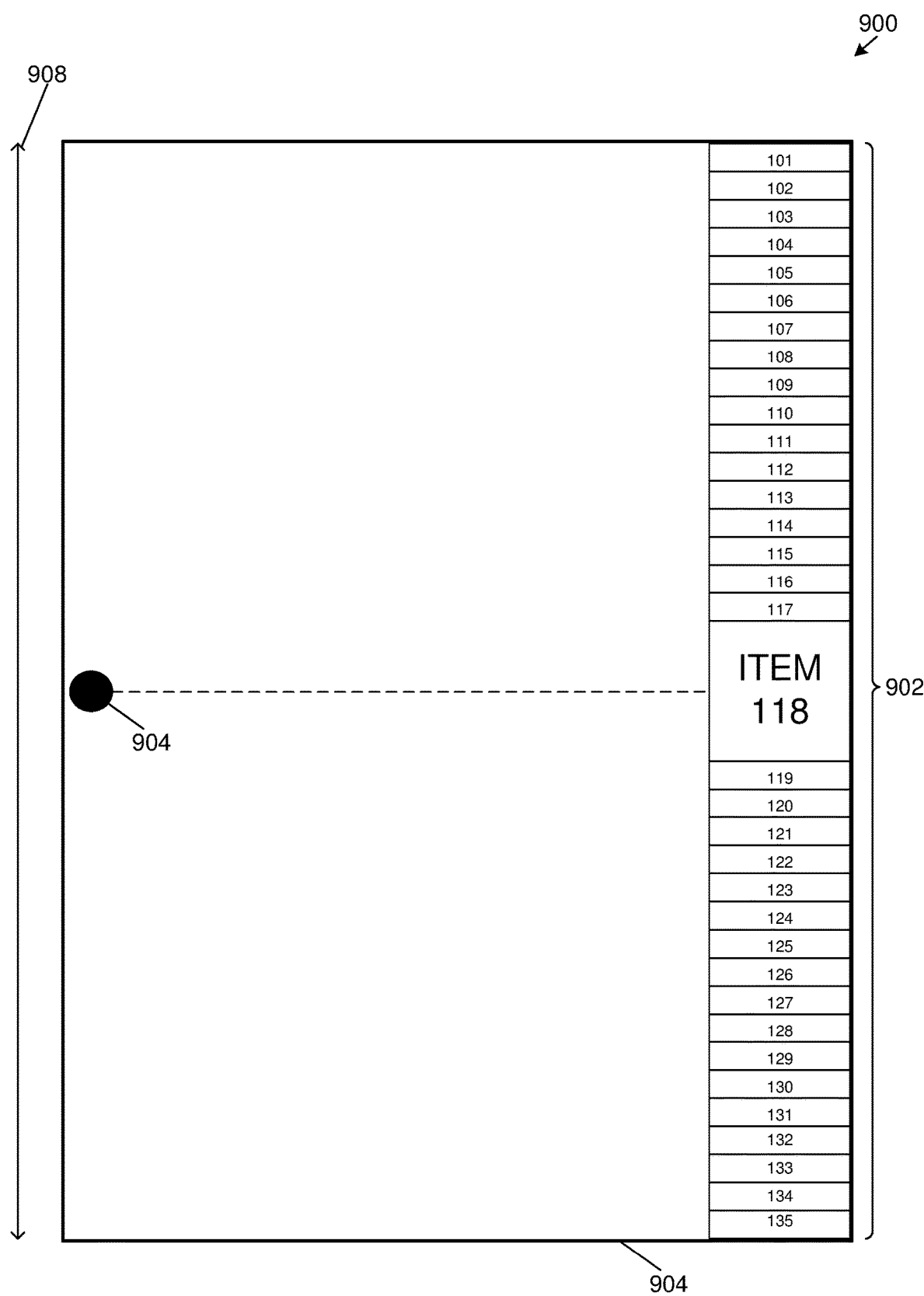
FIG. 10A to 10D is a schematic illustration of a sixth exemplary method of interacting with interactive items in an embodiment of a user interface.
Figure 10B:
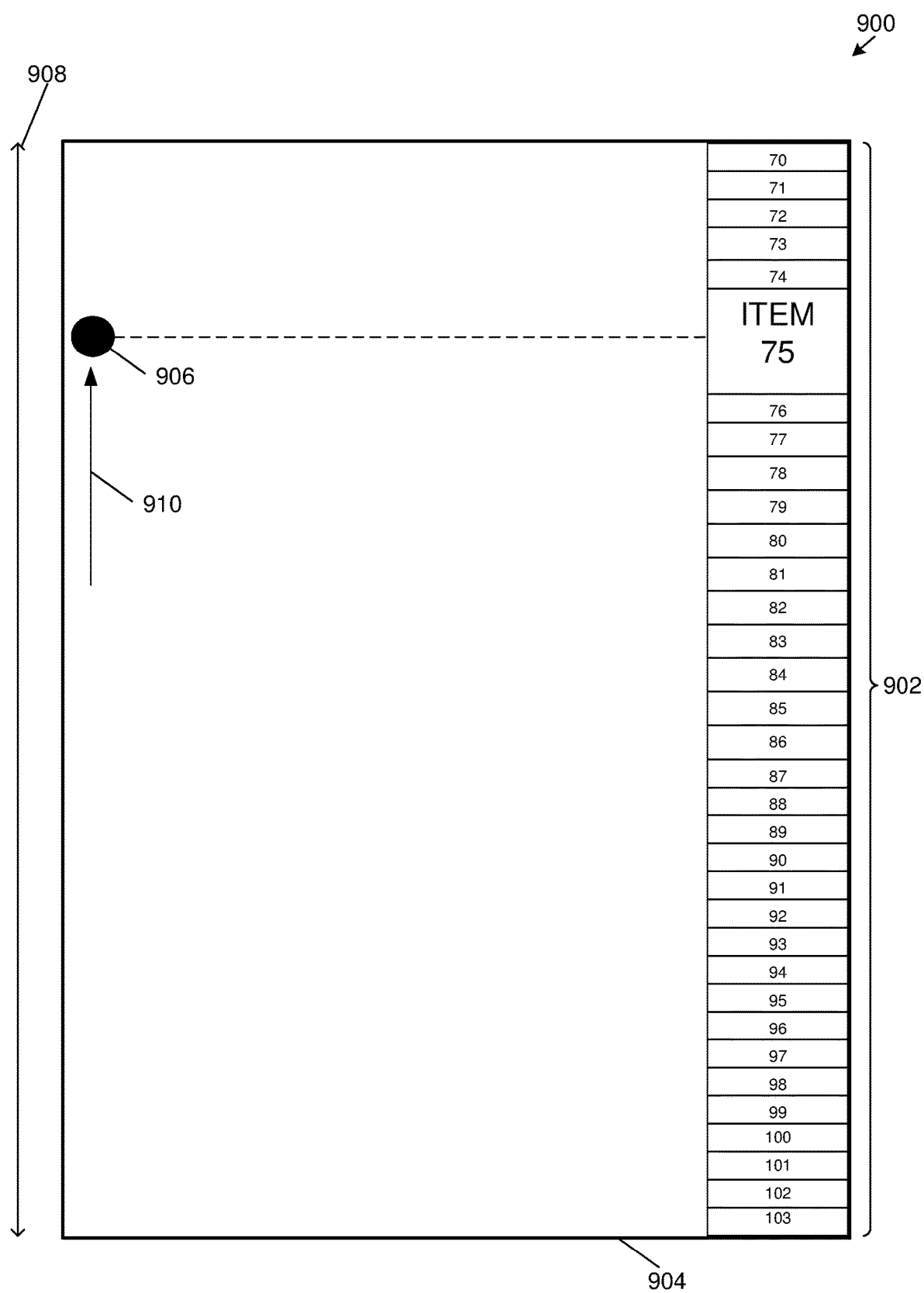

It is envisaged that the user interface may be configured to allow "clutching" in order to scroll to a target interactive item. The user interface may be configured to update the subset of interactive items based on the position of the pointer along the vertical axis. For example, in FIG. 10A, a user interface similar to the interface of FIGS. 9A to 9D is shown. No scrolling zones are provided in this embodiment. A subset of a list of interactive items (902) is displayed, presently items 101 to 133. A pointer (904) is located adjacent item 118, currently the primary interactive item. Moving the pointer upward along the vertical axis (908) causes focus pointing while the subset of interactive items is updated via scrolling. Items not previously on the display is added to the subset of interactive items in the direction that the pointer is moving, whilst items previously on the display being removed from the display at an opposite end. The primary interactive item is also updated according to the position of the pointer. In FIG. 10B, the pointer (906) has been moved upwards as shown by the directional arrow (910) until the primary interactive item is item 75, and the subset of the list of interactive items on the display include items 70 to 103.

Figure 10C:
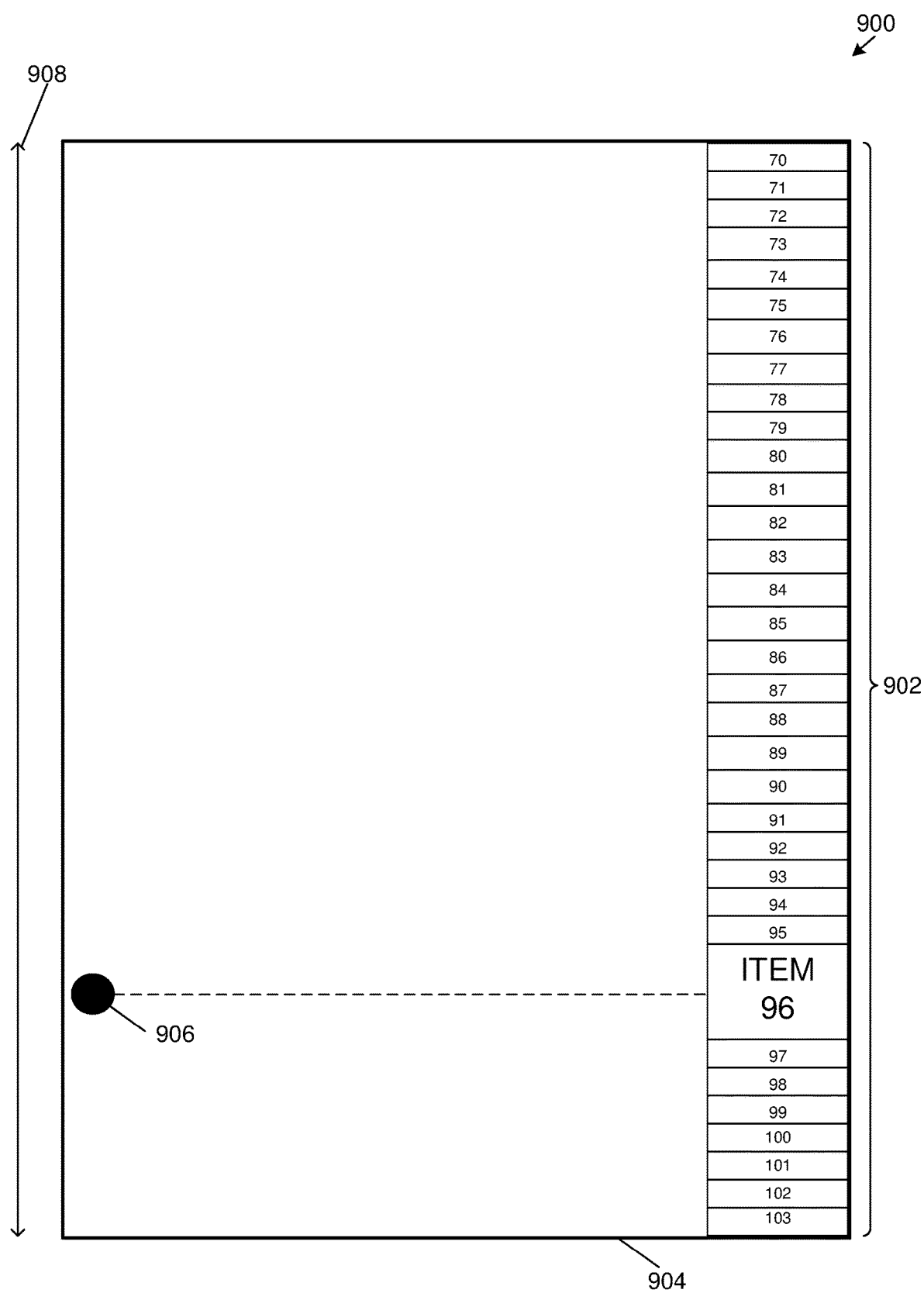

When the pointer is removed from the display (904), in the present embodiment by the user removing their finger from the touch-sensitive display, the subset of interactive items on the display remain the same. The primary interactive item also remains the same. Then, a user may place the pointer (906), also the user's finger, anywhere on the display, as shown in FIG. 10C. The interactive item opposite the pointer, currently item 96, will become the new primary interactive item, and movement of the pointer will again cause focus pointing in combination with scrolling.

Figure 10D:
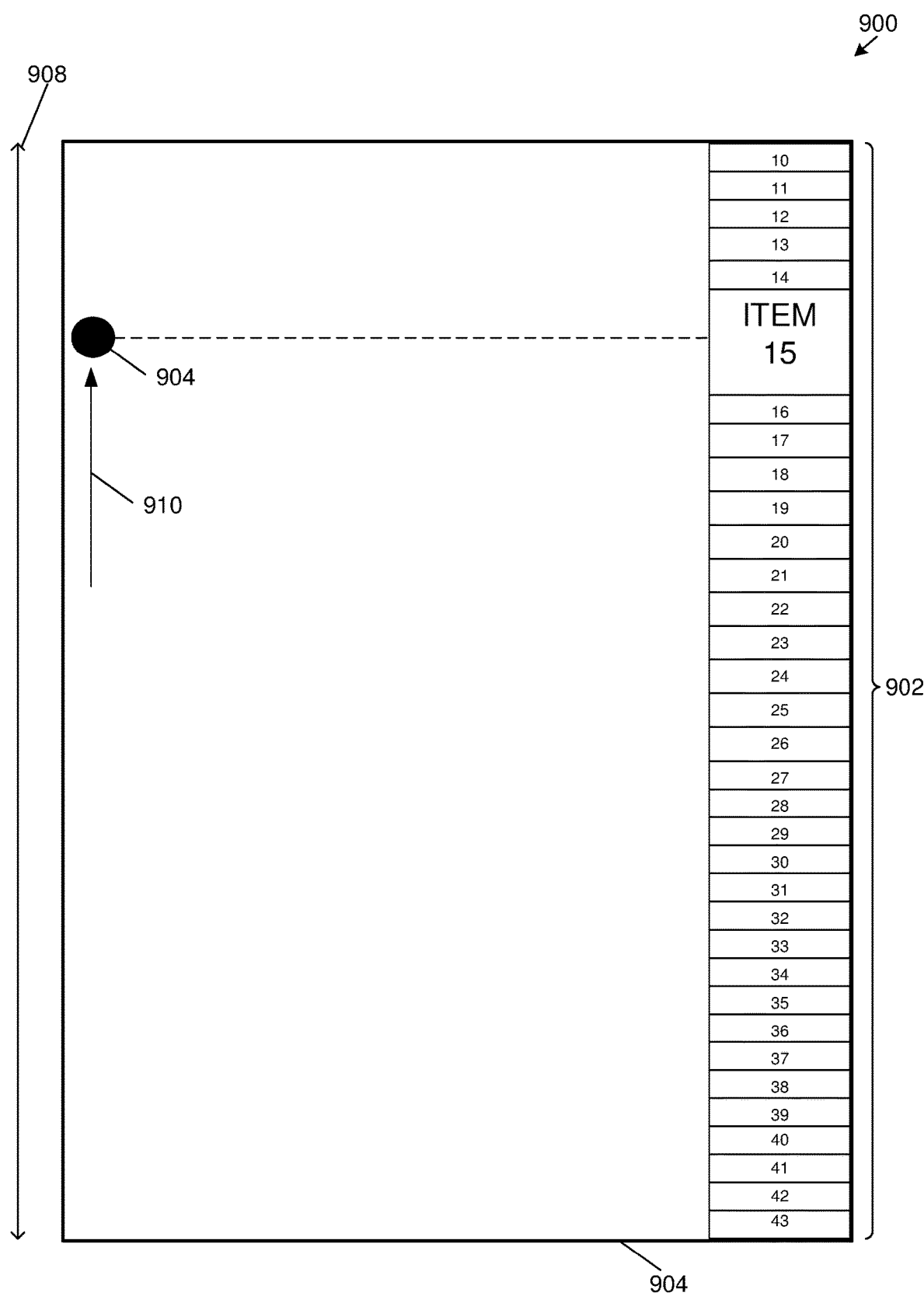

In FIG. 10D, the pointer (906) is located in substantially the same position on the screen as in FIG. 10B, however, replacing the pointer on the screen at a lower position as shown in FIG. 10C, and moving the pointer upwards on the display, as shown by the directional arrow (910) in FIG. 10D, again results in focus pointing in combination with scrolling such that interactive items 10 to 43 forms part of the subset of interactive items on the display. Item 15, directly opposite the pointer, is the primary interactive item in FIG. 10D. By performing clutching as explained above, a user may be able to navigate an extensive list of interactive items in a more traditional manner, which may be more familiar or may be preferred by some users.

The above description is by way of example only and it should be appreciated that numerous changes and modifications may be made to the embodiments described without departing from the scope of the invention. It is envisaged that one of the first predefined direction and first predefined axis or the second predefined direction and second predefined axis may be a z-axis or include movement in the z-axis. The z-axis may extend substantially normally above an x-y plane of the control region or the display region. It is also foreseen that the user may be capable of performing panning in some embodiments. For example, movement of the pointer along a predefined axis or in a predefined direction may cause panning to make further interactive items visible in the display region.

Further, although the first predefined axis and the second predefined axis and/or directions are orthogonal in relation to each other in the embodiments described, they may, in other embodiments, be positioned such that they are not orthogonal in relation to each other. It should be appreciated that, to simplify navigation for a user, the axes may be broadly defined such that a user is not required to accurately move only in one direction to effect only zooming or only scrolling.

It is envisaged that attributes of the user interface which may be determined by the control-display functions forming part of the attribute tool may be any parameter of the applicable interactive items that the user, or the designer of the user interface, would like to control in order to determine its visual appearance and dynamic behaviour. The types of control-display functions available may be determined by the type of interactive items forming part of the list of interactive items. For example, additional to the examples provided above with reference to FIGS. 8A to 7L, an "album size" function may be provided, which may determine the size of album art, the speed at which scrolling takes place, the appearance and/or disappearance of song titles forming part of an album title, and the like. The attribute values may be continuous, such as zoom factor or location, or discrete, such as visibility or alignment, values. The mapping between the second predefined axis and the attribute sequence axis may be adjusted according to a rate of view pointing that is performed, or according to a predetermined movement which is recognised. If, for example, a pointer does not have a vertical component of movement in the control region for a predetermined amount of time, for example 3 seconds, and vertical movement is then performed, the control component may be configured to increase the interpreted movement along the attribute sequence axis for the movement along the second predefined axis. This may, for example, allow zooming into interactive items to occur quicker, or may allow hidden hierarchies to appear more quickly. The 3 seconds may be considered a threshold—having no rate of movement along the vertical axis for more than three second threshold will modify the correlation between the attribute sequence axis and the second predefined axis, while having no rate of movement for less than the threshold will not.

In at least one embodiment, a user is able to "flick" or "throw" the display during view or focus pointing. When focus pointing is performed immediately before the pointer is removed from the display, the user interface continues to perform focus pointing at a continuously reducing rate until no more focus pointing occurs, and the display remains stationary. The primary interactive item will be updated, or scrolling will continue to occur, depending on the exact embodiment implemented. Additionally, when view pointing is performed immediately before the pointer is removed from the display, the user interface continues to perform view pointing, and alter the attributes of interactive items, at a continuously reducing rate until no more view pointing occurs. A pointing continuation component may be provided by the user interface to facilitate this "flicking" or "throwing" of the display.

The software components or functions described in this application may be implemented as software code to be executed by one or more processors using any suitable computer language such as, for example, Java, C++, or Perl using, for example, conventional or object-oriented techniques. The software code may be stored as a series of instructions, or commands on a non-transitory computer-readable medium, such as a random access memory (RAM), a read-only memory (ROM), a magnetic medium such as a hard-drive or flash drive or an optical medium such as a CD-ROM.

Any of the steps, operations, or processes described herein may be performed or implemented with one or more hardware or software modules, alone or in combination with other devices. In one embodiment, a software module is implemented with a computer program product comprising a non-transient computer-readable medium containing computer program code, which can be executed by a computer processor for performing any or all of the steps, operations, or processes described.

Throughout the specification and claims unless the contents requires otherwise the word 'comprise' or variations such as 'comprises' or 'comprising' will be understood to imply the inclusion of a stated integer or group of integers but not the exclusion of any other integer or group of integers.

The invention claimed is:

1. A method of interacting with interactive items in a user interface, comprising:
    providing a user interface having a control region and a display region;
    displaying a plurality of interactive items in the display region;
    tracking position and movement of a pointer in the control region;
    responsive to detecting movement of the pointer along a first predefined axis or in a first predefined direction only, causing focus pointing to be performed in the display region by designating a focal area of the display region for selection or interaction without adding or removing interactive items from the display region, the focal area moving in accordance with the movement of the pointer;
    responsive to detecting movement of the pointer along a second predefined axis or in a second predefined direction only, causing view pointing to be performed in the display region by changing display attributes of all of the interactive items in accordance with the movement of the pointer; and
    responsive to detecting movement of the pointer having components of movement along both the first predefined axis and the second predefined axis or in both the first predefined direction and the second predefined direction, causing both the focus pointing and the view pointing to be simultaneously performed.

2. The method as claimed in claim 1 which includes the step of, based on the position of the pointer on the first predefined axis, designating an interactive item as a primary interactive item, and wherein the focus pointing includes updating the primary interactive item according to the position or direction of movement of the pointer along the first predefined axis.

3. The method as claimed in claim 1 wherein the display attributes of the interactive items on the display are determined by an attribute tool that provides an attribute sequence axis which is correlated to the second predefined axis of the user interface, wherein the attribute tool further provides an attribute value axis perpendicular to the attribute sequence axis, and for the attribute tool to include one or more attribute functions that define an attribute value based on a position along the attribute sequence axis.

4. The method as claimed in claim 3 wherein the attribute functions are selected from a group consisting of: an enlarging or shrinking function for determining a size of the interactive items, a scale function for changing a scale of the interactive items in relation to one another, and a hierarchy function for determining when a hierarchy is expanded or collapsed, and any combination thereof.

5. The method as claimed in claim 3 which includes the step of, responsive to recognising a predetermined movement of the pointer on the second predefined axis, modifying the correlation between the attribute sequence axis and the second predefined axis.

6. The method as claimed in claim 3 wherein the attribute tool is configured to combine a number of different signals received from the control region into an integrated signal, the integrated signal representing a position along the attribute sequence axis.

7. The method as claimed in claim 1 wherein the first predefined axis and the second predefined axis are orthogonal to each other.

8. The method as claimed in claim 1 wherein the control region is a two-dimensional region or a three-dimensional region.

9. The method as claimed in claim 1 wherein the control region includes the display region.

10. The method as claimed in claim 1 wherein the pointer is one selected from a group consisting of: a cursor provided by the user interface; a pointing tool which interacts with the control region of the user interface, a part of the body of a user which interacts with the control region of the user interface, and any combination thereof.

11. The method as claimed in claim 1 wherein a lens function is associated with the pointer and is mapped to the first predefined axis and/or the second predefined axis such that interactive items in the vicinity of a pointer position along the first predefined axis or the second predefined axis may be enlarged or made visible according to a value of the lens function.

12. The method as claimed in claim 1 wherein only a subset of the total number of interactive items in the user interface are displayed on the display region at one time.

13. The method as claimed in claim 1 wherein the control region includes at least one scroll region, and movement of or locating the pointer in the scroll region causes scrolling.

14. The method as claimed in claim 1 which includes the step of, responsive to the focus pointing being performed immediately before the pointer is removed from the display region, continuing to perform the focus pointing at a continuously reducing rate until no more focus pointing occurs and, responsive to view pointing being performed immediately before the pointer is removed from the display region, continuing to perform the view pointing at a continuously reducing rate until no more view pointing occurs.

15. The method as claimed in claim 1 which includes the steps of receiving a selection signal indicating that a selection interaction mode is to be entered; and, responsive to receiving the selection signal, selecting an interactive item at the specific designated focal area of the display.

16. The method as claimed in claim 15, wherein the pointer is a finger of a user which interacts with the control region of the user interface and the selection signal is lifting of the finger from the user interface or tapping of the finger on the user interface.

17. The method as claimed in claim 1 wherein one of the first predefined direction and first predefined axis or the second predefined direction and second predefined axis is a z-axis or includes movement in the z-axis, the z-axis extending normally above an x-y plane of the control region or the display region.

18. The method as claimed in claim 1, wherein the display attributes are one of: a size of the interactive items, a scale of the interactive items in relation to one another, and a hierarchy level of the interactive items.

19. The method as claimed in claim 1, wherein the view pointing is one of: scrolling, panning, zooming, or paging the display region.

20. The method as claimed in claim 1, wherein all of the displayed interactive items remain visible in the display region when only focus pointing is being performed.

21. The method as claimed in claim 1, wherein the interactive items are arranged in a hierarchical item structure such that view pointing causes navigation through different levels of the hierarchical item structure.

22. An electronic device comprising:
a processor;
a non-transitory computer readable storage medium having instructions encoded thereon that, when executed by the processor, cause the processor to:
provide a user interface having a control region in the user interface;
display a plurality of interactive items in a display region of the user interface;
track position and movement of a pointer in the control region; and
responsive to detecting movement of the pointer along a first predefined axis or in a first predefined direction only, cause focus pointing to be performed in relation to the interactive items in the display region by designating a focal area of the display region for selection or interaction without adding or ng interactive items from the display region, the focal area moving in accordance with the movement of the pointer;
responsive to detecting movement of the pointer along a second predefined axis or in a second predefined direction only, cause view pointing a to be performed in the display region by changing display attributes of all of the interactive items in accordance with the movement of the pointer; and
responsive to detecting movement of the pointer having components of movement along both the first predefined axis and the second predefined axis or in both the first predefined direction and the second predefined direction, cause both the focus pointing and the view pointing to be simultaneously performed.

* * * * *

UNITED STATES PATENT AND TRADEMARK OFFICE
CERTIFICATE OF CORRECTION

| | | |
|---|---|---|
| PATENT NO. | : 10,691,317 B2 | Page 1 of 1 |
| APPLICATION NO. | : 15/518914 | |
| DATED | : June 23, 2020 | |
| INVENTOR(S) | : Willem Morkel Van Der Westhuizen | |

It is certified that error appears in the above-identified patent and that said Letters Patent is hereby corrected as shown below:

In the Claims

Column 23, Line 19, In Claim 10, delete "interface;" and insert --interface,--

Column 24, Line 37, In Claim 22, delete "ng" and insert --removing--

Column 24, Line 43, In Claim 22, after "pointing", delete "a"

Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*